(12) United States Patent
Narayanan Nair et al.

(10) Patent No.: US 12,745,096 B2
(45) Date of Patent: Sep. 22, 2026

(54) METHODS AND APPARATUS FOR IMPLEMENTING DUAL BACKHAUL CONNECTION PATHS FOR WIRELESS BASE STATIONS

(71) Applicant: Charter Communications Operating, LLC, St. Louis, MO (US)

(72) Inventors: Prabhath Narayanan Nair, Parker, CO (US); Vijay K. Mechineni, Parker, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 439 days.

(21) Appl. No.: 18/368,501

(22) Filed: Sep. 14, 2023

(65) Prior Publication Data

US 2025/0097717 A1 Mar. 20, 2025

(51) Int. Cl.
*H04W 16/14* (2009.01)
*H04Q 11/00* (2006.01)

(52) U.S. Cl.
CPC ........ *H04W 16/14* (2013.01); *H04Q 11/0062* (2013.01)

(58) Field of Classification Search
CPC .......................... H04W 16/14; H04Q 11/0062
See application file for complete search history.

(56) References Cited

U.S. PATENT DOCUMENTS

2013/0142136 A1* 6/2013 Pi ........................ H04B 7/15507 370/329
2018/0205629 A1* 7/2018 Xue ........................ H04L 47/36
2020/0305159 A1* 9/2020 Raghothaman ... H04W 72/0453
2021/0022007 A1* 1/2021 McFadden ............ H04W 16/14
2023/0144939 A1* 5/2023 Sevindik ........... H04W 52/0206 370/318
2023/0309074 A1* 9/2023 Mengwasser ......... H04W 16/14
2024/0015520 A1* 1/2024 Khawer ................ H04W 16/14
2025/0055556 A1* 2/2025 La Roche .......... H04B 7/15507

* cited by examiner

*Primary Examiner* — Faruk Hamza
*Assistant Examiner* — Tito Q Pham
(74) *Attorney, Agent, or Firm* — Straub & Straub; Stephen T. Straub; Michael P. Straub

(57) ABSTRACT

The present invention relates to methods and apparatus for implementing dual backhaul connection paths for wireless base stations to avoid and/or minimize service interruptions. An exemplary method in accordance with an embodiment of the present invention includes the steps of: establishing, by a Citizens Broadband Radio Service Device (CBSD), a primary backhaul connection path for exchanging messages with a core network, a Citizens Broadband Radio Service (CBRS) Domain Proxy and a test server; establishing, by the CBSD, a secondary backhaul connection path for exchanging messages with the core network, the CBRS Domain Proxy and the test server; and determining, by the CBSD, whether to utilize the primary backhaul connection path or the secondary backhaul connection path for communicating with the core network and the CBRS Domain Proxy based on communications with the test server.

20 Claims, 12 Drawing Sheets

1022 SWITCHING, BY THE CBSD, FROM UTILIZING THE PRIMARY BACKHAUL CONNECTION PATH FOR COMMUNICATING WITH THE CORE NETWORK AND THE CBRS DOMAIN PROXY TO UTILIZING THE SECONDARY BACKHAUL CONNECTION PATH FOR COMMUNICATING WITH THE CORE NETWORK AND THE CBRS DOMAIN PROXY IN RESPONSE TO DETERMINING TO SWITCH FROM UTILIZING THE PRIMARY BACKHAUL CONNECTION PATH TO UTILIZING THE SECONDARY BACKHAUL CONNECTION PATH FOR COMMUNICATING WITH THE CORE NETWORK AND THE CBRS DOMAIN PROXY

1024 UTILIZING, BY THE CBSD, THE SECONDARY BACKHAUL CONNECTION PATH FOR COMMUNICATING WITH THE CORE NETWORK AND THE CBRS DOMAIN PROXY

1026 COMMUNICATING, BY THE CBSD, VIA THE SECONDARY BACKHAUL CONNECTION PATH ONE OR MORE MESSAGES TO THE CBRS DOMAIN PROXY

1028 COMMUNICATING, BY THE CBSD, VIA THE SECONDARY BACKHAUL CONNECTION PATH A HEARTBEAT REQUEST MESSAGE TO THE CBRS DOMAIN PROXY REQUESTING RE-AUTHORIZATION TO CONTINUE TO TRANSMIT USING A SPECTRUM GRANT OBTAINED FROM A SPECTRUM ACCESS SYSTEM, SAID SPECTRUM ACCESS SYSTEM BEING CONNECTED AND/OR COUPLED TO THE CBRS DOMAIN PROXY

1030 COMMUNICATING, BY THE CBSD, VIA THE SECONDARY BACKHAUL CONNECTION PATH DATA RECEIVED BY THE CBSD FROM ONE OR MORE USER EQUIPMENT DEVICES TO THE CORE NETWORK

1032 AFTER SWITCHING FROM UTILIZING THE PRIMARY BACKHAUL CONNECTION PATH TO UTILIZING THE SECONDARY BACKHAUL CONNECTION PATH, PERIODICALLY (E.G., EITHER OCCASIONALLY OR ON A FIXED RECURRING SCHEDULE AFTER THE EXPIRATION OF A PERIOD OF TIME (E.G., EVERY 60 MINUTES) PERFORMING, BY THE CBSD, CONNECTIVITY TESTS ON THE PRIMARY BACKHAUL CONNECTION PATH UNTIL A SUCCESSFUL CONNECTIVITY TEST HAS BEEN PERFORMED

1034 TRANSMITTING, BY THE CBSD, A FIRST NUMBER OF PING MESSAGES (E.G., 15) TO THE TEST SERVER VIA THE PRIMARY BACKHAUL CONNECTION PATH DURING A THIRD PERIOD OF TIME

1036 MONITORING, BY THE CBSD, THE PRIMARY BACKHAUL CONNECTION PATH FOR PING RESPONSE MESSAGES TO THE TRANSMITTED PING MESSAGES

1038 DETERMINING THAT A SUCCESSFUL CONNECTIVITY TEST HAS OCCURRED WHEN SAID MONITORING THE PRIMARY BACKHAUL CONNECTION PATH RESULTS IN NO RESPONSE PING MESSAGES BEING LOST FOR A FOURTH PERIOD OF TIME (E.G., 15 SECONDS)

1040 IN RESPONSE TO A SUCCESSFUL CONNECTIVITY TEST BEING PERFORMED, DETERMINING, BY THE CBSD, TO SWITCH FROM UTILIZING THE SECONDARY BACKHAUL CONNECTION PATH TO UTILIZING THE PRIMARY BACKHAUL CONNECTION PATH FOR COMMUNICATING WITH THE CORE NETWORK AND THE CBRS DOMAIN PROXY

| FIGURE 10A |
| --- |
| FIGURE 10B |
| FIGURE 10C |

METHODS AND APPARATUS FOR IMPLEMENTING DUAL BACKHAUL CONNECTION PATHS FOR WIRELESS BASE STATIONS

FIELD OF INVENTION

The present invention relates to methods and apparatus for implementing dual backhaul connection paths for wireless base stations. The present invention also relates to Multiple System Operators utilizing dual backhaul connectivity to provide wireless services via fiber optic and cable modem backhaul connections. The present invention further relates to methods and apparatus for avoiding and/or minimizing service interruptions of Citizens Broadband Radio Service Devices via the use of dual backhaul connections.

BACKGROUND OF THE INVENTION

In a wireless network, wireless base stations (e.g., Citizens Broadband Radio Service Devices (CBSDs) in Citizen Broadband Radio Service (CBRS) networks) serve as access points which can support wireless communications with mobile terminals also referred to herein as user equipment devices (UEs). In some such wireless networks there are multiple tiers defining what frequency spectrum bands may be used and the amount of interference that the users may cause.

Citizens Broadband Radio Service (CBRS) is a tiered solution having three tiers. The top tier also referred to as Tier 1 dedicated for fixed satellite, wireless internet service providers as well as navy radar. The second tier referred to as Tier 2 consists of PAL (Priority Access Licensees) and the last tier referred to as Tier 3 consists of General Authorized Access (GAA). CBRS networks utilize a 150 MHZ wide broadcast band of the 3.5 GHz band (3350 MHz to 3700 MHZ) in the United States. Channel Frequency allocation (n48 band) for wireless base stations referred to as Citizens Broadband Radio Service Devices (CBSDs) (e.g., 5G radio) transmission is authorized by a Spectrum Access System (SAS).

Tier 1 is an incumbent access tier. Tier 2 is a Priority Access Tier. Tier 3 is General Authorized Access tier. The Priority Access tier consists of Priority Access Licenses (PALs) that are licensed by the government to operate in a specific geographic area. With respect to the CBRS wireless system the Priority Access Licenses are on a county-by-county basis. Each PAL consisting of a 10 megahertz channel within the 3550-3650 MHz band. While the Priority Access Licenses must protect and accept interference from Incumbent Access users such as for example, authorized federal users in the 3550-3700 MHz band and Fixed Satellite Service (space-to-Earth) earth stations in the 3600-3650 MHz band, the Priority Access Licenses receive protection from General Authorized Access (GAA) users. The General Authorized Access tier is licensed-by-rule to permit open, flexible access to the band with the intent of allowing access to the widest possible group of potential users. While the GAA users are permitted to operate throughout the 3550-3700 MHz band, GAA users must not cause harmful interference to Incumbent Access users or Priority Access Licensees. Furthermore, GAA users must accept interference from the Incumbent Access users and the Priority Access Licensees. Moreover, GAA users have no expectation of interference protection from other GAA users.

Citizens Broadband Radio Service networks are networks that include user equipment devices, e.g., mobile or wireless devices such as for example cell phones, smart phones, laptops, tablets, Citizens Broadband Radio Service Devices (CBSDs) which serve as access points/base stations, and resource management devices referred to as Spectrum Access Systems. The resource management devices which are Spectrum Access Systems in CBRS systems manage frequency interference through the management of CBSDs operation by controlling spectrum grants to CBSDs, spectrum grant usage authorization to CBSDs, and CBSDs transmission power levels. One important aspect of the CBRS network is the limitation of interference, e.g., radio transmission, from multiple transmission sources, e.g., multiple CBSD devices located near each other or in close proximity to one another. The Spectrum Access Systems obtain information about registered or licensed commercial users in the 3.5 GHz band from FCC databases and information about federal incumbent users of the band from ESC (Environmental Sensing Capability) system and interact directly or indirectly (e.g., via a CBRS Domain Proxy) with CBSDs operating in the band to ensure that Citizens Broadband Radio Service users operate in a manner consistent with their authorizations and promote efficient use of the spectrum resource.

Among the Spectrum Access System functions as defined in the Amendment of the Commission's Rules with Regard to Commercial Operations in the 3550-3650 MHz Band released Apr. 21, 2015 are that: it determines the available frequencies at a given geographic location and assign them to CBSDs; it determines the maximum permissible transmission power level for CBSDs at a given location and communicates that information to the CBSDs; it registers and authenticates the identification information and location of CBSDs; it enforces exclusion and protection zones, including any future changes to such Zones, to ensure compatibility between Citizens Broadband Radio Service users and incumbent federal operations; it protects Priority Access Licensees (PAL) from impermissible interference from other Citizens Broadband Radio Service users; ensures secure and reliable transmission of information between the SAS, ESC, and CBSDs; and it facilitates coordination and information exchange between SASs. Through the management of the CBSDs spectrum grant authorizations and power transmission levels in a geographical area the SAS manages the radio interference in the geographical area.

As part of the management of the wireless base stations (i.e., CBSDs) use of the CBRS spectrum, the CBSDs are required to send heartbeat request messages to the Spectrum Access System when utilizing granted spectrum, e.g., to communicate with user equipment devices to have the granted spectrum authorized and/or re-authorized for the CBSD's use. This occurs when the CBSD is in a transmission state of operation with respect to granted spectrum. If the heartbeat request messages are not received by the Spectrum Access System within a pre-defined time period (e.g., 240 seconds) the granted spectrum which is in use by a CBSD will not be re-authorized by the Spectrum Access System for use by the CBSD. Additionally, the Spectrum Access System upon receiving the spectrum heartbeat request from the CBSD sends a response message in which it responds by approving (i.e., re-authorizing use of the spectrum), suspending or terminating the spectrum access heartbeat request to utilize the spectrum of the spectrum grant. When re-authorizing use by the CBSD, the Spectrum Access System can also modify the CBSD's permitted transmission power level to reduce frequency interference with other users. When the Spectrum Access System suspends the spectrum grant, the CBSD must stop use of the spectrum of the spectrum grant but may be able to use it again in the future. When the Spectrum Access System response message does not re-authorization the use of the spectrum of the spectrum grant (e.g., suspending or terminating the use of the spectrum grant), the CBSD must cease transmitting using the spectrum of the spectrum grant. Additionally, when the CBSD does not receive a heartbeat response within a specific period of time, the CBSD's spectrum grant is assumed to not have been re-authorized and the CBSD must stop transmitting using the spectrum of the spectrum grant. The CBSD while in an active transmission state is required to maintain a communications connection with the Spectrum Access System so as to be able receive instructions from the Spectrum Access System should as instructions to cease transmitting to protect incumbent users (e.g., U.S. Navy) from spectrum interference. This communications connection is through the CBSD's backhaul connection which couples/connects the CBSD to Spectrum Access System via a CBRS Domain Proxy. The backhaul connection also connects the CBSD to its core network. Typically, a CBSD has only one backhaul communications connection or path used to connect the CBSD with its core network and the System Access System via the CBRS Domain Proxy. When this single backhaul communications connection or path becomes impaired or fails, the CBSD can no longer communicate with the Spectrum Access System and must cease to transmit as it can no longer receive instructions from the Spectrum Access System on its use of the granted spectrum. As a result, the CBSD can no longer provide wireless services to the wireless devices in its coverage area resulting in service disruption for its customers (e.g., dropped calls and a lack of wireless services), until the CBSD's backhaul connection path to the Spectrum Access System is restored.

From the foregoing, it should be understood that there is a need for new and/or improved methods and apparatus for achieving ways to continue for a wireless base station (e.g., a CBSD) to provide wireless services when its backhaul connection is impaired or fails. From the foregoing, it should be further understood that there is a need for new and/or improved methods and apparatus for detecting the impairment and/or failure of backhaul connections in wireless networks especially in wireless networks requiring base stations to obtain spectrum grant authorizations to transmit using granted spectrum. From the foregoing, it should be understood that there is need for a solution to the technical problem of how to eliminate and/or minimize service interruptions when a wireless base station's backhaul connection becomes impaired or fails. From the foregoing, it should be understood that there is a need for new and/or improved methods and apparatus for efficiently and cost effectively continuing to provide wireless services by a wireless base station in a wireless network when the wireless base station's backhaul connection becomes impaired and/or fails leaving the wireless base station unable to communicate with a resource management device controlling the wireless base station's operation including its authorization to utilize spectrum (e.g., transmit utilizing granted spectrum). From the foregoing, it should be understood that there is a need for new and/or improved methods and apparatus for efficiently and cost effectively continuing to provide wireless services by a CBSD in a CBRS network when the CBSD's backhaul connection becomes impaired and/or fails leaving the CBSD unable to communicate with the System Access Spectrum as required by the FCC rules and regulations governing the operation of CBSD and CBRS networks.

SUMMARY OF THE INVENTION

The present invention provides new and/or improved methods, systems and apparatus for a wireless base station (e.g., a CBSD) to be able to continue to provide wireless services when a backhaul connection is impaired or fails. Various embodiments of the present invention provide new and/or improved methods, systems and apparatus for implementing dual backhaul connection paths for wireless base stations. Various embodiments of the present invention provide new and/or improved methods, systems and apparatus for Multiple System Operators (MSO) operators who operator cable networks and wireless networks to utilizing dual backhaul connectivity to provide wireless services via fiber optic and cable modem backhaul connections. Various embodiments of the present invention provide new and/or improved methods, systems and apparatus for avoiding and/or minimizing service interruptions of wireless base stations, e.g., Citizens Broadband Radio Service Devices, via the use of dual backhaul connections. Various embodiments of the present invention solve one or more of the problems discussed above.

An exemplary embodiment of the present invention includes a wireless base station such as for example a CBSD having two backhaul connections, a primary backhaul connection and a secondary backhaul connection. The CBSD upon detecting conditions indicating an impairment or failure of the primary backhaul connection switches to the secondary backhaul connection for communications with its core network as well as a resource management device (e.g., a Spectrum Access System) controlling the authorization of spectrum usage by the wireless base station.

An exemplary method embodiment of the present invention includes the following steps: establishing, by a Citizens Broadband Radio Service Device (CBSD), a primary backhaul connection path for exchanging messages with a core network, a Citizens Broadband Radio Service (CBRS) Domain Proxy and a test server; establishing, by the CBSD, a secondary backhaul connection path for exchanging messages with the core network, the CBRS Domain Proxy and the test server; and determining, by the CBSD, whether to utilize the primary backhaul connection path or the secondary backhaul connection path for communicating with the core network and the CBRS Domain Proxy based on communications with the test server.

In many embodiments, the primary backhaul connection path includes fiber optic cabling, said CBSD being connected to the fiber optic cabling via a fiber optic cable termination switch; and the secondary backhaul connection path includes coaxial cabling and a Cable Modem Termination System, said CBSD being connected to the coaxial cabling via a cable modem.

In some embodiments, fiber optic termination switch is an external device separate from the CBSD. In some embodiments, the fiber optic termination switch is part of the CBSD. In some embodiments, the cable modem is an external device separate from the CBSD. In some embodiments, the cable modem is a part of the CBSD.

In various embodiments, the communications with the test server are ping messages transmitted from the CBSD to the test server via the primary backhaul connection path or the second backhaul connection path and ping response messages received by the CBSD from the test server.

In some embodiments, the step of determining, by the CBSD, whether to utilize the primary backhaul connection path or the secondary backhaul connection path for communicating with the core network and the CBRS Domain Proxy based on communications with the test server includes: while utilizing the primary backhaul connection path to communicate with the core network and the CBRS Domain Proxy, continuously transmitting, by the CBSD, ping messages to the test server via the primary backhaul connection path; and upon the CBSD failing to receive ping response messages to the continuous ping messages transmitted to the test server via the primary backhaul connection path for a first period of time (e.g., 15 seconds), commencing, by the CBSD, continuous transmission of ping messages to the test server via the secondary backhaul connection path; and monitoring, by the CBSD, the secondary backhaul connection path for ping response messages to the continuous transmission of ping messages sent to the test server via the secondary backhaul connection path.

In some embodiments, subsequent to the CBSD failing to receive ping response messages to the continuous ping messages transmitted to the test server via the primary backhaul connection path for a first period of time (e.g., 15 seconds) and prior to commencing, by the CBSD, continuous transmission of ping messages to the test server via the secondary backhaul connection path, the CBSD ceases to transmit ping messages to the test server via the primary backhaul connection path.

In some embodiments, the step of determining, by the CBSD, whether to utilize the primary backhaul connection path or the secondary backhaul connection path for communicating with the core network and the CBRS Domain Proxy based on communications with the test server includes: while utilizing the primary backhaul connection path to communicate with the core network and the CBRS Domain Proxy, continuously transmitting, by the CBSD, ping messages to the test server via the primary backhaul connection path; and upon the CBSD failing to receive a first threshold number (e.g., 15 packets) of consecutive ping response messages to the continuous ping messages transmitted to the test server via the primary backhaul connection path: (i) commencing, by the CBSD, continuous transmission of ping messages to the test server via the secondary backhaul connection path; and (ii) monitoring, by the CBSD, the secondary backhaul connection path for ping response messages to the continuous transmission of ping messages sent to the test server via the secondary backhaul connection path.

In some embodiments, the step of determining, by the CBSD, whether to utilize the primary backhaul connection path or the secondary backhaul connection path for communicating with the core network and the CBRS Domain Proxy based on communications with the test server further includes: determining to switch from utilizing the primary backhaul connection path for communicating with the core network and the CBRS Domain Proxy to utilizing the secondary backhaul connection path, when said monitoring the secondary backhaul connection path results in no response ping messages being lost for a second period of time (e.g., 15 seconds).

In some embodiments the step of determining, by the CBSD, whether to utilize the primary backhaul connection path or the secondary backhaul connection path for communicating with the core network and the CBRS Domain Proxy based on communications with the test server further includes: determining to switch from utilizing the primary backhaul connection path for communicating with the core network and the CBRS Domain Proxy to utilizing the secondary backhaul connection path, when said monitoring the secondary backhaul connection path results in successfully receiving a second threshold number of consecutive ping response messages.

In some embodiments, the ping messages are echo requests with a packet of size 32 bytes; the ping responses messages are echo replies with a packet size of 32 bytes; the first threshold number of consecutive ping response messages is 15 consecutive echo reply packets; and the second threshold number of consecutive ping response messages is 15 consecutive echo reply packets.

In some embodiments, the method includes the additional steps of switching, by the CBSD, from utilizing the primary backhaul connection path to utilizing the secondary backhaul connection path for communicating with the core network and CBSD Domain Proxy in response to determining to switch from utilizing the primary backhaul connection path for communicating with the core network and the CBRS Domain Proxy to utilizing the secondary backhaul connection path; and communicating, by the CBSD via the second backhaul connection path, a heartbeat request message to the CBRS Domain Proxy requesting re-authorization to continue to transmit using a spectrum grant obtained from a Spectrum Access System with which the CBRS Domain Proxy is connected.

In some embodiments, the method further includes: prior to switching from the primary backhaul communications path to the secondary backhaul communications path: (i) transmitting via the primary backhaul communications path a heartbeat request message to the CBRS Domain Proxy requesting authorization to transmit using the spectrum grant obtained from the Spectrum Access System, (ii) receiving via the primary backhaul communications path a heartbeat response message from the CBRS Domain Proxy authorizing use of the spectrum grant by the CBSD in response to the heartbeat request, and (iii) transmitting messages, by the CBSD, to user equipment devices using spectrum identified in the spectrum grant.

In some embodiments, the CBSD after switching from utilizing the primary backhaul connection path to utilizing the secondary backhaul connection path, periodically (e.g., either occasionally or on a fixed recurring schedule after the expiration of a period of time such as for example every 60 minutes) performs connectivity tests on the primary backhaul connection path until a successful connectivity test has been performed; and in response to a successful connectivity test being performed on the primary backhaul connection path, determining, by the CBSD, to switch from utilizing the secondary backhaul connection path to utilizing the primary backhaul connection path for communicating with the core network and the CBRS Domain Proxy.

In some embodiments, each of said periodically performed connectivity tests on the primary backhaul connection path includes: transmitting, by the CBSD, a first number of ping messages (e.g., 15) to the test server via the primary backhaul connection path during a third period of time; and monitoring, by the CBSD, the primary backhaul connection path for ping response messages to the transmitted ping messages. In some such embodiments, a successful connectivity test is determined to have occurred when said monitoring the primary backhaul connection path results in no response ping messages being lost for a fourth period of time (e.g., 15 seconds).

In some embodiments, each of said periodically performed connectivity tests on the primary backhaul connection path includes: transmitting, by the CBSD, a first number of ping messages (e.g., 15) to the test server via the primary backhaul connection path during a third period of time; and monitoring, by the CBSD, the primary backhaul connection path for ping response messages to the first number of transmitted ping messages. In some such embodiments, a successful connectivity test is determined to have occurred when said monitoring the first backhaul connection path results in determining that the CBSD has received from the test server at the CBSD via the primary backhaul connection path a ping response message for each of the transmitted ping messages within a fourth time period, said fourth time period being after the commencement of the third period of time.

In some embodiments, each of said periodically performed connectivity tests on the primary backhaul connection path includes: transmitting, by the CBSD, a first number of ping messages (e.g., 15) to the test server via the primary backhaul connection path during a third period of time; and monitoring, by the CBSD, the primary backhaul connection path for ping response messages to the transmitted ping messages. In some such embodiments, a successful connectivity test is determined to have occurred when said monitoring the first backhaul connection path results in receiving within a fourth period of time from the test server at the CBSD via the primary backhaul connection path ping response messages for each of the transmitted ping messages.

In various embodiments, the method further includes the steps of performing connectivity checks on the primary backhaul connection path, by the CBSD, after waiting a third period of time (e.g., 60 minutes) after switching from utilizing the primary backhaul connection path to utilizing the secondary backhaul connection path. In some such embodiments, the step of determining, by the CBSD, whether to utilize the primary backhaul connection path or the secondary backhaul connection path for communicating with the core network and the CBRS Domain Proxy based on communications with the test server further includes: determining to switch from utilizing the secondary backhaul connection path for communicating with the core network and the CBRS Domain Proxy to utilizing the primary backhaul connection path, when said connectivity checks on the primary backhaul connection path are successful. In some embodiments, the step of performing connectivity checks on the primary backhaul connection path includes: transmitting, by the CBSD, ping messages to the test server via the primary backhaul connection path; and monitoring, by the CBSD, the primary backhaul connection path for ping response messages to the ping messages. In some such embodiments, the connectivity checks on the primary backhaul connection path are successful when within a fourth period of time (e.g., 15 seconds) a ping response message is received from the test server for each of the ping messages transmitted to the test server as part of a connectivity check.

In some embodiments, the first period of time is based on the CBSD heartbeat interval with which the CBSD transmits heartbeat messages to a Spectrum Access System via the CBRS Domain Proxy to obtain re-authorization to continue use of spectrum granted to the CBSD by the Spectrum Access System; and the second period of time is based on the CBSD heartbeat interval with which the CBSD transmits heartbeat messages to the Spectrum Access System via the CBRS Domain Proxy to obtain re-authorization to continue use of spectrum granted to the CBSD by the Spectrum Access System.

In some embodiments, the combination of the first period of time and the second period of time is less a specified amount of time (e.g., 60 seconds) required for the CBSD to respond to transmission instructions (e.g., cease transmission on specified spectrum) from a Spectrum Access System.

In some embodiments, the primary backhaul connection path and the secondary backhaul connection path exist concurrently.

In some embodiments, the CBSD has a fiber optic port, said fiber optic port being used to connect the CBSD to the fiber optic termination switch; and the CBSD has an Ethernet port, said Ethernet port being used to connect the CBSD to the cable modem.

In some embodiments, the test server is located in a data center. In some embodiments, test server is located in a cloud.

In some embodiments, the operator of the CBRS wireless network of which the CBSD is a part also operates a Mobile Virtual Network in which a carrier provides wireless services to user equipment devices subscribed to the Mobile Virtual Network per an agreement when outside the coverage area of the CBSD or when the CBSD is not operating, the user equipment devices being dual SIM dual subscription wireless devices with a first SIM card with credentials for the CBRS network and a second SIM card having credentials for the carrier's wireless network. The CBSD offloading traffic from the carrier's network onto the CBRS network so as to reduce the Mobile Virtual Network operators expenses to be paid to the carrier for providing services to its subscribers. The ability of the CBSD to remain operational after a failure of its primary backhaul connection path reducing the Mobile Virtual Network operator's expenses.

In some embodiments, the CBSD is one of a plurality of CBSDs owned by a multiple system operator; the primary backhaul connection path infrastructure (e.g., fiber optic termination switch, fiber optic cabling and network connection devices) is owned by the multiple system operator; the core network is owned by the multiple system operator; the CBRS Domain Proxy is owned by the multiple system operator; the secondary backhaul connection path infrastructure (e.g., cable modem, HFC network, CMTS, and network connection devices) is owned by the multiple system operator; the test server is owned by the multiple system operator; the multiple system operator operates a cable network and a CBRS network, said plurality of CBSDs being part of the CBRS network which provides wireless services to wireless user equipment devices; and the plurality of CBSDs, primary backhaul connection path infrastructure, core network and CBRS Domain Proxy are part of the CBRS network; and the secondary backhaul connection path infrastructure is part of the cable system, said cable system providing cable television and internet services to devices at customer premises which subscribe to the cable network.

In some embodiments, the CBSD has two different Internet Protocol addresses, a first Internet Protocol address and a second Internet Protocol address, said first Internet Protocol address being used for communications on the primary backhaul connection path, and said second Internet Protocol address being used for communications on the secondary backhaul connection path.

In some embodiments, the CBSD uses the same Internet Protocol address for communications on the primary backhaul communications path and the secondary backhaul communications path.

In some embodiments, the CBSD switches a logical communications interface of the CBSD from the fiber optic port to the Ethernet port of the CBSD when switching from communicating using the primary backhaul connection path to communicating using the secondary backhaul connection path.

In various embodiments, the periodicity at which ping messages are transmitted to the test server from the CBSD is configurable. In various embodiments, the rate at which ping messages are transmitted to the test server is configurable. In various embodiments, the amount of time, from when a ping message is sent till when a response message to the sent ping message must be received before the CBSD determines no response message has been received for the sent ping message, is configurable. In some embodiments, one or more of the periods of time for sending ping messages or receiving response messages to the sent ping messages is configurable and may be based on the round trip time between the CBSD and the test server for the given backhaul connection path being utilized.

The present invention is also applicable to apparatus and system embodiments wherein one or more devices implement the steps of the method embodiments. In some apparatus embodiments each of the wireless base stations, CBSDs, user equipment devices, fiber optic termination switch, switches, routers, network equipment devices, gateways, cable modems, Cable Modem Termination System, CBRS Domain Proxy, Spectrum Access System, ESC system, test server and each of the other apparatus/devices/nodes of the system include one or more processors and/or hardware circuitry, input/output interfaces including receivers and transmitters, and memory. The memory includes instructions when executed by one or more of the processors control the apparatus/device/node of the system to operate to perform the steps and/or functions of various method embodiments of the invention. The present invention is also applicable to and includes apparatus and systems such as for example, apparatus and systems that implement the steps and/or functions of the method embodiments. For example, a communication system in accordance with one embodiment of the present invention includes: a Citizens Broadband Radio Service Device (CBSD) including: memory; and a first processor, said first processor controlling the CBSD to perform the following operations: establishing, by the CBSD, a primary backhaul connection path for exchanging messages with a core network, a Citizens Broadband Radio Service (CBRS) Domain Proxy and a test server; establishing, by the CBSD, a secondary backhaul connection path for exchanging messages with the core network, the CBRS Domain Proxy and the test server; and determining, by the CBSD, whether to utilize the primary backhaul connection path or the secondary backhaul connection path for communicating with the core network and the CBRS Domain Proxy based on communications with the test server.

While various embodiments have been discussed in the summary above, it should be appreciated that not necessarily all embodiments include the same features and some of the features described above are not necessary but can be desirable in some embodiments. Numerous additional features, embodiments and benefits of various embodiments are discussed in the detailed description which follows.

BRIEF DESCRIPTION OF THE DRAWINGS

FIG. 10B illustrates the second part of a flowchart of an exemplary method in accordance with an embodiment of the present invention.

DETAILED DESCRIPTION

Figure 1:
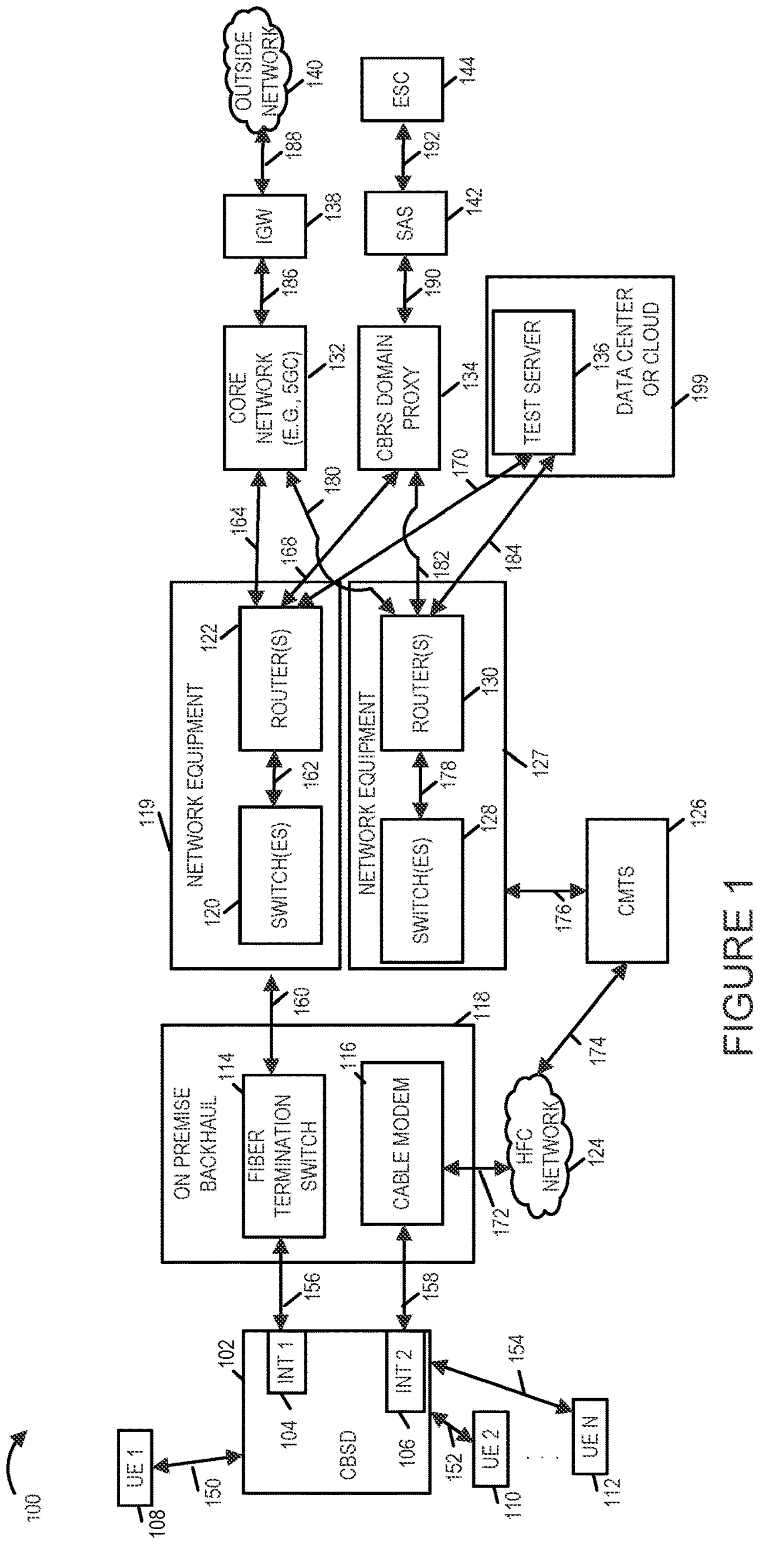
FIG. 1 illustrates an exemplary system in accordance with an embodiment of the present invention.

The present invention relates to methods, systems and apparatus for implementing dual backhaul connection paths for wireless base stations. The present invention is also related to methods, systems and apparatus for providing wireless backhaul communications paths from a wireless base station to a resource management device or system controlling the wireless base station's use of spectrum. The current invention is applicable to Citizens Broadband Radio Service (CBRS) networks and their CBSDs which provide wireless communications services while the CBSDs operation and use of spectrum is managed by a Spectrum Access System.

As previously described, Citizens Broadband Radio Service (CBRS) is a tiered solution with the top tier dedicated for fixed satellite, wireless internet service providers as well as navy radar. The second tier consists of PAL (Priority Access Licensees) and the last tier consists of General Authorized Access (GAA). CBRS networks utilize a 150 MHZ wide broadcast band of the 3.5 GHz band (3350 MHz to 3700 MHZ) in the United States. Channel Frequency allocation (n48 band) for wireless base stations referred to as Citizens Broadband Radio Service Devices (CBSDs) (e.g., 5G radio) transmission is authorized by a Spectrum Access System (SAS).

Citizens Broadband Radio Service networks are networks that include user equipment devices, e.g., mobile or wireless devices such as for example cell phones, smart phones, laptops, tablets, Citizens Broadband Radio Service Devices (CBSDs) which serve as access points/base stations, and Spectrum Access Systems which provides spectrum assignments and manages frequency interference through power management of the CBSDs transmission power. One important aspect of the CBRS network is the limitation of interference, e.g., radio transmission, from multiple transmission sources, e.g., multiple CBSD devices located near each other or in close proximity to one another. The CBRS network includes Spectrum Access Systems that obtain information about registered or licensed commercial users in the 3.5 GHz band from FCC databases and information about federal incumbent users of the band from ESC (Environmental Sensing Capability) system and interact directly or indirectly (e.g., via a CBRS Domain Proxy) with CBSDs operating in the band to ensure that Citizens Broadband Radio Service users operate in a manner consistent with their authorizations and promote efficient use of the spectrum resource.

Among the Spectrum Access System functions as defined in the Amendment of the Commission's Rules with Regard to Commercial Operations in the 3550-3650 MHz Band released Apr. 21, 2015 are that: it determines the available frequencies at a given geographic location and assign them to CBSDs; it determines the maximum permissible transmission power level for CBSDs at a given location and communicates that information to the CBSDs; it registers and authenticates the identification information and location of CBSDs; it enforces exclusion and protection zones, including any future changes to such Zones, to ensure compatibility between Citizens Broadband Radio Service users and incumbent federal operations; it protects Priority Access Licensees (PAL) from impermissible interference from other Citizens Broadband Radio Service users; ensures secure and reliable transmission of information between the SAS, ESC, and CBSDs; and it facilitates coordination and information exchange between SASs. Through the management of the CBSDs spectrum grant authorizations and power transmission levels in a geographical area the SAS manages the radio interference in the geographical area.

As part of the management of the wireless base stations (i.e., CBSDs) use of the CBRS spectrum, the CBSDs are required to send heartbeat request messages to the Spectrum Access System when utilizing granted spectrum, e.g., to communicate with user equipment devices to have the granted spectrum authorized and/or re-authorized for the CBSD's use. This occurs when the CBSD is in a transmission state of operation with respect to granted spectrum. If the heartbeat request messages are not received by the Spectrum Access System within a pre-defined time period (e.g., 240 seconds) the granted spectrum which is in use by a CBSD will not be re-authorized by the Spectrum Access System for use by the CBSD.

Typically, a CBSD has only one backhaul communications connection or path used to connect the CBSD with the 5G core network and the System Access System. Multiple System Operators, e.g., Charter Communications, which operate both CBRS wireless networks and cable systems, however, have assets of both fiber optic and Cable Modem Termination System connections on premises (e.g., system operator owned or leased premises or customer premises) where CBSDs are installed. This offers the opportunity for dual backhaul connections. Terms fiber, fiber-optic and optical fiber are used interchangeable herein when discussing cable and connections. For example, a fiber cable, a fiber optic cable and an optical fiber cable all refer to a cable including one or more optical fibers used for transmitting light. A wired cable is a cable made of metal (e.g., copper metal). Examples of wired cables used for communications include coaxial cable and twisted pair cable.

FIG. 1 illustrates elements of an exemplary dual backhaul wireless communications system 100 in accordance with an embodiment of the present invention. System 100 includes a plurality of user equipment devices (UE 1 108, UE 2 110, . . . , UEN 112), a mobile base station illustrates as CBSD 102, a fiber termination switch 114, a cable modem 116, a Hybrid Fiber-Coaxial (HFC) network 124, a Cable Modem Termination System (CMTS) 126, network connecting equipment 119 (e.g., one or more network equipment connecting devices), network equipment 127 (e.g., one or more network equipment connecting devices), a core network (e.g., a 5G core network) 132, a Citizens Broadband Radio Service (CBRS) Domain Proxy 134, a test server 136, an Internet Gateway 138, a Spectrum Access System (SAS) 142, and an Environmental Sensing Capability (ESC) system 144. The Internet Gateway 138 couples/connects system 100 to an outside network 140 such as for example, the Internet and other devices in and/or connected or coupled to the outside network (e.g., application servers, telecommunications networks, etc.).

The CBSD 102 includes a first interface 104 that connects and/or couples the CBSD 102 to a primary backhaul connection path (e.g., fiber optic backhaul connection path) and a second interface that connects and/or couples the CBSD 102 to a secondary backhaul connection path (e.g., a cable network connection path). In this example, the first interface 104 is a fiber optic interface and the second interface 106 is a wired interface. The first interface 104 includes a fiber optic port to support fiber optic backhaul. The second interface 104 includes a wired Ethernet port to support backhaul via a cable network. The first interface 104 is connected and/or coupled to the fiber termination switch 114 also referred to herein as a fiber optic termination switch. The second interface 106 is connected and/or coupled to the cable network via an external cable modem 116. The fiber optic termination switch 114 and cable modem 116 are located on-site or on premises (e.g., premises either owned or leased by the network operator of the system 100 or by a customer of system 100). The user equipment devices (UE 1 108, UE 2 110, . . . , UE N 112) are CBRS user equipment devices which can operate on spectrum in the CBRS band. The user equipment devices are wireless devices such as for example: computers, smartphones, laptops, tablets, mobile phones, etc.

The network connection equipment 119 includes a plurality of connection devices (e.g., switch(es) 120 and router(s) 122 which are connected and/or coupled together via a network including cabling either optical or wired depending on the configuration). The network connection equipment 127 includes a plurality of connection devices (e.g., switch(es) 128 and router(s) 130 which are connected and/or coupled together via a network including cabling which is typically wired cabling).

The various elements (e.g., devices) of the system 100 are coupled and/or connected together via communications links 150, 152, 154, 156, 158, 160, 162, 164, 168, 170, 172, 174, 176, 178, 180, 182, 184, 186, 188, 190, and 192. Various elements of the system use the communications links to communicate and exchange data, signals and information. User equipment devices UE 1 108, UE 2 110, . . . , UE N 112 are coupled and/or connected to the CBSD 102 via wireless links 150, 152, . . . , 154 respectively. The wireless communications links 150, 152, . . . , 154 are CBRS spectrum channels which the Spectrum Access System 142 has granted and/or allocated to CBSD 102 for its use. Communications link 160 is a fiber optic link, e.g., fiber optic cable, which connects and/or couples the first interface 104 (e.g., the fiber optic port of the first interface 104) to the fiber optic termination switch 114. The communications link 158 is a wired communications (e.g., a wired cable) which connects and/or couples the second interface 106 (e.g., the ethernet port of the second interface 106) to the cable modem 116.

The fiber optic termination switch 114 is connected and/or coupled to the network connection equipment 119 via communications link 160 which is a fiber optic link (e.g., a fiber optical cable). The network equipment 119 is connected and/or coupled to core network 132 via communications link 164. The network equipment 119 is connected and/or coupled to CBRS Domain Proxy 134 via communications link 168. The network connection equipment 119 is connected and/or coupled to the test server 136 via communications link 170. The network equipment 119 typically includes at least one switch (e.g., switch(es) 120) which is a fiber termination switch which terminates the fiber optic cable 160 and at least one router which routes the messages and signals received from the CBSD toward the appropriate endpoint (e.g., to the core network 132, the CBRS Domain Proxy 134, or the test server 136). As previously discussed, the communications link(s) 162 represents a network which couples and/or connects the switches, routers, and other network equipment on the primary backhaul connection path. The communications link(s) 162 may include a combination of optical and/or wired cabling. The network equipment as discussed typically includes at least one switch (e.g., switch(es) 120) which is a fiber optic termination switch where the signal is converted from optical to electrical when received over the fiber optic cable 160 and from electrical to optical when received via the communications links 164, 168, and 184. In such cases, the communications links 164, 168 and 170 are wired cables or network connections. The network equipment typically includes at least one router (e.g., router(s) 122) that performs routing of electrical signals as opposed to optical signals and which couples the network equipment 119 to the core network 132, the CBRS Domain Proxy 134, and the test server 136. The router of the network equipment 119 routes messages toward their intended destination based on addressing information included in the messages. In some embodiments, the entire primary backhaul connection path from either the CBSD 102 or the fiber termination switch 114 to the core network 132, CBRS Proxy 134 and test server 136 is a fiber optic path in which the core network 132, CBRS Domain Proxy 134 and test server 136 include a first interface which is fiber optic interface with a fiber optic port for receiving, transmitting, and processing fiber optic signals.

The cable modem 116 is connected and/or coupled to the Hybrid Fiber Coaxial (HFC) network 124 via communications link 172. The communications link 172 is typically a wired cable (e.g., a coaxial cable). The Hybrid Fiber-Coaxial (HFC) network 124 is a communications network that utilizes both optical fiber cable and coaxial cable. The HFC network 124 is coupled to the Cable Modem Termination System (CMTS) 126 via communications link 174. The communications link 174 is typically a wired cable (e.g., a coaxial cable). The CMTS 126 is connected and/or coupled to the network connection equipment 127 via communications link 176. The communications link 176 is typically a wired cable (e.g., a coaxial cable).

The network equipment 127 is connected and/or coupled to core network 132 via communications link 180. The network equipment 127 is connected and/or coupled to CBRS Domain Proxy 134 via communications link 182. The network equipment 127 is connected and/or coupled to the test server 136 via communications link 184. The switch(es) 120 and router(s) 130 operate on electrical signals. The communications links 180, 182, and 184 are wired communications links (e.g., wired cables)

The core network 132 is connected and/or coupled to the Internet Gateway 138 via communications link 186. The Internet Gateway 138 is connected and/or coupled to the outside network 140 (e.g., the Internet) via communications link 188.

The CBRS Domain Proxy 134 is connected and/or coupled to the Spectrum Access System 142 via communications link 190.

The Spectrum Access System 142 is connected and/or coupled to the ESC system 144 via communications link 192.

The communications links 186, 188, 190, 192 are wired communications links.

It is to be understood, that each of the communications links 164, 168, 170, 180, 182, 184, 186, 188, 190, 192 may be either fiber optic or wired communications links. The physical ports on the devices to which the communications links connect matching the communications link type (i.e., fiber optic communications links being connected to interfaces with fiber optic ports and wired/metal communications links being connected to ports with wired/metal connections). The communications link 158 is a wired communications link. The communications link 156 is typically a wired communications link if the fiber termination switch 114 performs a conversion from optical to electrical signaling. If the fiber termination switch is a termination switch that terminates the fiber optic cable 160 so as to reduce reflections and interference but does not convert the received signal then the communications link 156 is an optical cable and the conversion of between electrical and optical signaling and optical and electrical signaling occurs in the CBSD 102 (e.g., by the first interface 104).

The Internet Gateway 138 connects the core network 132 to the outside network 140 and acts as a point of entry for messages sent to from the outside network. The Internet Gateway 138 performs various services to provide secure communications allows communications with the outside network via external public IP addresses of the core network system.

The Cable Modem Termination System (CMTS) 126 is a device or system that allows exchange of digital signals on a cable network with cable modems (e.g., cable modem 116) of the system. It typically has both Radio Frequency and Ethernet interfaces. In various embodiments, the CMTS 126 receives downstream traffic for cable modems via an Ethernet interface. The CMTS 126 converts this downstream traffic into RF signals which it then transmits to the cable modems via one of its RF interfaces via the HFC network. Upstream traffic passes from the cable modems via the HFC network in RF signals where it is received at an RF interfaces of CMTS is converted to Ethernet signals and sent upstream via an Ethernet port toward its destination. The CMTS 126 carries Internet Protocol traffic, and it both transmits and receives digital cable modem signals on HFC network. The CMTS 126 transmits signals to the cable modem 116 and also receives signals from cable modem 116, converting them into IP packets and routing them to their destination (e.g., the core network 180, CBRS Domain Proxy 134, and test server 136.

The Spectrum Access System 142 is responsible for managing the allocation and usage of CBRS spectrum including CBRS Priority Access Licensed (PAL) spectrum and General Authorized Access (GAA) spectrum which is unlicensed spectrum) in the CBRS network.

The Environmental Sensing Capability (ESC) system 144 performs the function of detecting the presence (or absence) of a signal from a non-informing incumbent user. Information about the non-informing incumbent user's presence, originating in the ESC, is required by the SAS 142 to effect the protection of the non-informing incumbent user spectrum operation. This is achieved by the Spectrum Access System selectively authorizing or de-authorizing CBSD operations (e.g., allocation, authorization, de-authorization, de-allocation of CBSD spectrum for the CBSD's use to communicate with user equipment devices).

The CBRS Domain Proxy 134 serves as an SAS managing intermediary such that the SAS communicates directly with the CBRS Domain-Proxy for the operator of a CBRS network rather than with each individual CBSD of the operator. While only a single CSBD is shown in system 100, there are typically plurality of CBSDs (e.g., hundreds in a particular area) which all communicate to the SAS 142 via the CBRS Domain Proxy 134. This reduces the number of messages being received and processed by the SAS 142 as the CBRS Domain Proxy 134 can send a single message including a payload with requests from a plurality of CBSDs. In some embodiments, the CBSD communicates with the Spectrum Access System 142 directly without going through the CBRS Domain Proxy 134. In such cases, the network equipment device 119 and network equipment device 127 are connected and/or coupled to the Spectrum Access System 142. In such cases, communications link 168 couples the network equipment device 119 to SAS 142 instead of the CBRS Domain Proxy 134. And, communications link 182 couples the network equipment device 127 to SAS 142 instead of the CBRS Domain Proxy 134.

The cable modem 116 performs the function of a network bridge that provides bi-directional data communication via radio frequency channels on a hybrid fiber-coaxial (HFC). The cable modem 116 receives Internet Protocol signals/messages via its Ethernet port from the CBSD and converts these to RF signals and sends them to the CMTS via the HFC network.

The cable modem 116, HFC network 124, CMTS 126 and network equipment 127 are part of a cable network which provides cable services to homes and businesses. While the cable network in some embodiments is owned and/or operated by a different entity than the CBRS wireless network, in most embodiments, the CBRS wireless network and the cable network are operated and/or owned by the same entity (e.g., a Multiple System Operator such as for example Chater). In this example, system 100 is operated by a single entity (e.g., an MSO). In various embodiments, all of the devices except the user equipment devices are owned by the MSO. The user equipment devices being subscribers of the wireless network and including one or more SIM cards or eSIM cards with subscription information allowing them to access the CBRS network and obtain services from the CBSD 102.

The test server 136 is an application server that receives test messages (e.g., continuity test messages) in the form of ping messages from CBSDs of the CBRS network including CBSD 102 and responds to the test messages with ping response messages. The test server 136 in some embodiments is hosted in a data center. In some embodiments, the test server 136 is hosted in a cloud.

In some embodiments, the core network 132 is a 5G core network including variety of functions implemented on one or more network equipment devices or servers such as for example, a User Plane Function (UPF), a Network Slice Selection Function (NSSF), an Authentication Server Function (AUSF), an Unified Data Management Function (UDM), an Access and Mobility Management Function (AMF), a Session Management Function (SMF), a Policy Control Function (PCF), and an Application Function (AF). The system 100 wireless core network 132 for example may includes a user plane which includes the UPF component and a control plane which includes the NSSF, AUSF, UDM, AM, SMF, PCF, and AF components. The user plane function component of the system 100 is coupled Internet Gateway 138. The core network provides security functions, data management function, and connectivity functions connecting the base stations (e.g., CBSDs) to the outside network (e.g., the Internet).

In accordance with FCC rules and regulations, the CBSDs in CBRS systems operate that is utilize spectrum in accordance with instructions from the Spectrum Access System which manages the spectrum. In CBRS wireless networks, the spectrum is shared among different levels of users (Tier 1 incumbent users (highest priority), Tier 2 Priority Access License users (second highest priority) and Tier 3 General Authorized Access users (lowest priority). The Spectrum Access System manages the use of the spectrum by the different users thereby ensuring the protection of higher priority users. As a result, a CBSD needs to have a connection path over which it can exchange messages with the Spectrum Access System or with a CBRS Domain Proxy which is acting an intermediary to relay messages between the CBSD and the Spectrum Access System. For the CBSD to be able to utilize spectrum it must not only request one or more spectrum grants from the Spectrum Access System, the CBSD must also request authorization to utilize (e.g., transmit on) the spectrum of the spectrum grant from the Spectrum Access System before transmitting using spectrum of a spectrum grant. The CBSD must also send the Spectrum Access System (e.g., via the CBRS Domain Proxy) requests for re-authorization to continue to use the spectrum of spectrum grant before a period or interval of time expires. These requests for authorization to utilize or transmit on spectrum of a spectrum grant are referred to as heartbeat requests. The heartbeat request is used to ask the Spectrum Access System if the CBSD can transmit with the parameters it sent in the grant request (e.g., spectrum and power parameters). A heartbeat request must be sent by the CBSD to the Spectrum Access System (e.g., via the CBRS Domain Proxy) for each spectrum grant of the CBSD. The Spectrum Access System upon receipt of a heartbeat request can (i) approve request, i.e. authorize the grant which allows the CBSD to start or continue to transmit using the spectrum; (ii) terminate the grant which requires the CBSD to not transmit using the spectrum of the grant (e.g., this is done when the SAS can't allow the CBSD to transmit on the spectrum of the grant so as to protect incumbents) (ii) suspend the grant in which case the CBSD isn't allowed to transmit at the moment but might be able to transmit again at some point in the future . . . .

When the Spectrum Access System approves the heartbeat request in its heartbeat response, the CBSD is authorized to transmit until a transmitExpireTime, which is in some embodiments 240 seconds after the heartbeat. To ensure that the CBSD can continue to transmit, the CBSD must send a heartbeat request to the Spectrum Access System at least once before the transmitExpireTime. In various systems, it is recommended that to maximize uptime and reliability of CBSDs connected to Spectrum Access System, the CBSD should heartbeat every 60 seconds, which is referred to as the heartbeatInterval. If the CBSD does not receive a heartbeat response from Spectrum Access System after a period of time (e.g., 30 seconds, it sends another heartbeat request, known as a retry Interval. The heartbeatInterval is configured to maximize uptime of the CBRS network with Spectrum Access System. If no heartbeat response message is received by the CBSD from the Spectrum Access System within a fixed period of time, the CBSD can not continue to transmit on the spectrum of the grant and must cease utilizing the spectrum causes interruptions in service with the user equipment devices it is providing services too. Similarly, the Spectrum Access System can send instructions at any time for the CBSD indicating that a spectrum grant has been revoked to protect other users (e.g., protect against interference with incumbent users communications such as the U.S. Navy) in which case the CBSD must cease use of the spectrum of the spectrum grant which has been revoked within a specific time period. If the connection between the CBSD and the Spectrum Access System (or the CBRS Domain Proxy which is acting as an intermediary) is negatively impacted such as a malfunction or failure and the CBSD can not communicate with the Spectrum Access System, the CBSD will be required to cease wirelessly transmitting and hence there will be a service interruption for the user equipment devices for which it is providing services. The connection between the CBSD and the CBRS Domain Proxy which is acting as intermediary for the CBSD to the Spectrum Access System is highly critical. When it fails the CBSD will need to cease operation (e.g., wirelessly transmitting to the user equipment devices) in a very short time window (e.g., within 60 seconds) from the failure. This is so because the CBSD must according to regulations respond to commands and instructions from a controlling Spectrum Access System (e.g., change power transmission level or cease transmitting within 60 seconds) within a very short period of time.

As a result, the backhaul connection path used for communicating (e.g., exchanging messages) between the CBSD and the CBRS Domain Proxy is critical. Exemplary system 100 provides both a primary backhaul connection path and a secondary backhaul connection path so as to eliminate and/or minimize service interruptions and the operation of the CBSD. In various embodiments, once the CBSD detects a problem (e.g., a failure (total loss of connection) or an unacceptable delay, the CBSD can commence utilizing the secondary backhaul connection path. Because the speed at which the detection of a problem which will affect or potentially affect services or CBSD operation, is critical as described above, a mechanism is implemented to continuously test the primary backhaul connection path when it is being used and upon a problem being detected, switching by the CBSD from a first mode of operation to second mode of operation, the second mode of operation being one in which the CBSD utilizes the secondary backhaul connection path for communicating with the CBRS Domain Proxy and the core network. In some embodiments, the CBSD tests the secondary backhaul connection path prior to making the switch to ensure the secondary backhaul connection path can be utilized and ensure a smooth transmission so that messages aren't lost or need to be resent.

When the cable modem system via which the secondary backhaul connection is established, is not owned and/or operated by the same operator and/or owner of as CBRS wireless network, messages exchanged between the CBSD and the CBRS Proxy are encrypted so that the communications are secure. In at least some embodiments, messages exchanged between the CBSD and the core network are also encrypted so as to provide secure communications for those exchanges as well.

In system 100, the CBSD 102 is implemented as gNodeB. Unlike in conventional CBSDs and gNodeBs, the CBSD 102 has a dual backhaul connection paths. The primary backhaul connection path is a fiber optic backhaul connection path and the secondary backhaul connection path is via a cable network and CMTS. The fiber optic backhaul connection path is selected by the CBSD as the primary backhaul connection path because it has less latency and more bandwidth compared to the CMTS backhaul connection path.

The CBSD 102 when utilizing the primary backhaul connection path to communicate with the core network and CBRS Domain Proxy generates and transmits continuous ping messages to the test server 136 via the primary backhaul connection path. The test server 136 is located or hosted in a data center or a cloud 199. The CBSD 102 also once it commences sending the ping messages begins monitoring for ping response messages. The test server 136 responds to each ping message it receives by generating and transmitting back to the CBSD 102 a ping response message. When the CBSD 102 via its monitoring determines that there is problem with the primary backhaul connection path, it tests the secondary backhaul connection path.

The CBSD 102 in some embodiments, determines that there is a problem with the primary backhaul connection path when it determines via its monitoring that it has not received any ping response messages from the test server for a first period of time (e.g., no response ping packets received for 15 seconds). In some embodiments, the CBSD 102 determines that there is a problem with the primary backhaul connection when a specific number of consecutive ping response messages or packets (e.g., 15) are not received from the test server 136 in a first period of time (e.g., the first period of time being based on a round trip time for ping messages sent from the CBSD 102 to test server 136). The first period of time can also be a sliding window of size T1 (e.g., 15 seconds) that resets each time a ping response message is received.

The CBSD 102 tests the secondary backhaul connection path by switching its logical interface for the backhaul connection from the first interface to the second interface and commences continuously transmitting ping messages or packets to the test server 136 via the secondary backhaul connection path for a second period of time and begins monitoring the secondary backhaul connection path for response ping messages or packets from the test server 136.

If the CBSD 102 via its monitoring detects that for a third period of time (e.g., 15 seconds), it is receiving ping response messages from the test server 136 via the secondary backhaul connection path in response to the ping messages it is transmitting, the CBSD 102 determines that the test of the secondary backhaul connection path has been successful. In response to determining that the test of the secondary backhaul connection path has been successfully, the CBSD 102 determines to switch from utilizing the primary backhaul connection path for communicating with core network 132 and the CBRS Domain Proxy 134. In response to determining to switch from the primary backhaul connection path to the secondary backhaul connection path, the CBSD 102 switches to utilizing the secondary backhaul connection path for communicating with the core network 132 and the CBRS Domain Proxy 134. This allows the CBSD 102 to remain in a serving state in which it can continue to communicate with the CBRS Domain Proxy and thereby continue to provide obtain authorization to utilize spectrum for communicating and providing services to the user equipment devices (e.g., UE 1 108, UE 2 110, . . . , UEN 112) connected to the CBSD 102. For example, by being able to send and receive requests and response for the use of spectrum (e.g., by sending spectrum heartbeat requests to the Spectrum Access System 142 via the CBRS Domain Proxy 134 and receiving from the Spectrum Access System 142 via the CBRS Domain Proxy 134 spectrum heartbeat request responses authorizing the use or continued use of spectrum identified in a spectrum grant. The switchover by the CBSD 102 from the primary backhaul connection path to the secondary backhaul connection path avoids and/or minimizes service interruptions for user equipment devices. For example, service interruptions are avoided for user equipment devices for which spectrum utilization is able to be re-authorization by CBSD 102 via communications with the Spectrum Access System 142 via the CBRS Domain Proxy 134 prior to the expiration of a heartbeat interval. Services interruptions are minimized for user equipment devices when the spectrum grant authorization for the spectrum being utilized by the user equipment devices is not re-authorized due to a failure to send a spectrum heartbeat request within the prescribed time interval but a new authorization or re-authorization is provided by the Spectrum Access System shortly after the secondary backhaul connection path switchover occurs. If no secondary backhaul connection path where available the CBSD 102 would have to completely shutdown because it would not be able to obtain authorization for transmitting on spectrum of spectrum grants or comply with FCC rules and/or regulations regarding CBSD operation when utilizing CBRS shared spectrum. In various embodiments, the CBSD after switching over from the primary backhaul connection path to the secondary backhaul connection path ceasing sending ping messages to the test server 136. This avoids taking up bandwidth on the secondary backhaul connection path. The ping messages also are not beneficial as their are no additional backhaul connection path to switch to as the primary backhaul connection path has problem (e.g., has failed).

In some embodiments, the CBSD 102 does not perform a test of the secondary backhaul connection path but instead upon the detection of the problem (e.g., failure of the primary backhaul connection path) begins to immediately utilize the secondary backhaul connection path for communications with the CBRS Domain Proxy 134 and the core network 132.

In some embodiments, the CBSD 102 upon the detection of the problem with primary backhaul connection, notifies the CMTS that it requires a high bandwidth connection be established for the secondary backhaul connection path and that the messages from and to the cable modem 116 exchanged with the CBRS Domain Proxy 134 are to be given high priority (e.g., a high QoS) so as to ensure that the CBSD 102 can contain operate while utilizing the secondary backhaul connection path. The CMTS 126 in some embodiments, reduces the bandwidth provided to other cable modems to provide additional bandwidth to the cable modem 116 and/or prioritizes the cable modem 116 messages to and from the CBRS Domain Proxy 134 over the messages of other cable modems.

In some embodiments, the test of the second backhaul connection is performed by the CBSD 102 transmitting a first threshold number of ping messages (e.g., first threshold number=15) to the test server 136 via the secondary backhaul connection path and then monitor the secondary backhaul connection path for the receipt of the threshold number of ping response messages from the test server 136 to occur within a fourth time period. If CBSD 102 via its monitoring determines that ping response messages are received from the test server 136 for each of the first threshold number of ping messages sent, then the CBSD 102 determines that the test of the secondary backhaul connection path has been successful.

In some embodiments, after the CBSD 102 switches from utilizing the primary backhaul connection path for communications with the CBRS Domain Proxy 134 and the core network 132 to utilizing the secondary backhaul connection path, the CBSD 102 periodically, e.g., every 60 minutes, checks or tests the primary backhaul connection path. Upon the CBSD 102 determining that a check or test of the primary backhaul connection path has been successful, the CBSD 102 determines to switch from utilizing the secondary backhaul connection path for communicating with the CBRS Domain Proxy 134 and the core network 132 to utilizing the primary backhaul connection path for communicating with the CBRS Domain Proxy 134 and the core network 132. Upon switching back to utilizing the primary backhaul connection path for communicating with the core network 132 and the CBRS Domain Proxy 134, the CBSD 102 commences transmitting continuous ping messages to the test server 136 via the primary backhaul connection path and monitoring to determine if there is a problem with the primary backhaul connection path as previously described.

In some embodiments, in response to the successful test of the primary backhaul connection path, the CBSD 102 switches from operating in a second mode of operation in which it utilizes the secondary backhaul connection path and performs periodic checks and/or tests of the primary backhaul connection path to operating in a first mode of operation in which it utilizes the primary backhaul connection path for communicating with the CBRS Domain Proxy 134 and core network 132. In the first mode of operation, the CBSD 102 also performs continuous ping message testing on the primary backhaul connection path as previously described.

The CBSD 102 may, and in some embodiments does, perform the test of the primary backhaul connection path by transmitting a second threshold number of ping messages (e.g., second threshold number=15) to the test server 136 via the primary backhaul connection path and then monitor the primary backhaul connection path for the receipt of the second threshold number of ping response messages from the test server 136 to occur within a fifth time period. If CBSD 102 via its monitoring determines that ping response messages are received from the test server 136 for each of the second threshold number of ping messages sent, then the CBSD 102 determines that the test of the primary backhaul connection path has been successful.

The CBSD 102 may, and in some embodiments does, perform the test of the primary backhaul connection path by commencing the transmission of continuous ping messages to the test server 136 via the primary backhaul connection path and then monitoring the primary backhaul connection path for the receipt of ping response messages from the test server 136 in response to the ping messages sent. If CBSD 102 via its monitoring determines that ping response messages are received from the test server 136 for each of the ping messages sent within a sixth period of time (e.g., 15 seconds), then the CBSD 102 determines that the test of the primary backhaul connection path has been successful.

Various features of different embodiments of the invention will now be discussed. As previously discussed, in some embodiments the wireless base station of the system is implemented as a gNodeB. When the wireless network is a CBRS wireless network implemented in accordance with 5G, the wireless base stations of the wireless network are CBSDs which are implemented as gNodeBs. The CBSD to operate successfully requires a Spectrum System Access authorization and a 5G core network connection to transmit using CBRS spectrum and serve the end users of the wireless network. While in conventional wireless networks, the wireless base station has only one backhaul connection for reaching out to the 5G core network and the CBRS Domain Proxy which acts as the intermediary between the CBSDs and the Spectrum Access System, when this single backhaul connection has problems (e.g., fails) the CBSD will be out of service because it can not obtain authorization from the Spectrum Access System to transmit using CBRS spectrum resulting in no service being provided by the CBSD for the end users (e.g., user equipment devices) within its wireless coverage area. In various embodiments of the present invention, the CBSD has two backhaul connections simultaneously. A fiber optic backhaul connection is the primary backhaul connection and an Ethernet connection from a Cable Modem Termination System is the secondary backhaul connection. The fiber backhaul connection is the primary backhaul connection for the CBSD because it has less latency and more bandwidth than the second backhaul connection via the Cable Modem Termination System.

In various embodiments, the CBSD has a performance test application or component (e.g., Iperf client application or component) installed and executing. While the CBSD is operating in a first mode of operation in which it is utilizing the primary backhaul connection to communicate with the 5G core network and the Spectrum Access System via the CBRS Domain Proxy, the test application runs a continuous ping routine in which it continuously transmits 32 Byte ping messages to a test server (e.g., application server) hosted either in a Data Center or a Cloud. The performance test application (e.g., Iperf client application) of the CBSD then monitors for the failure to receive ping response messages from the test server. When the performance test application of the CBSD detects that more than 15 consecutive packets have been lost, the CBSD switches the backhaul connection from the primary backhaul connection to the secondary backhaul connection. The performance test application of the CBSD then transmits 15 ping test packets to the test server via the secondary backhaul connection and monitors to the secondary backhaul connection for ping responses messages from the test server. If all packets were successful in reaching the test server via the receipt of 15 ping response test packets from the test server in response to the ping packets, the CBSD determines to switch from the first mode of operation to the second mode of operation.

Once the CBSD has switched to the second mode of operation, the CBSD re-routes all CBRS Domain Proxy and 5G core network traffic (e.g., messages) via the secondary backhaul connection. Thus, the CBSD 102 remains online and can continue obtain authorization to transmit using the CBRS spectrum and thus provide services to user equipment devices. The CBSD test application typically ceases to send ping messages to the test server. This preserves bandwidth for use in communicating with the CBRS Domain Proxy and 5G core network.

As the primary backhaul connection has less latency and more bandwidth than the secondary backhaul connection, its use more efficient and can provide a better quality of service for the user equipment devices, as such it is preferably to use the primary backhaul connection as opposed to the secondary backhaul connection. While operating in the second mode of operation and utilizing the secondary backhaul connection for communicating with the 5G core network and the CBRS Domain Proxy, the CBSD periodically (e.g., every 60 minutes) checks on the state of the primary backhaul connection. The CBSD checks on the state of the primary backhaul connection by having the test application of the CBSD transmit 15 ping 32Byte packets to the test server via the primary backhaul connection path and then monitors the primary backhaul connection path for ping response messages from the test server. If the test application of the CBSD receives a ping response message for each of the 15 ping packets sent to the test server, the CBSD decides to switch from operating in the second mode of operation to operating in the first mode of operation.

The CBSD then switches from operating in the second mode of operation to operating in the first mode of operation where it switches from utilizing the secondary backhaul connection to utilizing the primary backhaul connection or communicating with the 5G core and the Spectrum Access System via the CBRS Domain Proxy. The test application of the CBSD also once again commences sending via the primary backhaul connection continuous ping messages to the test server and monitoring the primary backhaul connection to determine if there is problem as previously discussed by the failure to receive 15 consecutive ping packet response messages.

While the failure to receive 15 consecutive ping response messages has been utilized to determine a problem (e.g., a failure of the backhaul connection path), the number 15 is only exemplary and a different number may be utilized. In various embodiments, the number of consecutive lost ping packets or messages to determine a failure of a backhaul connection is based on CBSD operation requirements such as on a spectrum authorization request interval (e.g., heartbeat interval) during which the CBSD must request re-authorization of spectrum for use. The number of consecutive lost ping packets being chosen so as to avoid or minimize the service interruptions because the spectrum authorization requests are not timely and the CBSD loses the ability to transmit using spectrum which was not re-authorized during the failure of the primary backhaul connection path.

Figure 2:
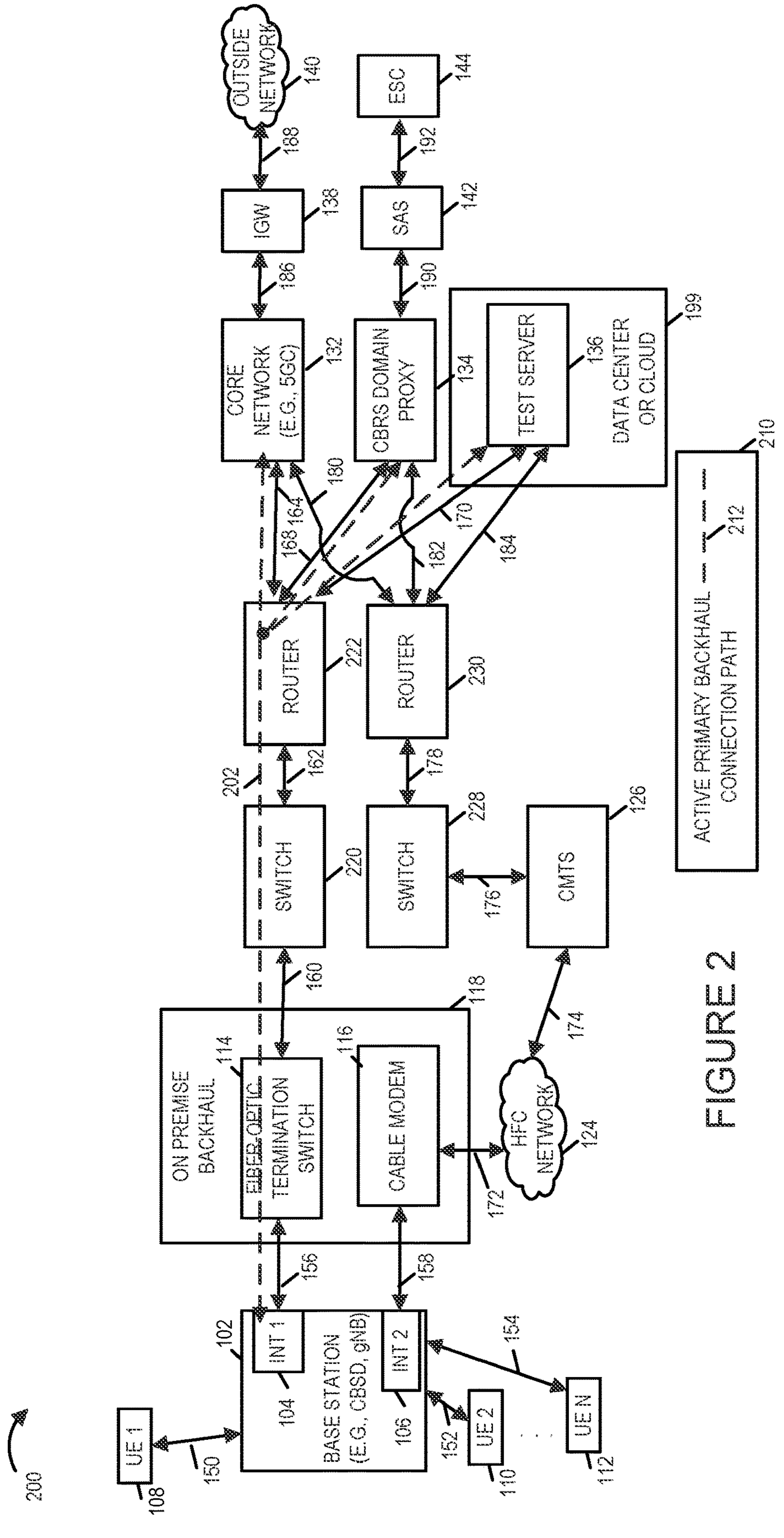
FIG. 2 illustrates the use of a primary backhaul connection path of a system in accordance with an embodiment of the present invention.

FIG. 2 illustrates a system 200 in accordance with an embodiment of the present invention. Elements or steps with the same reference numbers used in different figures are the same or similar and those elements or steps will not be described in detail again. The system 200 illustrates the system 100 wherein the CBSD 102's primary backhaul connection path is active, the network equipment 119 of system 100 includes a single switch 220 (e.g., a fiber optic termination switch) and a router 222, and the network equipment 127 includes a switch 228 and a router 230. As the legend 210 indicates the dashed line "------" 212 indicates the active primary backhaul connection path. The primary backhaul connection path 202 is shown in system 200 as the dashed line 202. The path starts as the CBSD 102 interface 1 104 (e.g., fiber port) and traverses communications link 156, fiber optic termination switch 114, communications link 160, switch 220, communications link 162, router 222 and communications links 164 to core network 132, communications link 168 to CBRS Domain Proxy 134 and communications link 170 to the test server 136. The router 222 routing messages from the CBSD to core network 132, CBRS Domain Proxy 134, and test server 136 via the use of address information (e.g., Internet Protocol addresses included in the messages). The router 222 routes messages from the core network 132, the CBRS Domain Proxy 134, and the test server 136 to the CBSD based on address information (e.g., IP address information included in the messages received from the core network 132, the CBRS Domain Proxy 134 and the test server 136 destined for the CBSD 102.

For example, messages sent from UE 1 108 to the CBSD 102 for an entity in the outside network 140 would traverse the following path when the primary backhaul connection path is active (e.g., when the CBSD is operating in a first mode of operation). The messages from UE 1 108 received by the CBSD 102 are transmitted from the interface 1 104 of the CBSD over communications link 156 to the fiber optic termination switch 114. These signals are typically transmitted as electrical signals. The fiber optic termination switch 114 converts the electrical signals to optical signals and transmits them over communications link 160 which is a fiber optic cable in this example. The switch 220 in this example is a fiber optic termination switch to which fiber optic cable 160 is connected. The switch 220 receives the messages as optical signals and converts them back to electrical signals. The switch 220 transmits the messages to the router 222 via communications link 162. The router 222 determines by the destination address in the messages that the messages are destined for an entity in the outside network 140 and routes the messages to the core network 132 by transmitting the messages to a network device in the core network 132 via communications link 164. The core network 132 receives the messages, determines based on address information in the messages that the messages destination is in the outside network 140 and transmits the messages to the Internet Gateway 138 via communications link 186. The Internet Gateway receives the messages, determines based on address information in the messages that the messages destination is in the outside network 140 and transmits the messages to the outside network 140 via the communications link 188. Messages communicated from entities, e.g., communications devices, in the outside network 140 to user equipment device 1 108 follow the reverse path when the primary backhaul connection path is active.

Messages transmitted or communicated from CBSD 102 (e.g., request messages, reporting messages, etc.) to the CBRS Domain Proxy 134 with information to be sent on to Spectrum Access System 142 traverse the following path when the primary backhaul connection path is active (e.g., when the CBSD is operating in a first mode of operation). The messages generated by the CBSD 102 for the CBRS Domain Proxy 134 are transmitted from the interface 1 104 of the CBSD over communications link 156 to the fiber optic termination switch 114. These signals are typically transmitted as electrical signals. The fiber optic termination switch 114 converts the electrical signals to optical signals and transmits them over communications link 160 which is a fiber optic cable in this example. The switch 220 in this example is a fiber optic termination switch to which fiber optic cable 160 is connected. The switch 220 receives the messages as optical signals and converts them back to electrical signals. The switch 220 transmits the messages to the router 222 via communications link 162. The router 222 determines by the destination address in the messages that the messages are destined for CBRS Domain Proxy 134 and routes the messages to the CBRS Domain Proxy 134 by transmitting the messages via communications link 168 to the CBRS Domain Proxy 134. The CBRS Domain Proxy 134 receives the messages and transmits the requests and reporting information in the messages to the Spectrum Access System 142 via communications link 190. This is typically done by the CBRS Domain Proxy 134 aggregating the requests and reporting information from CBSD 102 with requests and reporting information from other CBSDs of the wireless system before transmitting them to the Spectrum Access System 142. Response messages and instructions from the Spectrum Access System 142 to the CBSD 102 are communicated along the above discussed path in reverse order when CBSD 102's primary backhaul connection path is active. That is SAS 142 to CBRS Domain Proxy 134 via communication link 190, from CBRS Domain Proxy 134 to router 222 via communications link 168, from router 222 to switch 220 via communications link 162, from switch 220 via communications link 160 to fiber optic termination switch 114, from fiber optic termination switch 114 to interface 1 104 of CBSD 102 via communications link 156.

Ping messages (e.g., ping packets) transmitted or communicated from CBSD 102 to test server 136 traverse the following path when the primary backhaul connection path is active (e.g., when the CBSD is operating in a first mode of operation). The ping messages generated by the CBSD 102 are transmitted from the interface 1 104 of the CBSD over communications link 156 to the fiber optic termination switch 114. These signals are typically transmitted as electrical signals. The fiber optic termination switch 114 converts the electrical signals to optical signals and transmits them over communications link 160 which is a fiber optic cable in this example. The switch 220 in this example is a fiber optic termination switch to which fiber optic cable 160 is connected. The switch 220 receives the ping messages as optical signals and converts them back to electrical signals. The switch 220 transmits the messages to the router 222 via communications link 162. The router 222 determines by the destination address in the ping messages that the ping messages are destined for test server 136 and routes the messages to the test server 136 by transmitting the messages via communications link 170 to the test server 136. The test server 136 receives the ping messages. The ping response messages generated and communicated to the CBSD 102 from the test server traverse the above described path in reverse. That is test server 136 to router 222 via communications link 170, from router 222 to switch 220 via communications link 162, from switch 220 via communications link 160 to fiber optic termination switch 114, from fiber optic termination switch 114 to interface 1 104 of CBSD 102 via communications link 156.

Figure 3:
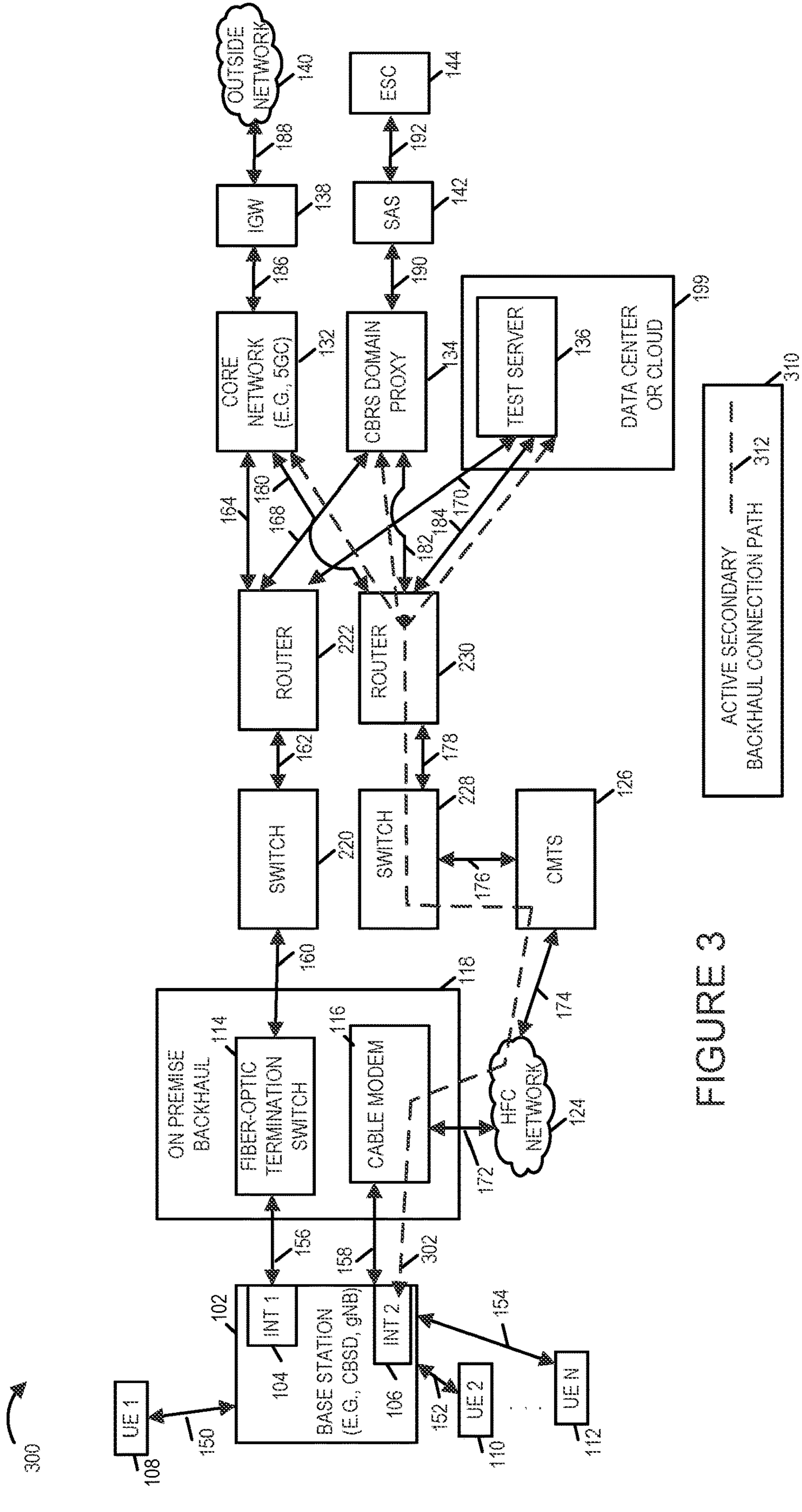
FIG. 3 illustrates the use of a second backhaul connection path of a system in accordance with an embodiment of the present invention.

FIG. 3 illustrates a system 300 in accordance with an embodiment of the present invention. Elements or steps with the same reference numbers used in different figures are the same or similar and those elements or steps will not be described in detail again. The system 300 illustrates the system 100 wherein the CBSD 102's secondary backhaul connection path is active, the network equipment 119 of system 100 includes a single switch 220 (e.g., a fiber optic termination switch) and a router 222, and the network equipment 127 includes a switch 228 and a router 230. As the legend 310 indicates the dashed line "------" 312 indicates the active secondary backhaul connection path. The secondary backhaul connection path 302 is shown in system 300 as the dashed line 302. The path starts as the CBSD 102 interface 2 106 (e.g., Ethernet port) and traverses communications link 158, cable modem 116, communications link 172, HFC Network (124), communications link 174, CMTS 126, communications link 176, switch 228, communications link 178, router 230 and communications links 180 to core network 132, communications link 182 to CBRS Domain Proxy 134 and communications link 184 to the test server 136. The router 230 routing messages from the CBSD 102 to core network 132, CBRS Domain Proxy 134, and test server 136 via the use of address information (e.g., Internet Protocol addresses included in the messages). The router 230 routes messages from the core network 132, the CBRS Domain Proxy 134, and the test server 136 to the CBSD 102 based on address information (e.g., IP address information included in the messages received from the core network 132, the CBRS Domain Proxy 134 and the test server 136 destined for the CBSD 102.

For example, messages sent from UE 1 108 to the CBSD 102 for an entity in the outside network 140 would traverse the following path when the secondary backhaul connection path is active (e.g., when the CBSD 102 is operating in a second mode of operation). The messages from UE 1 108 received by the CBSD 102 are transmitted from the interface 2 104 of the CBSD 102 over communications link 158 to the cable modem 116. These signals are typically transmitted as electrical signals (e.g., Ethernet Internet Protocol signals). The cable modem 116 converts the electrical signals to radio frequency signals and transmits them over communications link 172 as cable modem signals to the HRC network 124. The HFC network 124 transmits the signals via communications link 174 to the CMTS 126. The CMTS 126 converts the radio frequency signals to Internet Protocol signals. The CMTS 126 transmits the messages to switch 228 via communications link 176. The switch 228 receives the messages and transmits the messages to the router 230 via communications link 178. The router 230 determines by the destination address in the messages that the messages are destined for an entity in the outside network 140 and routes the messages to the core network 132 by transmitting the messages to a network device in the core network 132 via communications link 180. The core network 132 receives the messages, determines based on address information in the messages that the messages destination is in the outside network 140 and transmits the messages to the Internet Gateway 138 via communications link 186. The Internet Gateway receives the messages, determines based on address information in the messages that the messages destination are in the outside network 140 and transmits the messages to the outside network 140 via the communications link 188. Messages communicated from entities, e.g., communications devices, in the outside network 140 to user equipment device 1 108 follow the reverse path when the secondary backhaul connection path is active.

Messages transmitted or communicated from CBSD 102 (e.g., request messages, reporting messages, etc.) to the CBRS Domain Proxy 134 with information to be sent on to Spectrum Access System 142 traverse the following path when the secondary backhaul connection path is active (e.g., when the CBSD is operating in a second mode of operation). The messages generated by the CBSD 102 for the CBRS Domain Proxy 134 are transmitted from the interface 2 106 of the CBSD 102 over communications link 158 to the cable modem 116. These signals are typically transmitted as electrical signals (e.g., Ethernet Internet Protocol signals). The cable modem 116 converts the electrical signals to radio frequency signals and transmits them over communications link 172 as cable modem signals to the HRC network 124. The HFC network 124 transmits the signals via communications link 174 to the CMTS 126. The CMTS 126 converts the radio frequency signals to Internet Protocol signals. The CMTS 126 transmits the messages to switch 228 via communications link 176. The switch 228 receives the messages and transmits the messages to the router 230 via communications link 178. The router 230 determines by the destination address in the messages that the messages are destined for the CBRS Domain Proxy 134 and routes the messages to the CBRS Domain Proxy 134 by transmitting the messages via communications link 182. The CBRS Domain Proxy 134 receives the messages and transmits the requests and reporting information in the messages to the Spectrum Access System 142 via communications link 190. This is typically done by the CBRS Domain Proxy 134 aggregating the requests and reporting information from CBSD 102 with requests and reporting information from other CBSDs of the wireless system before transmitting them to the Spectrum Access System 142. Response messages and instructions from the Spectrum Access System 142 to the CBSD 102 are communicated along the above discussed path in reverse order when the secondary backhaul connection path is active. That is SAS 142 to CBRS Domain Proxy 134 via communication link 190, from CBRS Domain Proxy 134 to router 230 via communications link 182, from router 230 to switch 228 via communications link 178, from switch 228 via communications link 176 to CMTS 126, from CMTS 126 to HFC network 124 via communications link 174, from HFC network 124 to cable modem 116 via communications link 172, from cable modem 116 to interface 2 106 of the CBSD 102 via communications link 158.

Ping messages (e.g., ping packets) transmitted or communicated from CBSD 102 to test server 136 traverse the following path when the secondary backhaul connection path is active (e.g., when the CBSD is operating in a second mode of operation). The ping messages generated by the CBSD 102 are transmitted from the interface 2 106 of the CBSD 102 over communications link 158 to the cable modem 116. These signals are typically transmitted as electrical signals (e.g., Ethernet Internet Protocol signals). The cable modem 116 converts the electrical signals to radio frequency signals and transmits them over communications link 172 as cable modem signals to the HRC network 124. The HFC network 124 transmits the signals via communications link 174 to the CMTS 126. The CMTS 126 converts the radio frequency signals to Internet Protocol signals. The CMTS 126 transmits the ping messages to switch 228 via communications link 176. The switch 228 receives the ping messages and transmits the ping messages to the router 230 via communications link 178. The router 230 determines by the destination address in the ping messages that the ping messages are destined for the test server 136 and routes the messages to the test server 136 by transmitting the messages via communications link 184. The test server 136 receives the ping messages. The ping response messages generated and communicated to the CBSD 102 from the test server 136 traverse the above described path in reverse order when the CBSD 102 secondary backhaul connection path is active.

That is ping response messages travel from the test server 136 to the router 230 via communication link 184, from router 230 to switch 228 via communications link 178, from switch 228 via communications link 176 to CMTS 126, from CMTS 126 to HFC network 124 via communications link 174, from HFC network 124 to cable modem 116 via communications link 172, from cable modem 116 to interface 2 106 of the CBSD 102 via communications link 158.

In some embodiments, one or more of the following are co-located: switch 220, router 222, switch 228, router 230, core network 132, CBRS Domain Proxy 134, test server 136. In some embodiments the router 230 and the router 222 are the same router.

Figure 10A:
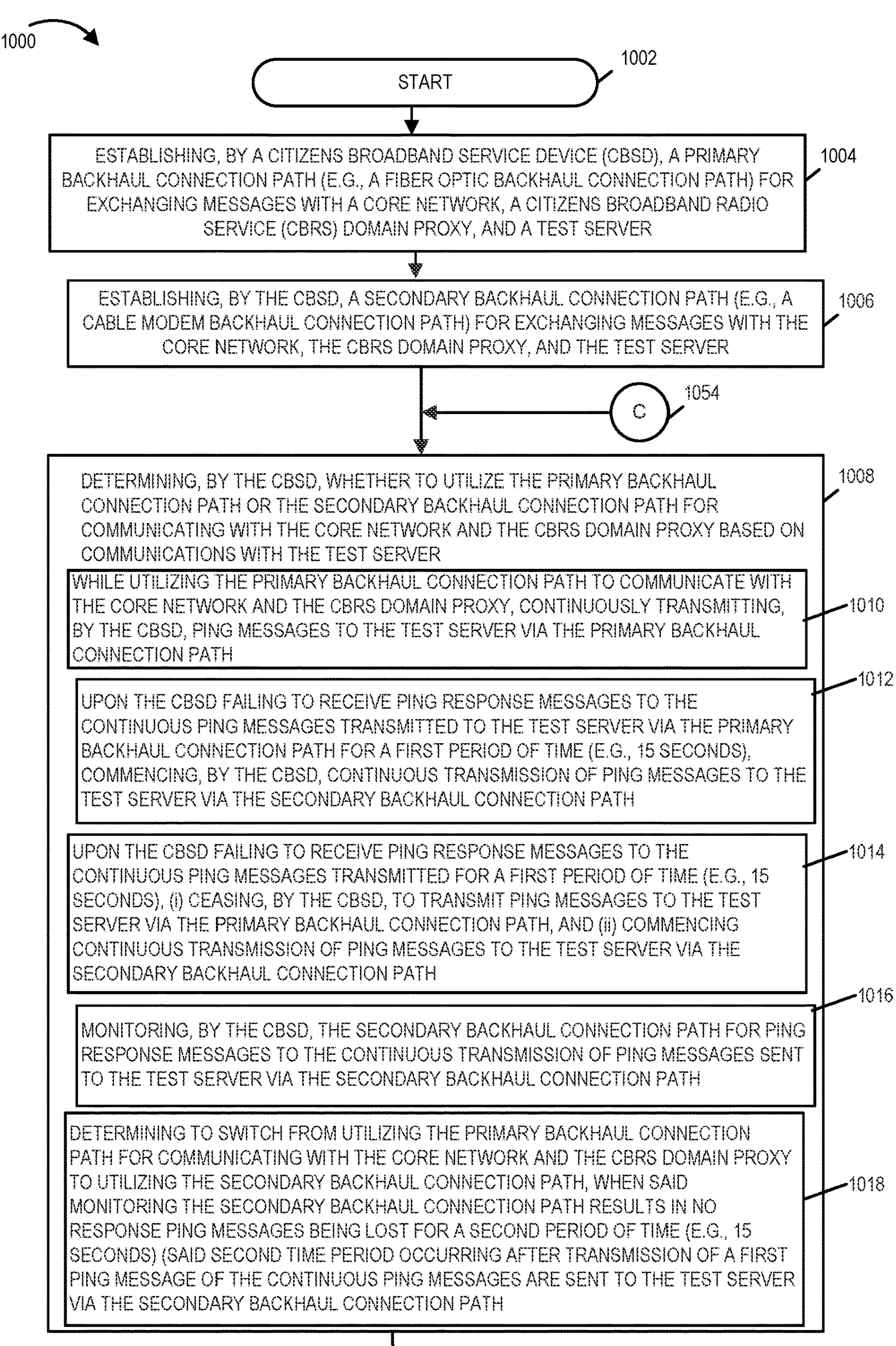
FIG. 10A illustrates the first part of a flowchart of an exemplary method in accordance with an embodiment of the present invention.
Figures 10, 10C:
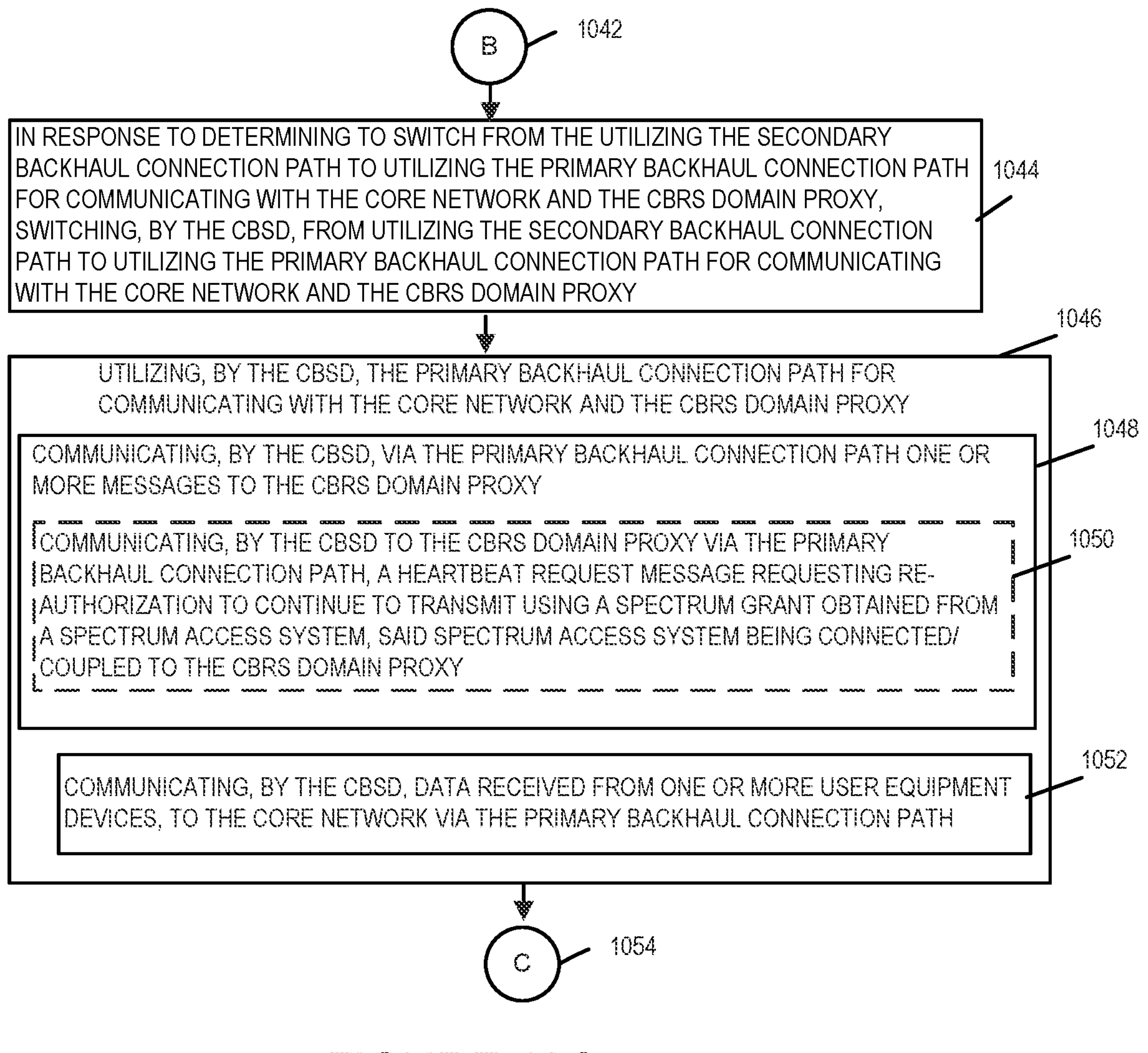
FIG. 10C illustrates the third part of a flowchart of an exemplary method in accordance with an embodiment of the present invention.
FIG. 10 illustrates the combination of FIG. 10A, FIG. 10B, and FIG. 10C.

FIG. 10 illustrates the combination of FIG. 10A, FIG. 10B, and FIG. 10C. FIG. 10A illustrates the first part of a flowchart of an exemplary method 1000 in accordance with an embodiment of the present invention. FIG. 10B illustrates the second part of a flowchart of an exemplary method 1000 in accordance with an embodiment of the present invention. FIG. 10C illustrates the third part of a flowchart of an exemplary method 1000 in accordance with an embodiment of the present invention. While it will be readily understood that additional steps are performed in connection with communicating information, messages, and packets between devices, the method 1000 focuses on and discusses the steps for understanding the invention. The method 1000 will be discussed in connection with the exemplary system 100 but is not limited to being implemented on system 100 and can be implemented on other systems with other system architectures.

Method 1000 begins in start step 1002 shown on FIG. 10A. Operation proceeds from step 1002 to step 1004.

In step 1004, a Citizens Broadband Radio Service Device (e.g., CBSD 102 of system 100) establishes a primary backhaul connection path (e.g., a fiber optic backhaul connection path) for exchanging messages with a core network (e.g., core network 132), a Citizens Broadband Radio Service Domain Proxy (e.g., CBRS Domain Proxy 134 of system 100), and a test server (e.g., test server 136 of system 100). In some embodiments, the test server 136 is hosted or located in a data center. In some embodiments, the test server is hosted or located in a cloud. Operation proceeds from step 1004 to step 1006.

In step 1006, the CBSD establishes a secondary backhaul connection path (e.g., a cable modem backhaul connection path) for exchanging messages with the core network, the CBRS Domain Proxy, and the test server. Operation proceeds from step 1006 to step 1008.

In step 1008, the CBSD determines whether to utilize the primary backhaul connection path or the secondary backhaul connection path for communicating with the core network and the CBRS Domain Proxy based on communications with the test server. In some embodiments step 1008 includes one or more sub-steps 1010, 1012, 1014, 1016, and 1018.

In sub-step 1010, while the CBSD is utilizing the primary backhaul connection path to communicate with the core network and the CBRS Domain Proxy, the CBSD continuously transmits ping messages to the test server via the primary backhaul connection path. In some embodiments, the CBSD is implemented as gNodeB (gNB). In some embodiments, the CBSD has an IPerf client (e.g., software application) installed. The IPerf client runs in a continuous ping mode of operation when the CBSD is utilizing the primary backhaul connection for communicating with the core network and the CBRS Domain Proxy. In the continuous ping mode of operation the Iperf client executing on the CBSD continuously sends a 32 byte ping message to the test server. In some embodiments, the test server is an application server hosted either in a data center or a cloud (e.g., data center or cloud 199 of system 100).

In sub-step 1012, upon the CBSD failing to receive ping response messages to the continuous ping messages transmitted to the test server via the primary backhaul connection path for a first period of time (e.g., 15 seconds during which no ping response messages are received), commencing, by the CBSD, continuous transmission of ping messages to the test server via the secondary backhaul connection path. In some embodiments, the iPerf client of the CBSD performs the monitoring and detection of the failure to receive ping response messages for the first period of time.

In sub-step 1014, upon the CBSD failing to receive ping response messages to the continuous ping messages transmitted for a first period of time (e.g., 15 seconds), (i) ceasing, by the CBSD, to transmit ping messages to the test server via the primary backhaul connection path, and (ii) commencing, by the CBSD continuous transmission of ping messages to the test server via the secondary backhaul connection path. In some embodiments, the client iPerf client performs these operations.

In sub-step 1016, the CBSD monitors the secondary backhaul connection path for ping response messages to the continuous transmission of ping messages sent to the test server via the secondary backhaul connection path. In some embodiments, the iPerf client of the CBSD performs this operation.

In sub-step 1018, the CBSD determines to switch from utilizing the primary backhaul connection path for communicating with the core network and the CBRS Domain Proxy to utilizing the secondary backhaul connection path, when the monitoring of the secondary backhaul connection path results in no response ping messages being lost for a second period of time (e.g., 15 seconds). The second period of time occurring after transmission of a first ping message of the continuous ping messages are sent to the test server via the secondary backhaul connection path. Operation proceeds from step 1008 via connection node A 1020 to step 1022 shown on FIG. 10B.

In step 1022, the CBSD switches from utilizing the primary backhaul connection path for communicating with the core network and the CBRS Domain Proxy to utilizing the secondary backhaul connection path for communicating with the core network and the CBRS Domain Proxy in response to determining to switch from utilizing the primary backhaul connection path to the utilizing the secondary backhaul connection path for communicating with the core network and the CBRS Domain Proxy. In some embodiments, the CBSD ceases sending any ping messages to the test server via the secondary backhaul connection path once the CBSD determines to switch or has switched from utilizing the primary backhaul connection path to utilizing the secondary backhaul connection path so as to conserve bandwidth on the secondary backhaul connection path. Operation proceeds from step 1022 to step 1024.

In step 1024, the CBSD utilizes the secondary backhaul connection path for communicating with the core network and the CBRS Domain Proxy. In some embodiments, step 1024 includes one or more sub-steps 1026 and 1030. In sub-step 1026, the CBSD communicates via the secondary backhaul connection path one or more messages to the CBRS Domain Proxy. In some embodiments, sub-step 1026 includes sub-step 1028. In sub-step 1028, the CBSD communicates via the secondary backhaul connection path a heartbeat request message to the CBRS Domain Proxy requesting re-authorization to continue to transmit using a spectrum grant obtained from a Spectrum Access System (e.g., Spectrum Access System 142 of system 100), said Spectrum Access System being connected and/or coupled to the CBRS Domain Proxy (e.g., CBRS Domain Proxy 134 of system 100). In sub-step 1030, the CBSD communicates via the secondary backhaul connection path data (e.g., data messages) received by the CBSD from one or more user equipment devices (e.g., UE 1 108, UE 2 110, . . . , UEN 112 of system 100) to the core network (e.g., network equipment in the core network 132 of system 100). In some embodiments, the data received from the one or more user equipment devices by the core network 132 is then transmitted to an outside network (e.g., to endpoint devices, application servers, etc. in or connected to the outside network 140 (e.g., Internet) of system 100) via an Internet Gateway (e.g., Internet Gateway 138 of system 100). Operation proceeds from step 1024 to step 1032.

In step 1032, the CBSD after switching from utilizing the primary backhaul connection path to utilizing the secondary backhaul connection path, periodically (e.g., either occasionally or on a fixed recurring schedule after the expiration of a period of time (e.g., every 60 minutes) performs connectivity tests on the primary backhaul connection path until a successful connectivity test has been performed. In some embodiments, step 1032 includes one or more sub-steps 1034, 1036 and 1038. In sub-step 1034, the CBSD transmits a first number of ping messages (e.g., 15 ping messages) to the test server via the primary backhaul connection path during a third period of time. In sub-step 1036, the CBSD monitors the primary backhaul connection path for ping response messages to the transmitted first number of ping messages. In sub-step 1038, the CBSD determines that a successful connectivity test has occurred when the monitoring of the primary backhaul connection path results in no response ping messages being lost for a fourth period of time (e.g., 15 seconds). That is a ping response message is received during the fourth period of time from the test server in response to each of the first number of ping messages sent to the test server via the primary backhaul connection path during the third period of time. Operation proceeds from step 1032 to step 1040.

In step 1040, in response to a successful connectivity test being performed, the CBSD determines to switch from utilizing the secondary backhaul connection path to utilizing the primary backhaul connection path for communicating with the core network and the CBRS Domain Proxy. Operation proceeds from step 1040 via connection node B 1042 to step 1044 shown on FIG. 10C.

In step 1044, in response to determining to switch from utilizing the secondary backhaul connection path to utilizing the primary backhaul connection for communicating with the core network and the CBRS Domain Proxy, the CBSD switches from utilizing the secondary backhaul connection path to utilizing the primary backhaul connection for communicating with the core network and the CBRS Domain Proxy. Operation proceeds from step 1044 to step 1046.

In step 1046, the CBSD utilizes the primary backhaul connection path to communicating with the core network and the CBRS Domain Proxy. In some embodiments, step 1046 includes one or more sub-steps 1048 and 1052. In sub-step 1048, the CBSD communicates via the primary backhaul connection path one or more messages to the CBRS Domain Proxy. In some embodiments, sub-step 1048 includes sub-step 1050. In sub-step 1050, the CBSD communicates to the CBRS Domain Proxy via the primary backhaul connection path a heartbeart request message requesting re-authorization to continue to transmit using a Spectrum Grant obtained from a Spectrum Access System. The spectrum Access System is connected and/or coupled to the CBRS Domain Proxy. The CBRS Domain Proxy communicates the heartbeat request to the Spectrum Access System and sends the response from the Spectrum Access System to the CBSD via the primary backhaul connection path. In sub-step 1052, the CBSD communicates messages including data received from one or more user equipment devices to the core network via the primary backhaul connection path. The core network in some embodiments forwards or relays the messages to the outside network via the Internet Gateway. Operation proceeds from step 1046 via connection node C 1054 to step 1008 shown on FIG. 10A where the steps of the method continue to be implemented as previously explained.

Various embodiments of method 1000 will now be discussed in which different aspects or features are described. In some embodiments, the primary backhaul connection path includes fiber optic cabling. The CBSD having an interface (e.g., interface 1 104 of CBSD 102 of system 100) is connected and/or coupled to the fiber optic cabling via a fiber optic cable termination switch (e.g., fiber termination switch 114 of system 100). In some embodiments, the secondary backhaul connection path includes coaxial cabling and a Cable Modem Termination System (e.g., CMTS 126 of system 100). In some such embodiments, the CBSD is connected and/or coupled to the coaxial cabling via a cable modem (e.g., cable modem 116 of system 100). In some embodiments, the fiber optic termination switch is an external device separate from the CBSD. In some embodiments, the fiber optic termination switch also referred to as a fiber termination switch is part of the CBSD. In some embodiments, the fiber optic termination switch converts optical signals received from the fiber optical cable to electrical signals before forwarding the signals to circuitry of the CBSD. In some such embodiments, the fiber optic termination switch converts electrical of the CBSD to optical signals and transmits them on the fiber optic backhaul cable. In some embodiments, the cable modem through which the CBSD is coupled to the coaxial cabling is an external device separate from the CBSD. In some embodiments, the cable modem is a part of the CBSD. In some embodiments, the CBSD is connected and/or coupled to the fiber termination switch via a first interface and the CBSD is connected an/or coupled to the cable modem via a second interface, said first interface being separate from the second interface. In some embodiments, the first interface is a fiber connector and/or port and the second interface is an Ethernet connector and/or physical port. In some embodiments, the fiber connector or port receives optical signals which the CBSD converts to electrical signals. In some such embodiments, the fiber termination switch performs the function of properly terminating the optical transmission line (e.g., so as to minimize signal reflections which distort the signal). The optical signal is converted to an electrical signal at the termination of the fiber optic cable of the primary backhaul connection path (e.g., with another fiber termination switch or an optical to electrical router) before reaching the core network, CBRS Domain Proxy and test server. However, in some embodiments, the fiber optic cable of the primary backhaul connection path may terminate at a connector of network equipment in the core network, at a connector in the CBRS Domain Proxy, and at a connector in the test server.

In some embodiments, there is no CBRS Domain Proxy and the CBSD communicates with the Spectrum Access System (SAS) directly without sending requests and/or messages to the CBRS Domain Proxy to be forwarded to the Spectrum Access System on behalf of the CBSD. In such embodiments, the CBSD communicates with the core network and the SAS using the same backhaul connection path in the same way as described in the method 1000 as being used for communicating with the core network and the CBRS Domain Proxy. It is just that the CBRS Domain Proxy is replaced with SAS.

In some embodiments, one or more of the method steps of transmitting, sending or communicating ping messages or connectivity test messages from the CBSD to the test server is performed by an iPerf client application executing on a processor of the CBSD. In some embodiments, one or more of the method steps of monitoring or receiving ping response messages by the CBSD, performing continuity tests by the CBSD, and determining by the CBSD the success of a continuity test is performed by the iPerf client application of the CBSD.

In some embodiments, the CBSD determines to switch from utilizing the primary backhaul connection path to utilizing the secondary backhaul connection path in response to detecting that a consecutive number N (N being an integer such as 15) of ping response messages have not been received from the test server after the CBSD has transmitted N or more ping messages to the test server.

In some embodiments, instead of transmitting continuous ping messages to the test server when utilizing the primary backhaul connection path, the CBSD transmits ping messages for intervals of time over a recurring time period (e.g., a 20 second interval of ping message transmission every minute which results in 20 consecutive seconds of ping messages being transmitted and 40 seconds of no ping messages being transmitted every 60 seconds). In some embodiments, the intervals of time and recurring time periods are configurable and variable.

Figure 11:
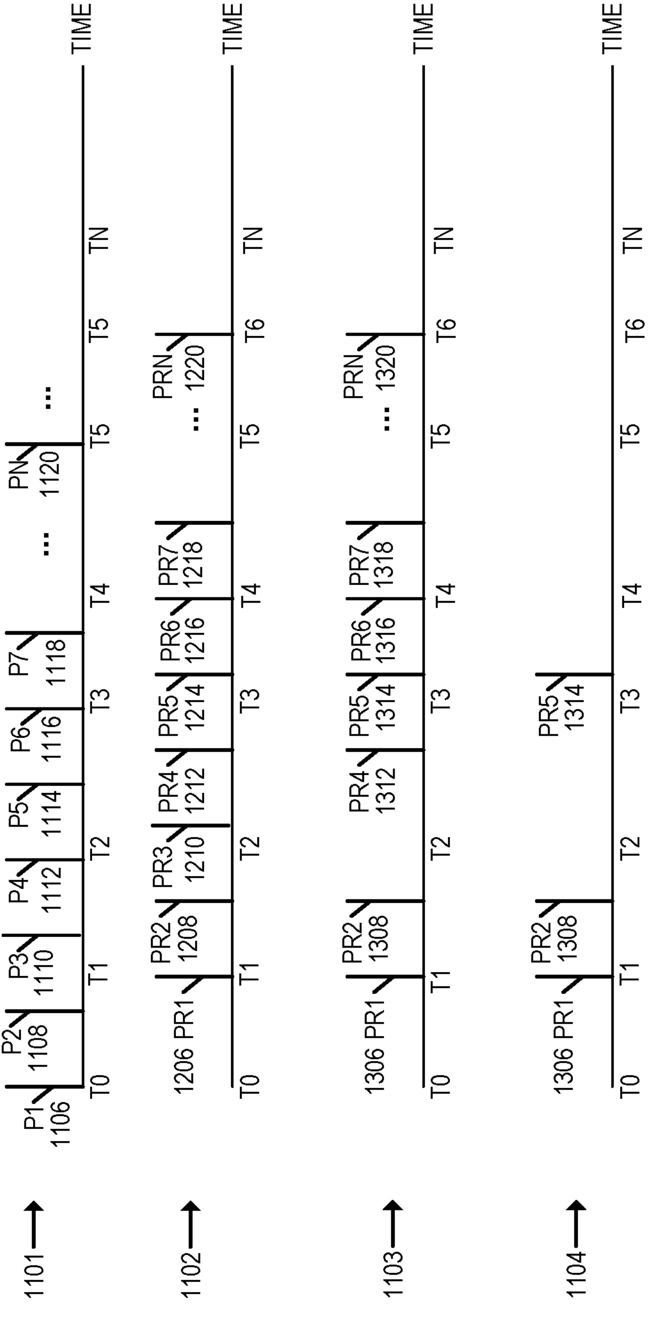
FIG. 11 illustrates timing diagrams showing the transmission of ping messages from a mobile base station (e.g., CBSD) to a test server and the receipt of ping response messages at the mobile base station (e.g., CBSD) from the test server in accordance with an embodiment of the present invention.

FIG. 11 illustrates exemplary timing diagrams showing the transmission of ping messages from a mobile base station (e.g., CBSD) to a test server and the receipt of ping response messages at the mobile base station (e.g., CBSD) from the test server in accordance with an embodiment of the present invention.

Timing diagram 1101 of FIG. 11 illustrates CBSD transmitting ping messages to the test server with T0, T1, T2, T3, T4, T4, T5, T6 TN representing increments of time. P 1 1106 is the first ping message transmitted from the CBSD to the test server and it occurs at time T0. P 2 1108 is the second ping message transmitted from the CBSD to the test server. P 3 1110 is the third ping message transmitted from the CBSD to the test server. P 4 1112 is the fourth ping message transmitted from the CBSD to the test server. P 5 1114 is the fifth ping message transmitted from the CBSD to the test server. P 6 1116 is the sixth ping message transmitted from the CBSD to the test server and it is transmitted at time T3. P 7 1118 is the seventh ping message transmitted from the CBSD to the test server. PN 1120 is the Nth ping message transmitted from the CBSD to test server and it is transmitted at time T5. The timing diagram shows the CBSD continuous transmitting ping messages to the test server. During the period of time from T0 to T3 the first, second, third, fourth, fifth and sixth ping messages have been transmitted from the CBSD to the test server.

Timing diagram 1102 of FIG. 11 illustrates CBSD receiving ping response messages from the test server with T0, T1, T2, T3, T4, T4, T5, T6, TN representing the same increments of time as in timing diagram 1101. The PR 1206 is the first ping response message received by the CBSD from the test server in response to the first ping message P 1 1106. The PR 1206 ping response message is received at time T1. PR 2 1208 is the second ping response message received by the CBSD from the test server in response to the P 2 1108 ping message. PR 3 1210 is the third ping response message received by the CBSD from the test server in response to P 3 1110 ping message. PR 4 1212 is the fourth ping response message received by CBSD from the test server in response to the P 4 1112 ping message. PR 5 1214 is the fifth ping response message received by the CBSD from the test server in response to the P 5 1114 ping message. PR 6 1216 is the sixth ping response message received by the CBSD from the test server in response to the P 6 1116 ping message. PR 7 1218 is the seventh ping response message received by the CBSD from the test server in response to the P 7 118 ping message. PRN 1220 is the Nth ping response message received by the CBSD from test server in response to PN 1120 ping message and it is received at time T6. In timing diagram 1101 ping messages P 1 1106, P 2 1108, P 3 1110, P 4 1112, P 5 1114 and P 6 1116 are transmitted continuously over a first period of time from T0 to T3 and the response ping messages are received over a second period of time from T1 to T4 which illustrates, among other things, the overlapping over the first and second time periods. Note that the first ping response message is received before the end of the first period of time. In the timing diagram 1102 the CBSD receives within a second period of time (T1 to T4) a ping response message for each of the ping messages it sent in a first period of time (T0 to T3 period of time). This indicates that the backhaul connection path is not impaired.

Timing diagram 1103 illustrates a different scenario in which no ping response message is received by the CBSD from the test server in response to the P 3 1112 message however ping response message for the other ping messages which were sent are received that is PR 1 1306, PR 2 1308, PR 4 1312, PR 5 1314, PR 6 1316, PR 7 1318, . . . , PRN 1320 were received in response to P 1 1106, P 2 1108, P 4 1112, P 5 1114, P 6 1116, P 7 1118, . . . . PN 1120. If the primary backhaul connection was being tested and the test was that when 5 consecutive ping response messages are not received within the second period of time (T1 to T4) constitutes a failure, the timing diagram 1103 indicates that a failure has not occurred as only 1 ping response message was not received in the second period of time (T1 to T4) resulting in a successful test. If the primary backhaul connection was being tested and a failure of the test was that no ping response messages are received during the second period of time (T1 to T4), the timing diagram would also indicate a successful test and that the primary backhaul connection path has not failed as ping response messages PR 1 1306, PR 2 1308, PR 4 1312, PR 5 1314 and PR 6 1316 were received during the second period of time. However, if the second backhaul connection was being tested and a successful test required the receipt by the CBSD of a ping response message within the second period of time (T1 to T4) to every ping message sent during the first period of time (T0 to T3) then the test would not have been successful as no response message was received in response to the P 3 1110 ping message. If the second backhaul connection was being tested and a successful test required the receipt by the CBSD of a ping response message within the second period of time (T1 to T4) for every ping message sent during the first period of time (T0 to T3) then the test would not have been successful as no response message was received in response to the P 3 1110 ping message.

Timing diagram 1104 illustrates a different scenario in which no ping response messages are received by the CBSD from the test server during the period of time from T2 to T3 and during the time period T4 and T5. Ping response messages PR 1 1306, PR 2 1308, PR 5 1314 are the only responses received. If the test for the backhaul connection path is that the backhaul connection path is considered to have failed when no ping response messages have been received for a period of time for example 15 seconds then timing diagram 1104 illustrates that the backhaul connection path has failed if the time between receipt of PR 2 1302 and PR 5 1314 is equal to or greater than 15 seconds. If this time is less than 15 seconds, then at the time PR 5 1314 is received by the CBSD the backhaul connection path is considered ok by the CBSD. However, as no ping response messages are received after the PR 5 1314 ping response message once 15 seconds has passed the CBSD will make the determination that the backhaul connection has failed.

Figure 4:
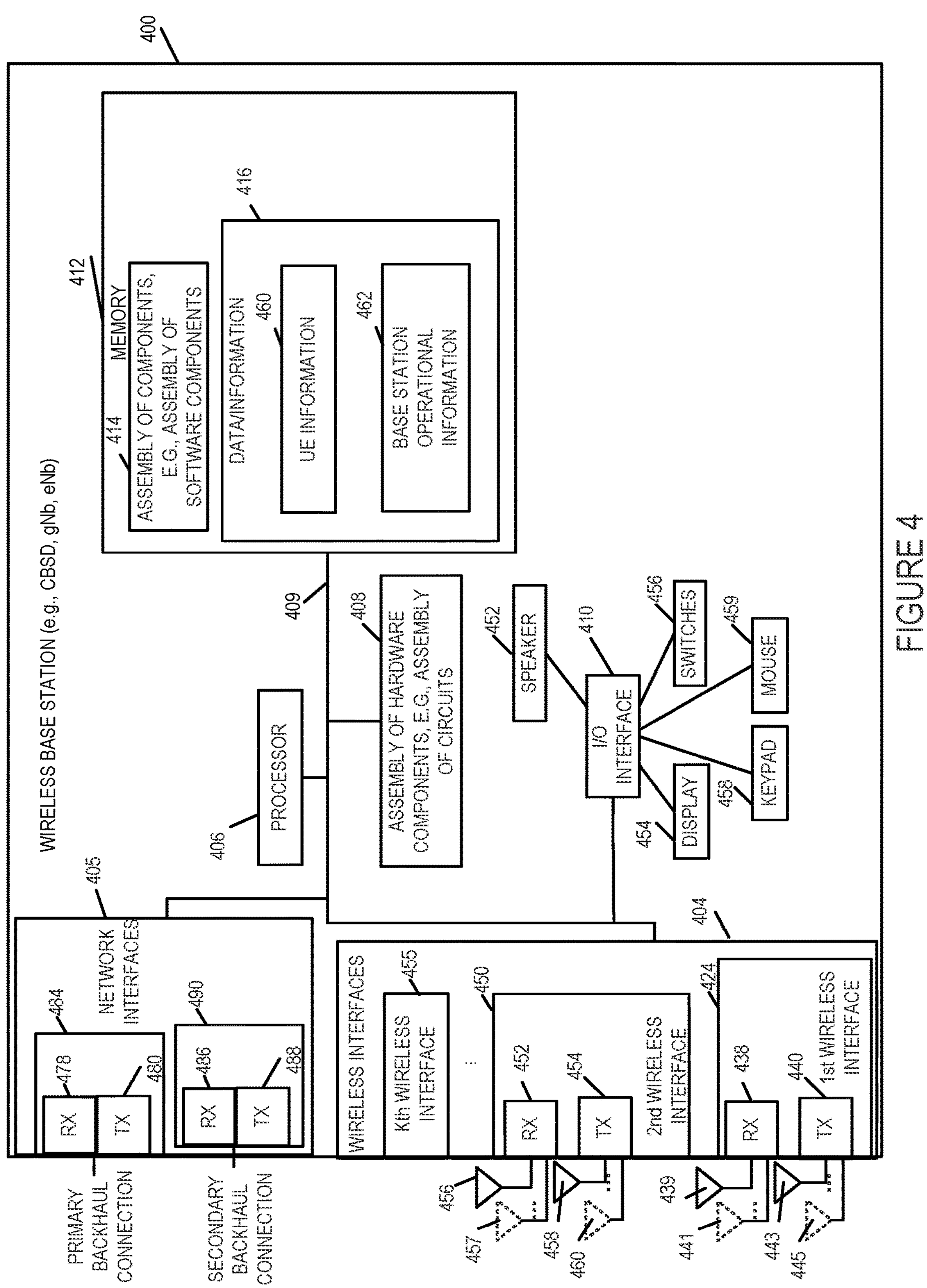
FIG. 4 illustrates details of an exemplary wireless base station, e.g., a Citizens Broadband Radio Service Device (CBSD) in accordance with one embodiment of the present invention.

FIG. 4 is a drawing of an exemplary wireless base station 400 in accordance with an exemplary embodiment. The wireless base station 400 may be, and in some embodiments is Citizens Broadband Radio Service Device (CBSD) 400, a gNodeB, or an eNodeB, in accordance with an exemplary embodiment. In some embodiments, the wireless base station is a CBSD implemented as a 5G gNodeB. Exemplary wireless base station 400 includes wireless interfaces 404, network interfaces 405, including a primary backhaul connection interface 484 which in this exemplary embodiment is a fiber-optic interface and a secondary backhaul connection interface 490 which is wired interface (e.g., an Ethernet interface), a processor 406, e.g., a CPU, an assembly of hardware components 408, e.g., an assembly of circuits, and I/O interface 410, and memory 412 coupled together via a bus 409 over which the various elements may interchange data and information. Wireless base station 400 further includes a speaker 452, a display 454, switches 456, keypad 458 and mouse 459 coupled to I/O interface 410, via which the various I/O devices (452, 454, 456, 458, 459) may communicate with other elements (404, 405, 406, 408, 412) of the wireless base station 400. The primary backhaul connection interface 484 includes a receiver 478 and a transmitter 480. In some embodiments, receiver 478 and transmitter 480 are part of a transceiver. The primary backhaul connection interface 484 is a fiber-optic interface and includes a fiber optic port in this exemplary embodiment. The secondary backhaul connection interface 490 includes a receiver 486 and a transmitter 488. The secondary backhaul connection interface is typically an Ethernet interface (e.g., Ethernet connector). In some embodiments, receiver 486 and transmitter 488 are part of a transceiver. Wireless interfaces 404 include a plurality of wireless interfaces including first wireless interface 424, second wireless interface 450, . . . , Kth wireless interface 455, K being an integer greater than 2. The wireless interfaces are used to communicate with the wireless devices, e.g., user equipment device, e.g., DSDS user equipment devices. The first wireless interface 424 is used for example to communicate with a first user equipment device using a first spectrum band. The second wireless interface can be used to communicate with a second user equipment device using a second spectrum band. The first wireless interface 424 includes wireless receiver 438 and a wireless transmitter 440. In some embodiments, receiver 438 and transmitter 440 are part of a transceiver. In various embodiments, the first wireless interface 424 includes a plurality of wireless receivers and a plurality of wireless transmitters. Wireless receiver 438 is coupled to a plurality of receive antennas (receive antenna 1 439, . . . , receive antenna M 441), via which wireless base station 400 can receive wireless signals from other wireless communications devices including a second wireless communications device, e.g., a user equipment device. Wireless transmitter 440 is coupled to a plurality of wireless transmit antennas (transmit antenna 1 443, . . . , transmit antenna N 445) via which the wireless base station 400 can transmit signals to other wireless communications devices including a second wireless communications device, e.g., a user equipment device.

The second wireless interface 450 includes wireless receiver 452 and a wireless transmitter 454. In some embodiments, receiver 452 and transmitter 454 are part of a transceiver. In various embodiments, the second wireless interface 450 includes a plurality of wireless receivers and a plurality of wireless transmitters. Wireless receiver 452 is coupled to one or more receive antennas (receive antenna 1 456, . . . , receive antenna M 457), via which wireless base station 400 can receive wireless signals from other wireless communications devices including a second wireless communications device, e.g., CBRS UE device, using the same or a different wireless protocol than the first wireless interface. Wireless transmitter 454 is coupled to one or more wireless transmit antennas (transmit antenna 1 458, . . . , transmit antenna N 460) via which the wireless base station 400 can transmit signals to other wireless communications devices including a second wireless communications device, e.g., CBRS UE device. The wireless base station primary backhaul connection interface 484 may be, and in some embodiments is, connected and/or coupled to a fiber optic termination switch of a primary backhaul connection path. The wireless base station secondary backhaul connection interface 490 may be, and in some embodiments is, connected and/or coupled to a cable modem of a secondary backhaul connection path.

Memory 412 includes an assembly of components 414, e.g., an assembly of software components, and data/information 416. Data/information 416 includes UE information 460 and base station operational information 462. In some embodiments, the UE information 460 includes for the UEs in the base station's coverage: UE identification information, UE location information (e.g., UE GPS coordinates), UE device type information, UE session information such as session state information. In some embodiments, the base station operational information 462 includes the information necessary to operate as a base station such as spectrum on which to communicate with user equipment devices. For base stations which are CBSDs GAA and/or PAL spectrum grant information received from an SAS, including for example whether the SAS has authorized the CSBD to transmit on the spectrum grant, the grant expiration time, the heartbeat request response expiration time, heartbeat request interval, and the transmission power level authorized for a spectrum grant.

While the details of the first and second wireless interfaces are shown, the other wireless interfaces of the wireless base station, e.g., wireless interface K where K is an integer greater than 2 also include multiple receivers and transmitters so that the wireless base station 400 can provide wireless services to for example a plurality of wireless devices such as user equipment devices. In some embodiments, one or more of the wireless base stations discussed and/or shown in the Figures and/or in connection with the methods discussed herein are implemented in accordance with the wireless base station 400. For example, the CBSD 102 of system 100 of FIG. 1, system 200 shown in FIG. 2, system 300 of FIG. 3 may be, and in some embodiments are implemented in accordance with the wireless base station 400.

Figure 5:
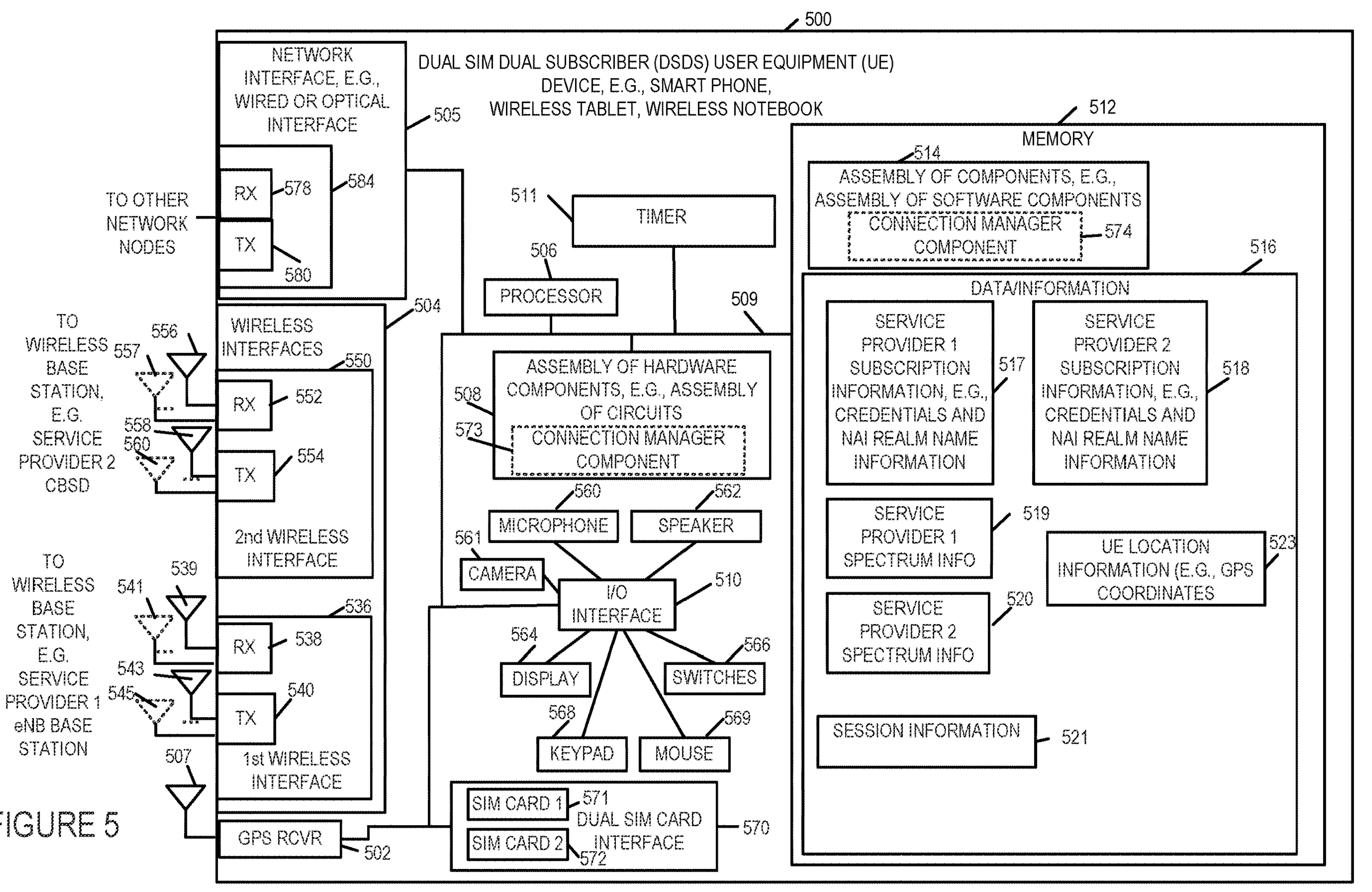
FIG. 5 illustrates details of an exemplary user equipment (UE) device, e.g., a mobile device, cell phone, smartphone, wireless tablet, laptop, wireless notebook, in accordance with one embodiment of the present invention.

FIG. 5 is a drawing of an exemplary user equipment (UE) device 500 in accordance with an exemplary embodiment. UE device 500 is, e.g., a wireless device, e.g., a mobile device such as a cell phone, a smart phone, wireless tablet or wireless notebook. UE device 500 is a dual SIM dual subscription device that is enabled to communicate with different wireless base stations utilizing different wireless spectrum and/or wireless protocols, e.g., 5G wireless protocol, CBRS wireless protocol or cellular wireless protocol. Exemplary UE device 500 includes wireless interfaces 504, a network interface 505, a processor 506, e.g., a CPU, an assembly of hardware components 508, e.g., an assembly of circuits, and I/O interface 510, a GPS receiver 502 coupled to GPS receive antenna 507, a timer 511, e.g., a reference clock, a dual SIM card interface 570 including a first SIM card, SIM card 1 571, corresponding a first service provider, and a second SIM card, SIM card 2 572 corresponding to a second service provider, and memory 512 coupled together via a bus 509 over which the various elements may interchange data and information. UE device 500 further includes a microphone 560, camera 561, speaker 562, a display 564, e.g., a touch screen display, switches 566, keypad 568 and mouse 569 coupled to I/O interface 510, via which the various I/O devices (560, 561, 562, 564, 566, 568, 569) may communicate with other elements (502, 504, 505, 506, 508, 512, 570) of the UE device. Network interface 505 includes a receiver 578 and a transmitter 580. The network interface 505 can be coupled to routers within the home or customer premises or to wired (e.g., cable) or optical (e.g., fiber-optic) networks. In some embodiments, receiver 578 and transmitter 580 are part of a transceiver 584. In some embodiments, the assembly of hardware components 508 includes a connection manager component 573.

Wireless interfaces 504 include a plurality of wireless interfaces including first wireless interface 536 and a second wireless interface 550. The first wireless interface 536 is, e.g., used to communicate with wireless base stations in a first service provider's communications network, e.g., cellular, e.g., gNB tower base stations of the first service provider's communications network, e.g., using a first set of spectrum and a first communications protocol corresponding to the first service provider. The second wireless interface 550 is, e.g., used to communicate with a device, e.g., a CBSD base station, of a second service provider's communications network. For example, the second wireless interface 550 is used to communicate with a CBDS base station of the second service. The first wireless interface 536 includes wireless receiver 538 and a wireless transmitter 540. In some embodiments, receiver 538 and transmitter 540 are part of a transceiver. In various embodiments, the first wireless interface 536 includes a plurality of wireless receivers and a plurality of wireless transmitters. Wireless receiver 538 is coupled to a plurality of receive antennas (receive antenna 1 539, . . . , receive antenna M 541), via which user equipment device 500 can receive wireless signals from other wireless communications devices including a wireless base station, e.g., a cellular wireless base station of the first service provider. Wireless transmitter 540 is coupled to a plurality of wireless transmit antennas (transmit antenna 1 543, . . . , transmit antenna N 545) via which the user equipment device 500 can transmit signals to other wireless communications devices including a cellular wireless base station of the first service provider. The antennas 539, . . . , 541 and 543, . . . , 545 are typically mounted inside the housing of the wireless device but in some embodiments are located outside the user equipment device housing. In some embodiments the various antennas form an antenna array with the antennas pointing in different directions. In some embodiments, one or more of the antennas are included inside the housing of the user equipment device and the user equipment device includes one or more connections to which exterior antennas may be connected.

The second wireless interface 550 includes wireless receiver 552 and a wireless transmitter 554. In some embodiments, receiver 552 and transmitter 554 are part of a transceiver. In various embodiments, the second wireless interface 550 includes a plurality of wireless receivers and a plurality of wireless transmitters. Wireless receiver 552 is coupled to one or more receive antennas (receive antenna 1 556, . . . , receive antenna M 557), via which user device 500 can receive wireless signals from other wireless communications devices including, e.g., a CBSD base station of a second service provider. Wireless transmitter 554 is coupled to one or more wireless transmit antennas (transmit antenna 1 558, . . . , transmit antenna N 560) via which the user equipment device 500 can transmit signals to other wireless communications devices including, e.g., a CBSD of a second service provider or another user equipment device. The user equipment device network interface 505 may be coupled to LAN or WAN networks or routers so that the user equipment device can also obtain services via a hardwired connection in addition to through the wireless interfaces, e.g., when the UE device 500 is at a location where such a connection is possible.

Memory 512 includes an assembly of components 514, e.g., an assembly of software components, and data/information 516. In some embodiments, the assembly of software components 514 includes a connection manager component 574. Data/information 516 includes service provider 1 subscription information 517, e.g., credentials and NAI realm information corresponding to service provide 1, service provider 2 subscription information 518, e.g., credentials and NAI realm information corresponding to service provider 2. Data/information 516 further includes service provider 1 spectrum information 519 (e.g., spectrum on which the service provider 1 operates), service provider 2 spectrum information (e.g., CBRS spectrum on which service provider 2 operates), session information 521 (session type, session endpoint addresses), UE location information (e.g., GPS coordinates received from the GPS receiver) 523.

While the exemplary UE 500 is a Dual SIM Dual Subscriber user equipment device, user equipment devices in accordance with present invention may be, and in many embodiments are, single SIM devices (e.g., SIM card providing subscription credentials for a CBRS network). Similarly, while two wireless interfaces are illustrated in the exemplary user equipment device 500, in various embodiments of the present invention a single wireless interface user equipment device is employed for example a user equipment device with a wireless interface that allows communication over the CBRS network spectrum (e.g., 2nd wireless interface 550 of the UE 550).

In some embodiments, the user equipment devices discussed in the Figures and/or in connection with the embodiments of the present invention are implemented in accordance with user equipment device 500. For example, UE 1 108, UE 2 110, . . . , UEN 112 in the system shown in FIGS. 1, 2, and 3 may be, and in some embodiments are, implemented in accordance with user equipment device 500.

Figure 6:
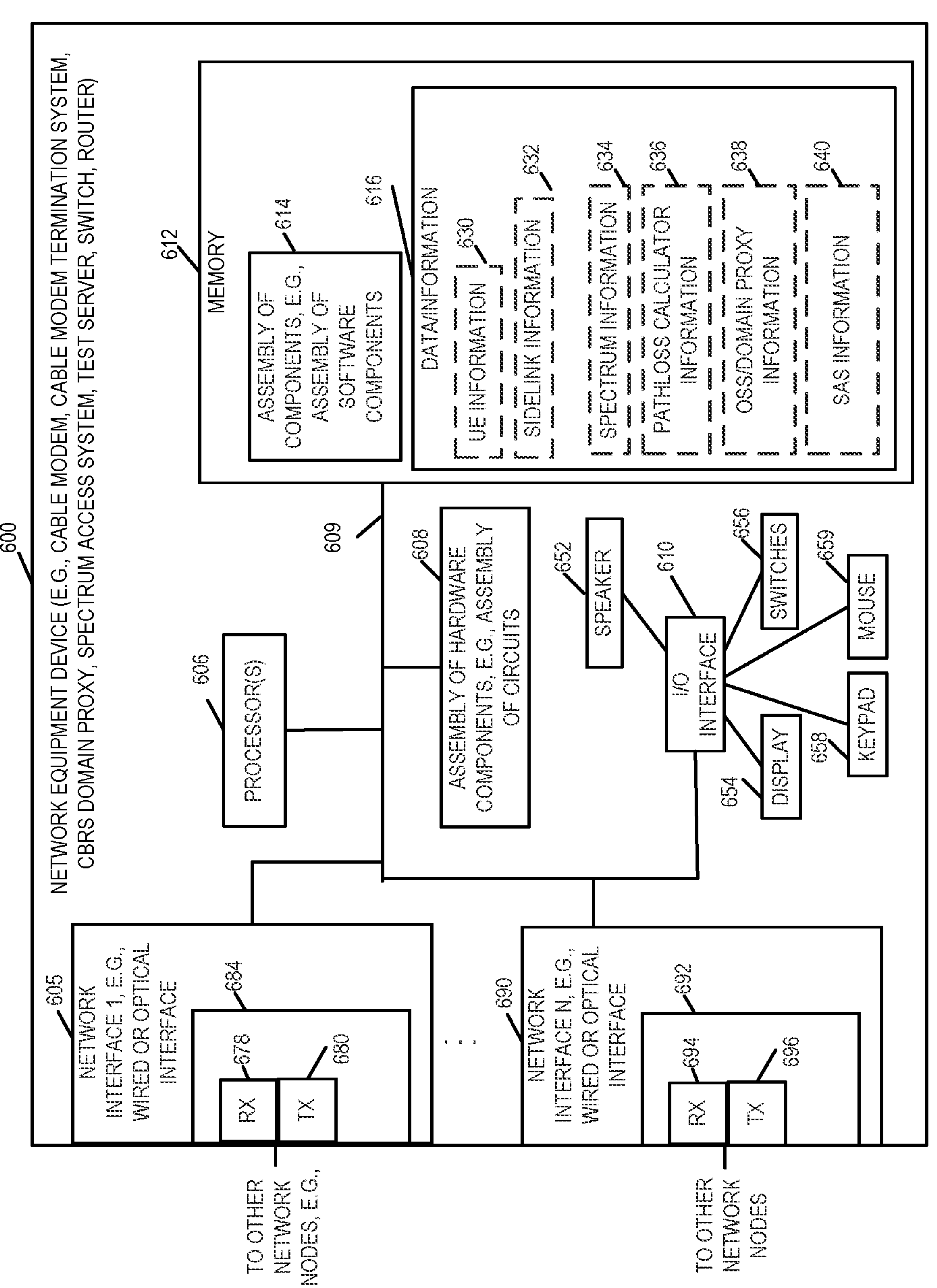
FIG. 6 illustrates details of an exemplary network equipment device (e.g., cable modem, Cable Modem Termination System, fiber termination switch, router, switch, Citizens Broadband Radio Service Domain Proxy, Spectrum Access System, Internet Gateway, ESC system) in accordance with an embodiment of the present invention.

FIG. 6 is a drawing of an exemplary network equipment device, server or node, e.g., cable modem, Cable Modem Termination System, CBRS Domain Proxy, Spectrum Access System, Test server, switch, router, ESC system, Internet Gateway in accordance with an exemplary embodiment. The network equipment device 600 includes a plurality of network interfaces 605, . . . , 690, e.g., a wired or fiber-optical interface, a processor(s) 606 (e.g., one or more processors), e.g., a CPU, an assembly of hardware components 608, e.g., an assembly of circuits, and I/O interface 610 and memory 612 coupled together via a bus 609 over which the various elements may interchange data and information. The network equipment device 600 further includes a speaker 652, a display 654, switches 656, keypad 658 and mouse 659 coupled to I/O interface 610, via which the various I/O devices (652, 654, 656, 658, 659) may communicate with other elements (605, . . . , 690, 606, 608, 612) of the network equipment device 600. Network interface 605 includes a receiver 678 and a transmitter 680. The network interface 605 is typically used to communicate with other devices, e.g., wireless base stations, core network equipment, CBRS Domain Proxy, databases, Spectrum Access Systems, cable modems, Cable Modem Termination System, Internet Gateways, test server routers, switches, other nodes, other networks, etc. In some embodiments, receiver 678 and transmitter 680 are part of a transceiver 684. Network interface 690 includes a receiver 694 and a transmitter 696. The network interface 690 is typically used to communicate with other devices, e.g., devices, e.g., wireless base stations, core network equipment, CBRS Domain Proxy, databases, Spectrum Access Systems, cable modems, Cable Modem Termination System, Internet Gateways, test server routers, switches, other nodes, other networks, etc. In some embodiments, receiver 694 and transmitter 696 are part of a transceiver 692. Memory 612 includes an assembly of component 614, e.g., an assembly of software components, and data/information 616. The specific information included in data/information 616 depends on the specific network equipment device implemented.

In some embodiments, the network equipment devices discussed in the Figures and/or in connection with the embodiments of the present invention described are implemented in accordance with network equipment device 600. For example, fiber termination switch 114, cable modem 116, network equipment 119, switch(es) 120, router(s) 122, Cable Modem Termination System 126, network equipment 127, switch(es) 128, router(s) 130, network equipment in the core network 132, Internet Gateway 138, CBRS Domain Proxy 134, Spectrum Access System 142, ESC system 144, test server 135 in system 100, 200 and 300 of FIGS. 1, 2, and 3, switch 220, router 222, switch 228 and router 230 of system 200 of FIG. 2 and system 300 of FIG. 3 may be, and in some embodiments are, implemented in accordance with the network equipment device 600.

Figure 7:
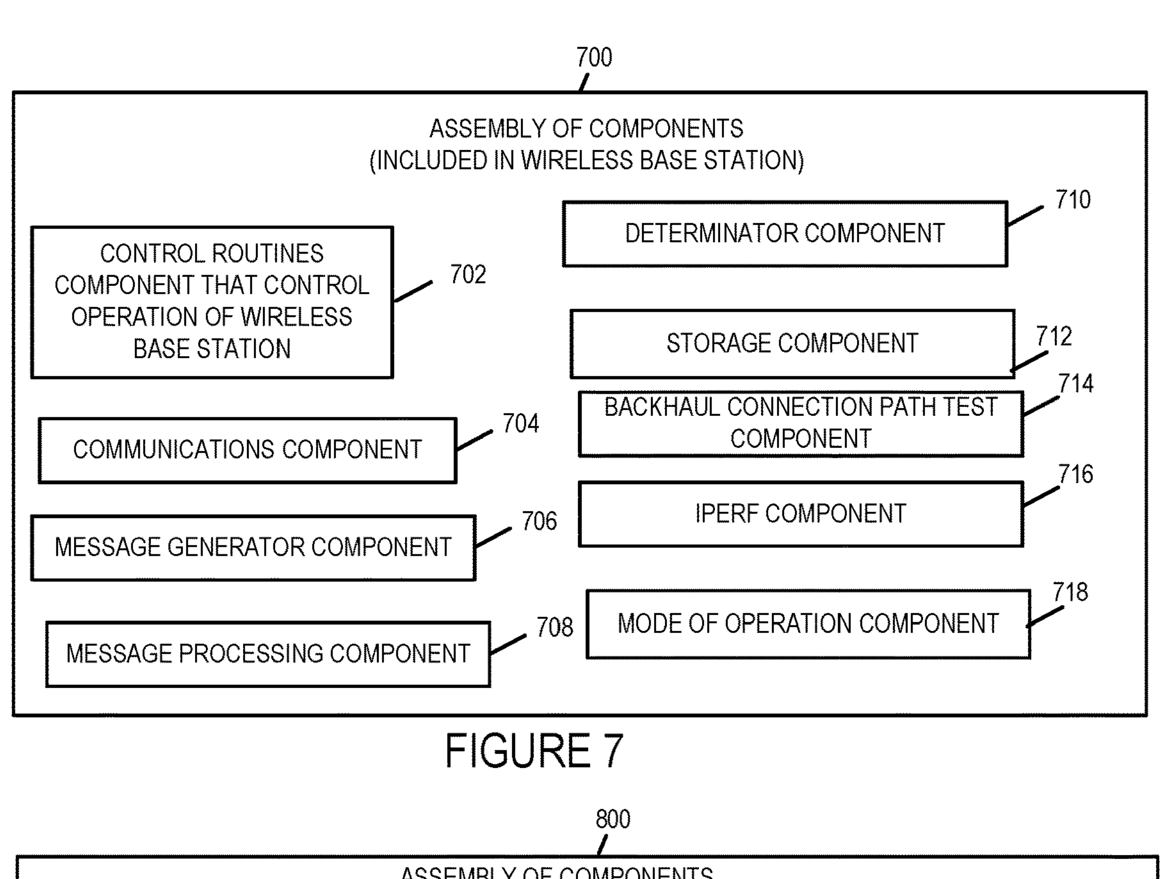
FIG. 7 illustrates an exemplary assembly of components for a wireless base station in accordance with an embodiment of the present invention.

FIG. 7 is a drawing of an exemplary assembly of components 700 which may be included in an exemplary wireless base station (e.g., exemplary wireless base station 400 of FIG. 4), in accordance with an exemplary embodiment. The components in the assembly of components 700 can, and in some embodiments are, implemented fully in hardware within a processor, e.g., processor 406, e.g., as individual circuits. The components in the assembly of components 700 can, and in some embodiments are, implemented fully in hardware within the assembly of hardware components 408, e.g., as individual circuits corresponding to the different components. In other embodiments some of the components are implemented, e.g., as circuits, within processor 406 with other components being implemented, e.g., as circuits within assembly of components 408, external to and coupled to the processor 406. As should be appreciated the level of integration of components on the processor and/or with some components being external to the processor may be one of design choice. Alternatively, rather than being implemented as circuits, all or some of the components may be implemented in software and stored in the memory 412 of the wireless base station 400, with the components controlling operation of wireless base station device 400 to implement the functions corresponding to the components when the components are executed by a processor e.g., processor 406. In some such embodiments, the assembly of components 700 is included in the memory 412 as assembly of software components 414. In still other embodiments, various components in assembly of components 700 are implemented as a combination of hardware and software, e.g., with another circuit external to the processor providing input to the processor which then under software control operates to perform a portion of a component's function.

When implemented in software the components include code, which when executed by a processor, e.g., processor 406, configure the processor to implement the function corresponding to the component. In embodiments where the assembly of components 700 is stored in the memory 412, the memory 412 is a computer program product comprising a computer readable medium comprising code, e.g., individual code for each component, for causing at least one computer, e.g., processor 406, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 7 control and/or configure the wireless base station 400 or elements therein such as the processor 406, to perform the functions of corresponding steps illustrated and/or described in the method of one or more of the flowcharts, signaling diagrams and/or described with respect to any of the Figures. Thus the assembly of components 700 includes various components that perform functions of corresponding one or more described and/or illustrated steps of an exemplary method.

Assembly of components 700 includes a control routines component 702, a communications component 704, a message generator component 706, a message processing component 708, a determinator component 710, a storage component 712, a backhaul connection path test component 714, an iPerf component 716, and a mode of operation component 718.

The control routines component 702 is configured to control operation of the wireless base station (e.g., gNodeB, eNodeB, or a CBSD).

The communication component 704 is configured to handle communications, e.g., transmission and reception of messages (e.g., ping messages, ping response messages) and protocol signaling for the wireless base station (e.g., communications with user equipment devices, cable modems, and components, functions, devices, and servers in its core network, CBRS Domain Proxy, and/or Spectrum Access System).

The message generator component 706 is configured to generate messages for transmission to other devices, e.g., request messages, response messages, notification messages, test messages (e.g., ping messages, continuity test messages), communications messages with network equipment devices, communications messages with user equipment devices. In some embodiments, the message generator component 706 is a sub-component of the communications component 704.

The message processing component 708 is configured to process messages received from other devices and implement operations in response to instructions and/or information included in the processed message, e.g., processing and implementing operations in connection with messages from user equipment devices, messages from network equipment devices, Spectrum Access System, CBRS Domain Proxy, test server. In some embodiments, the message processing component 708 is a sub-component of the communications component 704.

The determinator component 710 is configured to make determinations and decisions for the wireless base station including for example: determining whether to utilize a primary backhaul connection path or a secondary backhaul connection path for communicating with a core network, a CBRS Domain Proxy and/or an Spectrum Access System; determining whether a backhaul connection path (e.g., a primary and/or secondary backhaul connection path) is impaired and/or has failed; determining if a continuity test of a primary or secondary backhaul connection path has been successful; determining whether to switch from utilizing a primary backhaul connection path to utilizing a secondary backhaul connection path for communicating with a core network and/or a CBRS Domain Proxy and/or a Spectrum Access System; determining to switch from utilizing a secondary backhaul connection path to a primary backhaul connection path for communicating with a core network and/or a CBRS Domain Proxy and/or a Spectrum Access System; determining when to switch from a first mode of operation to a second mode of operation; determining whether a ping response message has been received within a defined period of time by the wireless base station from a test server in response to a ping message sent to the test server from the wireless base station; determining when the wireless base station has failed to detect a consecutive number of ping response messages in response to ping messages sent to a test server; determining when the wireless base station has failed to receive for a specified period of time any ping response messages from a test server in response to ping messages sent to the test server.

The storage component 712 is configured to manage the storage, and retrieval of data and/or instructions to/and from memory, buffers in memory, hardware buffers and/or storage devices coupled and/or connected to the wireless base station.

The backhaul connection path test component 714 is configured to perform tests on as well as monitor a backhaul connection path to determine if the backhaul connection path is impaired and/or has failed. In some embodiments, the backhaul connection path test component 714 is a sub-component of the communications component 704.

The iPerf component 716 is configured to perform performance tests on a backhaul connection path for example by sending ping messages to a test server and determining whether response messages are received within a specified time period from the test server in response the ping messages sent to the test server. The iPerf component 716 also is configured to send continuous ping messages to a test server over a backhaul connection path at a configurable rate or with a configurable periodicity and monitor for response messages from the test server to determine performance characteristics and/or status of the backhaul connection path (e.g., whether it is not impaired, impaired, and/or has failed, round trip time, etc.). In some embodiments, the iPerf component 716 is a sub-component of the backhaul connection path test component 714 or the communications component 704.

The mode of operation component 718 is configured to determine whether the wireless base station should operate in a first mode of operation or a second mode of operation based on backhaul connection path tests. The first mode of operation including the wireless base station utilizing a primary backhaul connection path for communicating with a CBRS Domain Proxy and in some embodiments a core network. The first mode of operation also including sending ping messages (e.g., on a continuous basis) to a test server via the primary backhaul connection path and monitoring the primary backhaul connection path for response messages to the ping messages to determine the status of the primary backhaul connection path. The first mode of operation further including determining to switch to the second mode of operation based on the results of the monitoring of the primary backhaul connection path. The second mode of operation including the wireless base station utilizing a secondary backhaul connection path for communicating with the CBRS Domain Proxy and in some embodiments a core network. In some embodiments, the second mode of operation also includes the wireless base station periodically performing status checks or tests on the primary backhaul connection and making a determining to switch modes of operation based on the results of the status checks or tests on the primary backhaul connection path.

Figure 8:
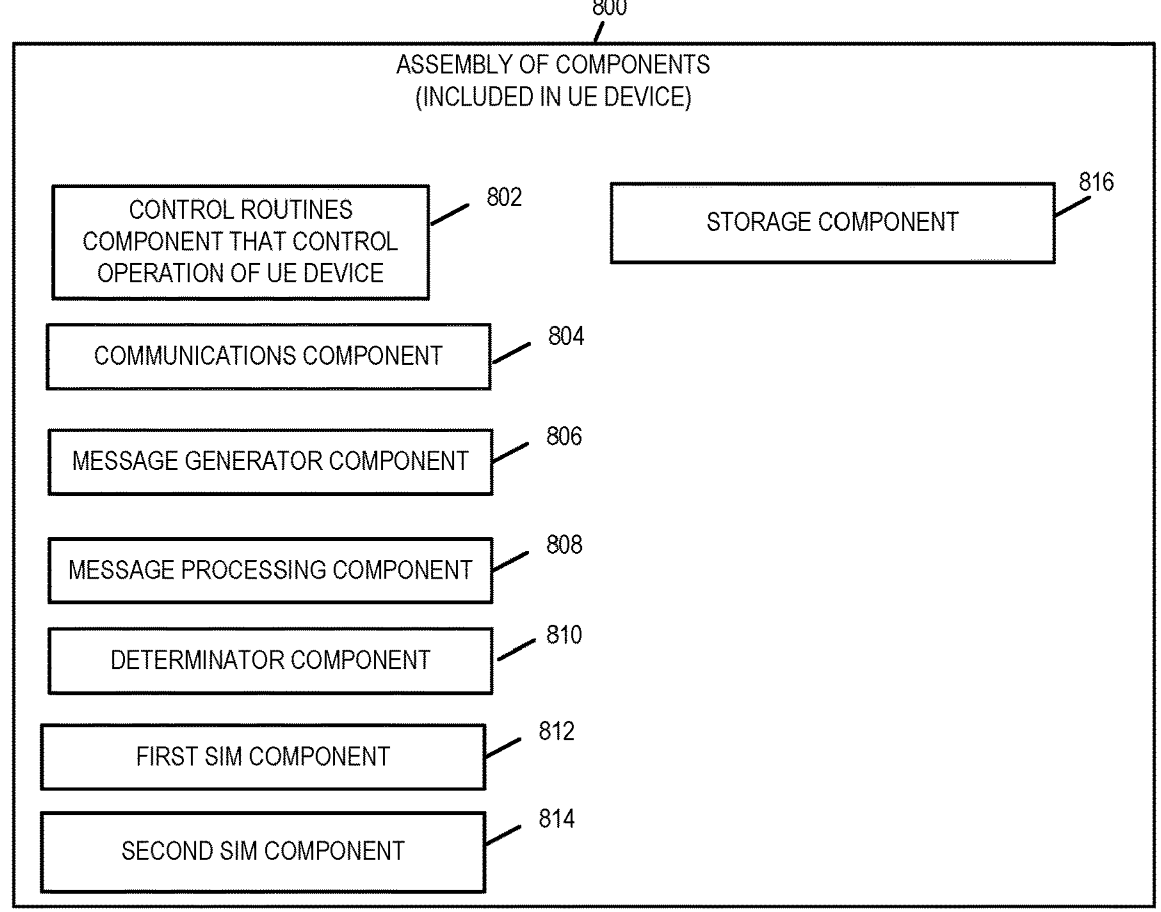
FIG. 8 illustrates an exemplary assembly of components for a user equipment device in accordance with an embodiment of the present invention.

FIG. 8 is a drawing of an exemplary assembly of components 800 which may be included in an exemplary user equipment (UE) device, e.g., UE device 500 of FIG. 5, in accordance with an exemplary embodiment. The components in the assembly of components 800 can, and in some embodiments are, implemented fully in hardware within a processor, e.g., processor 506, e.g., as individual circuits. The components in the assembly of components 800 can, and in some embodiments are, implemented fully in hardware within the assembly of hardware components 508, e.g., as individual circuits corresponding to the different components. In other embodiments some of the components are implemented, e.g., as circuits, within processor 506 with other components being implemented, e.g., as circuits within assembly of components 508, external to and coupled to the processor 506. As should be appreciated the level of integration of components on the processor and/or with some components being external to the processor may be one of design choice. Alternatively, rather than being implemented as circuits, all or some of the components may be implemented in software and stored in the memory 512 of the UE device 500, with the components controlling operation of UE device 500 to implement the functions corresponding to the components when the components are executed by a processor e.g., processor 506. In some such embodiments, the assembly of components 800 is included in the memory 512 as assembly of software components 514. In still other embodiments, various components in assembly of components 800 are implemented as a combination of hardware and software, e.g., with another circuit external to the processor providing input to the processor which then under software control operates to perform a portion of a component's function. When implemented in software the components include code, which when executed by a processor, e.g., processor 506, configure the processor to implement the function corresponding to the component. In embodiments where the assembly of components 800 is stored in the memory 512, the memory 512 is a computer program product comprising a computer readable medium comprising code, e.g., individual code for each component, for causing at least one computer, e.g., processor 506, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 8 control and/or configure the UE device 500 or elements therein such as the processor 506, to perform the functions of corresponding steps illustrated and/or described in the method of one or more of the flowcharts, signaling diagrams and/or described with respect to any of the Figures. Thus the assembly of components 800 includes various components that perform functions of corresponding one or more described and/or illustrated steps of an exemplary method.

Assembly of components 800 includes a control routines component 802, a communications component 804, a message generator component 806, a message processing component 808, a determinator component 810, a first SIM component 810, a second SIM component 812, and a storage component 814.

The control routines component 802 is configured to control operation of the UE. The communications component 804 is configured to handle communications, e.g., receipt and transmission of signals and provide protocol signal processing for one or protocols for the UE. The message generator component 806 is configured to generate messages for transmission to wireless base stations (e.g., CBSD devices, gNodeBs, eNodeBs) such as messages including request and response messages, etc. In some embodiments, the message generator component 806 is a sub-component of the communications component 804. The message processing component 808 processes received messages, e.g., requests for information. In some embodiments, the message processing component 808 is a sub-component of the communications component 804. The first SIM component 810 is configured to store Subscriber Identity Information, e.g., a first set of credentials, for obtaining access to a first service provider/operator's wireless network. The second SIM component 812 is configured to store Subscriber Identity Information, e.g., a second set of credentials, for obtaining access to a second service provider/operator's wireless network. The storage component 814 is configured to perform all operations in storing and retrieving information, e.g., credential information, spectrum channel grant information and transmission power level instructions, session information, from memory and/or storage devices (e.g., SIMs) located in the user equipment device.

Figure 9:
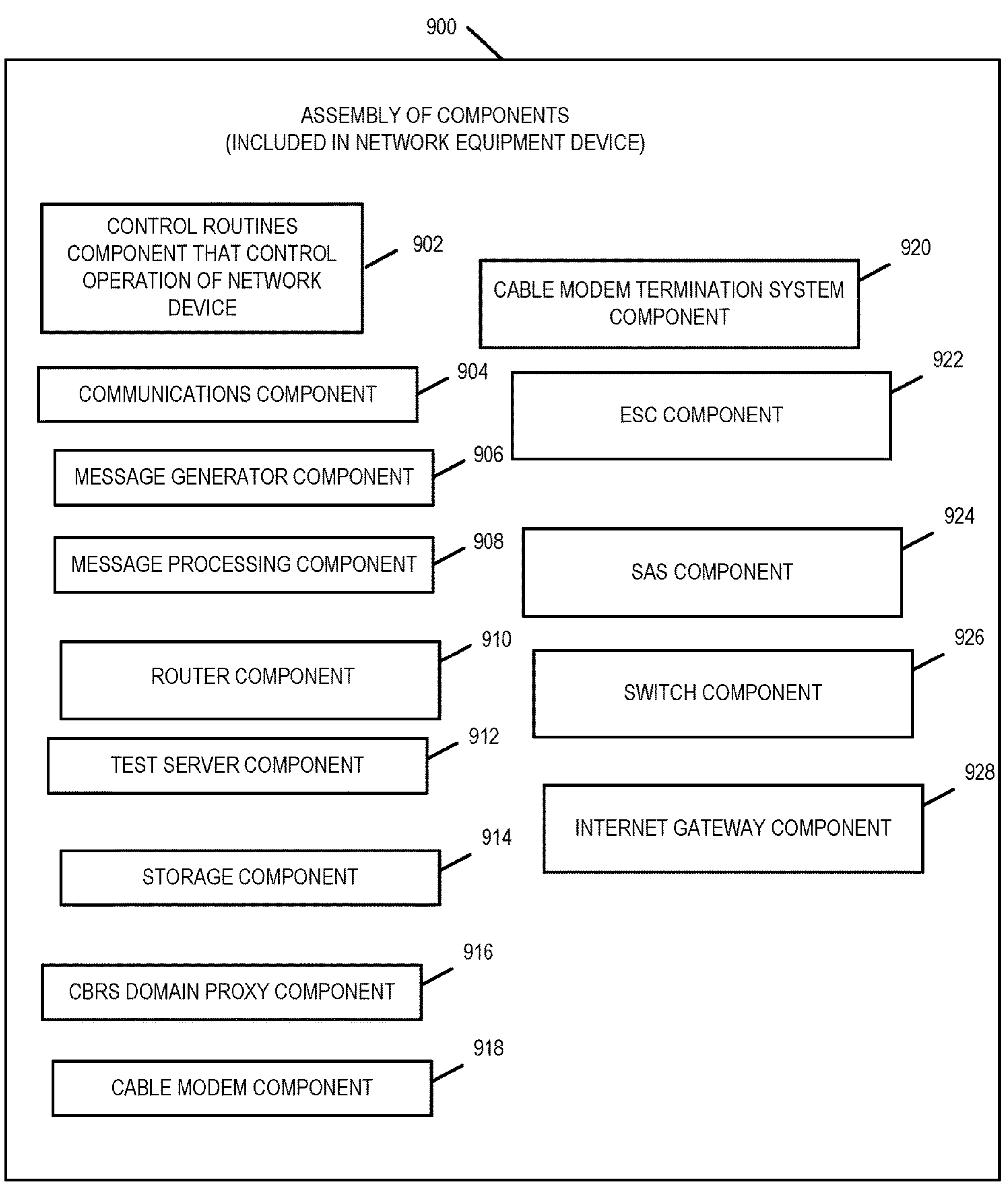
FIG. 9 illustrates an exemplary assembly of components for a network equipment device in accordance with an embodiment of the present invention.

FIG. 9 is a drawing of an exemplary assembly of components 900 which may be included in a network equipment device 600 of FIG. 6, in accordance with an exemplary embodiment. The components in the assembly of components 900 can, and in some embodiments are, implemented fully in hardware within a processor or one or more processors, e.g., processor(s) 606, e.g., as individual circuits. The components in the assembly of components 900 can, and in some embodiments are, implemented fully in hardware within the assembly of hardware components 608, e.g., as individual circuits corresponding to the different components. In other embodiments some of the components are implemented, e.g., as circuits, within processor(s) 606 with other components being implemented, e.g., as circuits within assembly of components 608, external to and coupled to the processor(s) 606. As should be appreciated the level of integration of components on the processor and/or with some components being external to the processor may be one of design choice. Alternatively, rather than being implemented as circuits, all or some of the components may be implemented in software and stored in the memory 612 of the network equipment device 600, with the components controlling operation of the network equipment device 600 to implement the functions corresponding to the components when the components are executed by a processor e.g., processor 606. In some such embodiments, the assembly of components 900 is included in the memory 612 as assembly of software components 614. In still other embodiments, various components in assembly of components 900 are implemented as a combination of hardware and software, e.g., with another circuit external to the processor providing input to the processor which then under software control operates to perform a portion of a component's function.

When implemented in software the components include code, which when executed by a processor or one or more processors, e.g., processor(s) 606, configure the processor(s) to implement the function corresponding to the component. In embodiments where the assembly of components 900 is stored in the memory 612, the memory 612 is a computer program product comprising a computer readable medium comprising code, e.g., individual code for each component, for causing at least one computer, e.g., processor 606, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 9 control and/or configure the network equipment device 600 or elements therein such as the processor(s) 606, to perform the functions of corresponding steps illustrated and/or described in the method of one or more of the flowcharts, signaling diagrams and/or described with respect to any of the Figures. Thus the assembly of components 900 includes various components that perform functions of corresponding one or more described and/or illustrated steps of an exemplary method.

Assembly of components 900 includes a control routines component 902, a communications component 904, a message generator component 906, a message processing component 908, a router component 910, a test server component 912, a storage component 914, a CBRS Domain Proxy component 916, a cable modem component 918, a Cable Modem Termination System component 920, a ESC component 922, a Spectrum Access System component 924, switch component 926, internet gateway component 928.

The control routines component 902 is configured to control operation of the network equipment device. The communication component 904 is configured to handle communications, e.g., transmission and reception of messages, and protocol signaling for the network equipment device. The message generator component 906 is configured to generate messages for transmission to other devices.

The message processing component 908 is configured to process messages and implement procedures/operations in response to messages or based on the contents of messages. This includes messages received from other devices, e.g., messages from wireless base stations, CBSDs, core network, CBRS Domain Proxy, switches, routers, cable modem, CMTS, test server, Domain Proxy, Internet Gateway, ESC System or SAS.

The router component 910 is configured to receive messages from other devices and route them toward their destination based on address information included in the messages. In some embodiments, the router component 910 is a sub-component of the communications component 904.

The test server component 912 is configured receive ping messages from wireless base stations and respond to those messages, e.g., by sending a ping response message to the wireless base station from which it received the ping message using the same backhaul connection path on which the ping message was received.

The storage component 914 is configured to manage the storage, and retrieval of data and/or instructions to/and from memory, and/or storage devices coupled and/or connected to the network equipment device.

The CBRS Domain Proxy component 916 is configured to interact on behalf of wireless base stations in its domain/network with an SAS managing resources (e.g., spectrum for a wireless network such as CBRS spectrum) of a wireless network. The CBRS Domain Proxy component 916 is further configured to act as an intermediary between CBSDs and the SAS aggregating information and requests received from multiple CBSDs and communicating them to the SAS and receiving responses to the requests in a single response and segregating the responses and forwarding them to the correct CBSD.

The cable modem component 918 is configured to perform the functions of a cable modem including receiving Ethernet/Internet Protocol messages from a wireless base station (e.g., CBSD) and transmits them as RF signals over a cable modem network to a Cable Modem Termination System and receive RF signals from the Cable Modem Termination System and transmit them to the wireless base station as Ethernet/Internet Protocol messages. The cable modem component 918 performs the operations, steps and functions described in connection the cable modem 116 herein.

The Cable Modem Termination System component 920 is configured to receive RF signals from a CBSD via a cable modem and convert them to Internet Protocol signals/messages and transmit them toward their destinations while receiving Internet Protocol messages/signals for a CBSD and convert it to RF signals and transmit them to a cable modem servicing the CBSD. The Cable Modem Termination System component is further configured to perform the operations, steps, and functions described in connection with Cable Modem Termination System 126 described herein.

The Environmental Sensing Capability (ESC) component 922 is configured to detect non-informing incumbent CBRS users and notify Spectrum Access Systems.

The Spectrum Access System component 924 is configured to manage resources (e.g., spectrum) of a wireless network (e.g., CBRS network) including registering base stations, responding to spectrum inquiries, responding to spectrum grant requests, responding to spectrum authorization and re-authorization requests, responding to heartbeat requests, determining spectrum availability, evaluating spectrum based on location and interference, grant spectrum for use by base stations, authorize usage of spectrum grants by CBSDs, suspend spectrum grants, release spectrum grants, de-register base stations. The SAS component 924 is configured in some embodiments to perform the operations, functions and steps of the SAS 142 described herein.

The switch component 926 is configured to perform switch operations including connecting devices, networks, cables, terminating cables, routing messages, receiving and transmitting messages, converting messages from between signals types (e.g., optical signals to electrical signals and electrical signals to optical signals, route messages, reformat messages, and perform operations on messages.

The Internet Gateway component 928 is configured to operate as a gateway or bridge connecting the outside network and the core network and passing messages between the two while providing security for the core network.

The specific components of the assembly of components 900 included in any particular network equipment device may, and typically does vary depending on the specific network equipment device and the functionality required for the device and/or the operations the network equipment device is responsible for performing.

Various exemplary numbered embodiments illustrating different features of the present invention will now be discussed. The various features discussed may be used in a variety of different combinations. It should be appreciated that not necessarily all embodiments include the same features and some of the features described below are not necessary but can be desirable in some embodiments. The numbered embodiments are only exemplary and are not meant to be limiting to the scope of the invention. The various method embodiments may be, and in some embodiments are, implemented on system 100 of FIG. 1.

List of First Set of Exemplary Numbered Method Embodiments

Method Embodiment 1. A communications method comprising: establishing, by a Citizens Broadband Radio Service Device (CBSD), a primary backhaul connection path for exchanging messages with a core network, a Citizens Broadband Radio Service (CBRS) Domain Proxy and a test server; establishing, by the CBSD, a secondary backhaul connection path for exchanging messages with the core network, the CBRS Domain Proxy and the test server; and determining, by the CBSD, whether to utilize the primary backhaul connection path or the secondary backhaul connection path for communicating with the core network and the CBRS Domain Proxy based on communications with the test server.

Method Embodiment 2. The communications method of Method Embodiment 1, wherein the primary backhaul connection path includes fiber optic cabling, said CBSD being connected to the fiber optic cabling via a fiber optic cable termination switch; and wherein the secondary backhaul connection path includes coaxial cabling and a Cable Modem Termination System, said CBSD being connected to the coaxial cabling via a cable modem.

Method Embodiment 2A. The communications method of Method Embodiment 2, wherein said fiber optic termination switch is an external device separate from the CBSD.

Method Embodiment 2B. The communications method of Method Embodiment 2, wherein the fiber optic termination switch is part of the CBSD.

Method Embodiment 2C. The communications method of Method Embodiment 2A or 2B, wherein the cable modem is an external device separate from the CBSD.

Method Embodiment 2D. The communications method of Method Embodiment 2A or 2B, wherein the cable modem is a part of the CBSD.

Method Embodiment 3. The communications method of Method Embodiment 1, wherein said communications with the test server are ping messages transmitted from the CBSD to the test server via the primary backhaul connection path or the second backhaul connection path and ping response messages received by the CBSD from the test server.

Method Embodiment 4. The communications method of Method Embodiment 3, wherein said determining, by the CBSD, whether to utilize the primary backhaul connection path or the secondary backhaul connection path for communicating with the core network and the CBRS Domain Proxy based on communications with the test server includes: while utilizing the primary backhaul connection path to communicate with the core network and the CBRS Domain Proxy, continuously transmitting, by the CBSD, ping messages to the test server via the primary backhaul connection path; and upon the CBSD failing to receive ping response messages to the continuous ping messages transmitted to the test server via the primary backhaul connection path for a first period of time (e.g., 15 seconds), commencing, by the CBSD, continuous transmission of ping messages to the test server via the secondary backhaul connection path; and monitoring, by the CBSD, the secondary backhaul connection path for ping response messages to the continuous transmission of ping messages sent to the test server via the secondary backhaul connection path.

Method Embodiment 4A. The communications method of Method Embodiment 4, wherein subsequent to the CBSD failing to receive ping response messages to the continuous ping messages transmitted to the test server via the primary backhaul connection path for a first period of time (e.g., 15 seconds) and prior to commencing, by the CBSD, continuous transmission of ping messages to the test server via the secondary backhaul connection path, ceasing, by the CBSD, to transmit ping messages to the test server via the primary backhaul connection path.

Method Embodiment 4A1. The communications method of Method Embodiment 3, wherein said determining, by the CBSD, whether to utilize the primary backhaul connection path or the secondary backhaul connection path for communicating with the core network and the CBRS Domain Proxy based on communications with the test server includes: while utilizing the primary backhaul connection path to communicate with the core network and the CBRS Domain Proxy, continuously transmitting, by the CBSD, ping messages to the test server via the primary backhaul connection path; and upon the CBSD failing to receive a first threshold number (e.g., 15 packets) of consecutive ping response messages to the continuous ping messages transmitted to the test server via the primary backhaul connection path: (i) commencing, by the CBSD, continuous transmission of ping messages to the test server via the secondary backhaul connection path; and (ii) monitoring, by the CBSD, the secondary backhaul connection path for ping response messages to the continuous transmission of ping messages sent to the test server via the secondary backhaul connection path.

Method Embodiment 4A2. The communications method of Method Embodiment 4A1, wherein subsequent to the CBSD failing to receive a first threshold number (e.g., 15 packets) of consecutive ping response messages to the continuous ping messages transmitted to the test server via the primary backhaul connection path and prior to commencing, by the CBSD, continuous transmission of ping messages to the test server via the secondary backhaul connection path, ceasing, by the CBSD, to transmit ping messages to the test server via the primary backhaul connection path.

Method Embodiment 5. The communications method of Method Embodiment 4, wherein said determining, by the CBSD, whether to utilize the primary backhaul connection path or the secondary backhaul connection path for communicating with the core network and the CBRS Domain Proxy based on communications with the test server further includes: determining to switch from utilizing the primary backhaul connection path for communicating with the core network and the CBRS Domain Proxy to utilizing the secondary backhaul connection path, when said monitoring the secondary backhaul connection path results in no response ping messages being lost for a second period of time (e.g., 15 seconds).

Method Embodiment 5A. The communications method of Method Embodiment 4A1, wherein said determining, by the CBSD, whether to utilize the primary backhaul connection path or the secondary backhaul connection path for communicating with the core network and the CBRS Domain Proxy based on communications with the test server further includes: determining to switch from utilizing the primary backhaul connection path for communicating with the core network and the CBRS Domain Proxy to utilizing the secondary backhaul connection path, when said monitoring the secondary backhaul connection path results in successfully receiving a second threshold number of consecutive ping response messages.

Method Embodiment 5B. The communications method of Method Embodiment 5A, wherein the first threshold number (e.g., 15) and the second threshold number (e.g., 15) are the same.

Method Embodiment 5C. The communications method of Method Embodiment 5A, wherein the ping messages are echo requests with a packet of size 32 bytes; wherein said ping responses messages are echo replies with a packet size of 32 bytes; wherein the first threshold number of consecutive ping response messages is 15 consecutive echo reply packets; wherein the second threshold number of consecutive ping response messages is 15 consecutive echo reply packets.

Method Embodiment 6. The communications method of Method Embodiment 5, further comprising: switching, by the CBSD, from utilizing the primary backhaul connection path to utilizing the secondary backhaul connection path for communicating with the core network and CBSD Domain Proxy in response to determining to switch from utilizing the primary backhaul connection path for communicating with the core network and the CBRS Domain Proxy to utilizing the secondary backhaul connection path; and communicating, by the CBSD via the second backhaul connection path, a heartbeat request message to the CBRS Domain Proxy requesting re-authorization to continue to transmit using a spectrum grant obtained from a Spectrum Access System with which the CBRS Domain Proxy is connected.

Method Embodiment 6A. The communications method of Method Embodiment 6, further comprising: prior to switching from the primary backhaul communications path to the secondary backhaul communications path: (i) transmitting via the primary backhaul communications path a heartbeat request message to the CBRS Domain Proxy requesting authorization to transmit using the spectrum grant obtained from the Spectrum Access System, (ii) receiving via the primary backhaul communications path a heartbeat response message from the CBRS Domain Proxy authorizing use of the spectrum grant by the CBSD in response to the heartbeat request, and (iii) transmitting messages, by the CBSD, to user equipment devices using spectrum identified in the spectrum grant.

Method Embodiment 7. The communications method of Method Embodiment 6, further comprising: after switching from utilizing the primary backhaul connection path to utilizing the secondary backhaul connection path, periodically (e.g., either occasionally or on a fixed recurring schedule after the expiration of a period of time such as for example every 60 minutes) performing, by the CBSD, connectivity tests on the primary backhaul connection path until a successful connectivity test has been performed; and in response to a successful connectivity test being performed on the primary backhaul connection path, determining, by the CBSD, to switch from utilizing the secondary backhaul connection path to utilizing the primary backhaul connection path for communicating with the core network and the CBRS Domain Proxy.

Method Embodiment 7A. The communications method of Method Embodiment 7, wherein each of said periodically performed connectivity tests on the primary backhaul connection path includes: transmitting, by the CBSD, a first number of ping messages (e.g., 15) to the test server via the primary backhaul connection path during a third period of time; and monitoring, by the CBSD, the primary backhaul connection path for ping response messages to the transmitted ping messages; and wherein a successful connectivity test is determined to have occurred when said monitoring the primary backhaul connection path results in no response ping messages being lost for a fourth period of time (e.g., 15 seconds).

Method Embodiment 7B. The communications method of Method Embodiment 7, wherein each of said periodically performed connectivity tests on the primary backhaul connection path includes: transmitting, by the CBSD, a first number of ping messages (e.g., 15) to the test server via the primary backhaul connection path during a third period of time; and monitoring, by the CBSD, the primary backhaul connection path for ping response messages to the first number of transmitted ping messages; and wherein a successful connectivity test is determined to have occurred when said monitoring the first backhaul connection path results in determining that the CBSD has received from the test server at the CBSD via the primary backhaul connection path a ping response message for each of the transmitted ping messages within a fourth time period, said fourth time period being after the commencement of the third period of time.

Method Embodiment 7C. The communications method of Method Embodiment 7, wherein each of said periodically performed connectivity tests on the primary backhaul connection path includes: transmitting, by the CBSD, a first number of ping messages (e.g., 15) to the test server via the primary backhaul connection path during a third period of time; and monitoring, by the CBSD, the primary backhaul connection path for ping response messages to the transmitted ping messages; and wherein a successful connectivity test is determined to have occurred when said monitoring the first backhaul connection path results in receiving within a fourth period of time from the test server at the CBSD via the primary backhaul connection path ping response messages for each of the transmitted ping messages.

Method Embodiment 8. The communications method of Method Embodiment 6, further comprising: performing connectivity checks on the primary backhaul connection path, by the CBSD, after waiting a third period of time (e.g., 60 minutes) after switching from utilizing the primary backhaul connection path to utilizing the secondary backhaul connection path; and wherein said determining, by the CBSD, whether to utilize the primary backhaul connection path or the secondary backhaul connection path for communicating with the core network and the CBRS Domain Proxy based on communications with the test server further includes: determining to switch from utilizing the secondary backhaul connection path for communicating with the core network and the CBRS Domain Proxy to utilizing the primary backhaul connection path, when said connectivity checks on the primary backhaul connection path are successful.

Method Embodiment 9. The communications method of Method Embodiment 8, wherein performing connectivity checks on the primary backhaul connection path includes: transmitting, by the CBSD, ping messages to the test server via the primary backhaul connection path; and monitoring, by the CBSD, the primary backhaul connection path for ping response messages to the ping messages; and wherein said connectivity checks on the primary backhaul connection path are successful when within a fourth period of time (e.g., 15 seconds) a ping response message is received from the test server for each of the ping messages transmitted to the test server as part of a connectivity check.

Method Embodiment 10. The communications method of Method Embodiment 5, wherein the first period of time and the second period of time are an equal amount of time (e.g., 15 seconds).

Method Embodiment 10A. The communications method of Method Embodiment of 5, wherein the first period of time and the second period of time are less than 20 seconds.

Method Embodiment 10B. The communications method of Method Embodiment 5, wherein the first period of time is based on the CBSD heartbeat interval with which the CBSD transmits heartbeat messages to a Spectrum Access System via the CBRS Domain Proxy to obtain re-authorization to continue use of spectrum granted to the CBSD by the Spectrum Access System; and wherein the second period of time is based on the CBSD heartbeat interval with which the CBSD transmits heartbeat messages to the Spectrum Access System via the CBRS Domain Proxy to obtain re-authorization to continue use of spectrum granted to the CBSD by the Spectrum Access System.

Method Embodiment 10C. The communications method of Method Embodiment 5, wherein said combination of the first period of time and the second period of time is less a specified amount of time (e.g., 60 seconds) required for the CBSD to respond to transmission instructions (e.g., cease transmission on specified spectrum) from a Spectrum Access System.

Method Embodiment 11. The communications method of Method Embodiment 2, wherein the primary backhaul connection path has less latency and supports a greater amount of bandwidth than the secondary backhaul connection path.

Method Embodiment 12. The communications method of Method Embodiment 1, wherein the primary backhaul connection path and the secondary backhaul connection path exist concurrently.

Method Embodiment 12A. The communications method of Method Embodiment 12, wherein the CBSD does not simultaneously send a heartbeat request to the CBRS Domain Proxy utilizing both the primary backhaul connection path and the secondary backhaul connection path.

Method Embodiment 13. The communications method of Method Embodiment 2, wherein the CBSD has a fiber optic port, said fiber optic port being used to connect the CBSD to the fiber optic termination switch; and wherein the CBSD has an Ethernet port, said Ethernet port being used to connect the CBSD to the cable modem.

Method Embodiment 14. The communications method of Method Embodiment 1, wherein the CBSD is implemented as a gNodeB wireless base station.

Method Embodiment 14A. The communications method of Method Embodiment 14, wherein the core network is a 5G core network.

Method Embodiment 15. The communications method of Method Embodiment 1, wherein the test server is located in a data center.

Method Embodiment 16. The communications method of Method Embodiment 1, wherein the test server is located in a cloud.

Method Embodiment 17. The communications method of Method Embodiment 1, wherein the CBSD is one of a plurality of CBSDs owned by a multiple system operator; wherein the primary backhaul connection path infrastructure (e.g., fiber optic termination switch, fiber optic cabling and network connection devices) is owned by the multiple system operator; wherein the core network is owned by the multiple system operator; wherein the CBRS Domain Proxy is owned by the multiple system operator; wherein the secondary backhaul connection path infrastructure (e.g., cable modem, HFC network, CMTS, and network connection devices) is owned by the multiple system operator; wherein the test server is owned by the multiple system operator; wherein the multiple system operator operates a cable network and a CBRS network, said plurality of CBSDs being part of the CBRS network which provides wireless services to wireless user equipment devices; and wherein the plurality of CBSDs, primary backhaul connection path infrastructure, core network and CBRS Domain Proxy are part of the CBRS network; and wherein the secondary backhaul connection path infrastructure is part of the cable system, said cable system providing cable television and internet services to devices at customer premises which subscribe to the cable network.

Method Embodiment 18. The communications method of Method Embodiment 2, wherein the CBSD has two different Internet Protocol addresses, a first Internet Protocol address and a second Internet Protocol address, said first Internet Protocol address being used for communications on the primary backhaul connection path, and said second Internet Protocol address being used for communications on the secondary backhaul connection path.

Method Embodiment 19. The communications method of Method Embodiment 2, wherein the CBSD uses the same Internet Protocol address for communications on the primary backhaul communications path and the secondary backhaul communications path.

Method Embodiment 20. The communications method of Method Embodiment 2, wherein the CBSD switches a logical communications interface from the fiber optic port to the Ethernet port when switching from communicating using the primary backhaul connection path to communicating using the secondary backhaul connection path.

Method Embodiment 21. The communications methods of Method Embodiment 3-20, wherein the periodicity of the transmission of ping messages from the CBSD to the test server either over the primary backhaul connection path or the secondary backhaul connection path is configurable.

Method Embodiment 22. The communications methods of Method Embodiment 3-20, wherein each of the first, second, third, fourth and fifth period of times is configurable.

List of First Set of Exemplary Numbered System Embodiments

System Embodiment 1. A communications system comprising: a Citizens Broadband Radio Service Device (CBSD) including: memory; and a first processor, said first processor controlling the CBSD to perform the following operations: establishing, by the CBSD, a primary backhaul connection path for exchanging messages with a core network, a Citizens Broadband Radio Service (CBRS) Domain Proxy and a test server; establishing, by the CBSD, a secondary backhaul connection path for exchanging messages with the core network, the CBRS Domain Proxy and the test server; and determining, by the CBSD, whether to utilize the primary backhaul connection path or the secondary backhaul connection path for communicating with the core network and the CBRS Domain Proxy based on communications with the test server.

System Embodiment 2. The communications system of System Embodiment 1, wherein the primary backhaul connection path includes fiber optic cabling, said CBSD being connected to the fiber optic cabling via a fiber optic cable termination switch; and wherein the secondary backhaul connection path includes coaxial cabling and a Cable Modem Termination System, said CBSD being connected to the coaxial cabling via a cable modem.

System Embodiment 2A. The communications system of System Embodiment 2, wherein said fiber optic termination switch is an external device separate from the CBSD.

System Embodiment 2B. The communications system of System Embodiment 2, wherein the fiber optic termination switch is part of the CBSD.

System Embodiment 2C. The communications system of System Embodiment 2A or 2B, wherein the cable modem is an external device separate from the CBSD.

System Embodiment 2D. The communications system of System Embodiment 2A or 2B, wherein the cable modem is a part of the CBSD.

System Embodiment 3. The communications system of System Embodiment 1, wherein said communications with the test server are ping messages transmitted from the CBSD to the test server via the primary backhaul connection path or the second backhaul connection path and ping response messages received by the CBSD from the test server.

System Embodiment 4. The communications system of System Embodiment 3, wherein said determining, by the CBSD, whether to utilize the primary backhaul connection path or the secondary backhaul connection path for communicating with the core network and the CBRS Domain Proxy based on communications with the test server includes: while utilizing the primary backhaul connection path to communicate with the core network and the CBRS Domain Proxy, continuously transmitting, by the CBSD, ping messages to the test server via the primary backhaul connection path; and upon the CBSD failing to receive ping response messages to the continuous ping messages transmitted to the test server via the primary backhaul connection path for a first period of time (e.g., 15 seconds), commencing, by the CBSD, continuous transmission of ping messages to the test server via the secondary backhaul connection path; and monitoring, by the CBSD, the secondary backhaul connection path for ping response messages to the continuous transmission of ping messages sent to the test server via the secondary backhaul connection path.

System Embodiment 4A. The communications system of System Embodiment 4, wherein subsequent to the CBSD failing to receive ping response messages to the continuous ping messages transmitted to the test server via the primary backhaul connection path for a first period of time (e.g., 15 seconds) and prior to commencing, by the CBSD, continuous transmission of ping messages to the test server via the secondary backhaul connection path, the first processor controls the CBSD to perform the following operation: ceasing, by the CBSD, to transmit ping messages to the test server via the primary backhaul connection path.

System Embodiment 4A1. The communications system of System Embodiment 3, wherein said determining, by the CBSD, whether to utilize the primary backhaul connection path or the secondary backhaul connection path for communicating with the core network and the CBRS Domain Proxy based on communications with the test server includes: while utilizing the primary backhaul connection path to communicate with the core network and the CBRS Domain Proxy, continuously transmitting, by the CBSD, ping messages to the test server via the primary backhaul connection path; and upon the CBSD failing to receive a first threshold number (e.g., 15 packets) of consecutive ping response messages to the continuous ping messages transmitted to the test server via the primary backhaul connection path: (i) commencing, by the CBSD, continuous transmission of ping messages to the test server via the secondary backhaul connection path; and (ii) monitoring, by the CBSD, the secondary backhaul connection path for ping response messages to the continuous transmission of ping messages sent to the test server via the secondary backhaul connection path.

System Embodiment 4A2. The communications system of System Embodiment 4A1, wherein subsequent to the CBSD failing to receive a first threshold number (e.g., 15 packets) of consecutive ping response messages to the continuous ping messages transmitted to the test server via the primary backhaul connection path and prior to commencing, by the CBSD, continuous transmission of ping messages to the test server via the secondary backhaul connection path, the first processor controls the CBSD to perform the following operation: ceasing, by the CBSD, to transmit ping messages to the test server via the primary backhaul connection path.

System Embodiment 5. The communications system of System Embodiment 4, wherein said determining, by the CBSD, whether to utilize the primary backhaul connection path or the secondary backhaul connection path for communicating with the core network and the CBRS Domain Proxy based on communications with the test server further includes: determining to switch from utilizing the primary backhaul connection path for communicating with the core network and the CBRS Domain Proxy to utilizing the secondary backhaul connection path, when said monitoring the secondary backhaul connection path results in no response ping messages being lost for a second period of time (e.g., 15 seconds).

System Embodiment 5A. The communications system of System Embodiment 4A1, wherein said determining, by the CBSD, whether to utilize the primary backhaul connection path or the secondary backhaul connection path for communicating with the core network and the CBRS Domain Proxy based on communications with the test server further includes: determining to switch from utilizing the primary backhaul connection path for communicating with the core network and the CBRS Domain Proxy to utilizing the secondary backhaul connection path, when said monitoring the secondary backhaul connection path results in successfully receiving a second threshold number of consecutive ping response messages.

System Embodiment 5B. The communications system of System Embodiment 5A, wherein the first threshold number (e.g., 15) and the second threshold number (e.g., 15) are the same.

System Embodiment 5C. The communications system of System Embodiment 5A, wherein the ping messages are echo requests with a packet of size 32 bytes; wherein said ping responses messages are echo replies with a packet size of 32 bytes; wherein the first threshold number of consecutive ping response messages is 15 consecutive echo reply packets; wherein the second threshold number of consecutive ping response messages is 15 consecutive echo reply packets.

System Embodiment 6. The communications system of System Embodiment 5, wherein the first processor further controls the CBSD to perform the following operations: switching, by the CBSD, from utilizing the primary backhaul connection path to utilizing the secondary backhaul connection path for communicating with the core network and CBSD Domain Proxy in response to determining to switch from utilizing the primary backhaul connection path for communicating with the core network and the CBRS Domain Proxy to utilizing the secondary backhaul connection path; and communicating, by the CBSD via the second backhaul connection path, a heartbeat request message to the CBRS Domain Proxy requesting re-authorization to continue to transmit using a spectrum grant obtained from a Spectrum Access System with which the CBRS Domain Proxy is connected.

System Embodiment 6A. The communications system of System Embodiment 6, wherein prior to switching from the primary backhaul communications path to the secondary backhaul communications path controls the CBSD to perform the following operations: (i) transmitting via the primary backhaul communications path a heartbeat request message to the CBRS Domain Proxy requesting authorization to transmit using the spectrum grant obtained from the Spectrum Access System, (ii) receiving via the primary backhaul communications path a heartbeat response message from the CBRS Domain Proxy authorizing use of the spectrum grant by the CBSD in response to the heartbeat request, and (iii) transmitting messages, by the CBSD, to user equipment devices using spectrum identified in the spectrum grant.

System Embodiment 7. The communications system of System Embodiment 6, wherein after switching from utilizing the primary backhaul connection path to utilizing the secondary backhaul connection path, the first processor further controls the CBSD to perform the following operations: periodically (e.g., either occasionally or on a fixed recurring schedule after the expiration of a period of time such as for example every 60 minutes) performing, by the CBSD, connectivity tests on the primary backhaul connection path until a successful connectivity test has been performed; and in response to a successful connectivity test being performed on the primary backhaul connection path, determining, by the CBSD, to switch from utilizing the secondary backhaul connection path to utilizing the primary backhaul connection path for communicating with the core network and the CBRS Domain Proxy.

System Embodiment 7A. The communications system of System Embodiment 7, wherein each of said periodically performed connectivity tests on the primary backhaul connection path includes: transmitting, by the CBSD, a first number of ping messages (e.g., 15) to the test server via the primary backhaul connection path during a third period of time; and monitoring, by the CBSD, the primary backhaul connection path for ping response messages to the transmitted ping messages; and wherein a successful connectivity test is determined to have occurred when said monitoring the primary backhaul connection path results in no response ping messages being lost during a fourth period of time (e.g., 15 seconds).

System Embodiment 7B. The communications system of System Embodiment 7, wherein each of said periodically performed connectivity tests on the primary backhaul connection path includes: transmitting, by the CBSD, a first number of ping messages (e.g., 15) to the test server via the primary backhaul connection path during a third period of time; and monitoring, by the CBSD, the primary backhaul connection path for ping response messages to the first number of transmitted ping messages; and wherein a successful connectivity test is determined to have occurred when said monitoring the first backhaul connection path results in determining that the CBSD has received from the test server at the CBSD via the primary backhaul connection path a ping response message for each of the transmitted ping messages within a fourth time period, said fourth time period being after the commencement of the third period of time.

System Embodiment 7C. The communications system of System Embodiment 7, wherein each of said periodically performed connectivity tests on the primary backhaul connection path includes: transmitting, by the CBSD, a first number of ping messages (e.g., 15) to the test server via the primary backhaul connection path during a third period of time; and monitoring, by the CBSD, the primary backhaul connection path for ping response messages to the transmitted ping messages; and wherein a successful connectivity test is determined to have occurred when said monitoring the first backhaul connection path results in receiving within a fourth period of time from the test server at the CBSD via the primary backhaul connection path ping response messages for each of the transmitted ping messages.

System Embodiment 8. The communications system of System Embodiment 6, wherein the first processor further controls the CBSD to perform the following operation: performing connectivity checks on the primary backhaul connection path, by the CBSD, after waiting a third period of time (e.g., 60 minutes) after switching from utilizing the primary backhaul connection path to utilizing the secondary backhaul connection path; and wherein said determining, by the CBSD, whether to utilize the primary backhaul connection path or the secondary backhaul connection path for communicating with the core network and the CBRS Domain Proxy based on communications with the test server further includes: determining to switch from utilizing the secondary backhaul connection path for communicating with the core network and the CBRS Domain Proxy to utilizing the primary backhaul connection path, when said connectivity checks on the primary backhaul connection path are successful.

System Embodiment 9. The communications system of System Embodiment 8, wherein performing connectivity checks on the primary backhaul connection path includes: transmitting, by the CBSD, ping messages to the test server via the primary backhaul connection path; and monitoring, by the CBSD, the primary backhaul connection path for the ping response messages; and wherein said connectivity checks on the primary backhaul connection path are successful when within a fourth period of time (e.g., 15 seconds) a ping response message is received from the test server for each of the ping messages transmitted to the test server as part of a connectivity check.

System Embodiment 10. The communications system of System Embodiment 5, wherein the first period of time and the second period of time are an equal amount of time (e.g., 15 seconds).

System Embodiment 10A. The communications system of System Embodiment of 5, wherein the first period of time and the second period of time are less than 20 seconds.

System Embodiment 10B. The communications system of System Embodiment 5, wherein the first period of time is based on the CBSD heartbeat interval with which the CBSD transmits heartbeat messages to a Spectrum Access System via the CBRS Domain Proxy to obtain re-authorization to continue use of spectrum granted to the CBSD by the Spectrum Access System; and wherein the second period of time is based on the CBSD heartbeat interval with which the CBSD transmits heartbeat messages to the Spectrum Access System via the CBRS Domain Proxy to obtain re-authorization to continue use of spectrum granted to the CBSD by the Spectrum Access System.

System Embodiment 10C. The communications system of System Embodiment 5, wherein said combination of the first period of time and the second period of time is less a specified amount of time (e.g., 60 seconds) required for the CBSD to respond to transmission instructions (e.g., cease transmission on specified spectrum) from a Spectrum Access System.

System Embodiment 11. The communications system of System Embodiment 2, wherein the primary backhaul connection path has less latency and supports a greater amount of bandwidth than the secondary backhaul connection path.

System Embodiment 12. The communications system of System Embodiment 1, wherein the primary backhaul connection path and the secondary backhaul connection path exist concurrently.

System Embodiment 12A. The communications system of System Embodiment 12, wherein the CBSD does not simultaneously send a heartbeat request to the CBRS Domain Proxy utilizing both the primary backhaul connection path and the secondary backhaul connection path.

System Embodiment 13. The communications system of System Embodiment 2, wherein the CBSD has a fiber optic port, said fiber optic port being used to connect the CBSD to the fiber optic termination switch; and wherein the CBSD has an Ethernet port, said Ethernet port being used to connect the CBSD to the cable modem.

System Embodiment 14. The communications system of System Embodiment 1, wherein the CBSD is implemented as a gNodeB wireless base station.

System Embodiment 14A. The communications system of System Embodiment 14, wherein the core network is a 5G core network.

System Embodiment 1, wherein the test server is located in a data center.

System Embodiment 16. The communications system of System Embodiment 1, wherein the test server is located in a cloud.

System Embodiment 17. The communications system of System Embodiment 1, wherein the CBSD is one of a plurality of CBSDs owned by a multiple system operator; wherein the primary backhaul connection path infrastructure (e.g., fiber optic termination switch, fiber optic cabling and network connection devices) is owned by the multiple system operator; wherein the core network is owned by the multiple system operator; wherein the CBRS Domain Proxy is owned by the multiple system operator; wherein the secondary backhaul connection path infrastructure (e.g., cable modem, HFC network, CMTS, and network connection devices) is owned by the multiple system operator; wherein the test server is owned by the multiple system operator; wherein the multiple system operator operates a cable network and a CBRS network, said plurality of CBSDs being part of the CBRS network which provides wireless services to wireless user equipment devices; and wherein the plurality of CBSDs, primary backhaul connection path infrastructure, core network and CBRS Domain Proxy are part of the CBRS network; and wherein the secondary backhaul connection path infrastructure is part of the cable system, said cable system providing cable television and internet services to devices at customer premises which subscribe to the cable network.

System Embodiment 18. The communications system of System Embodiment 2, wherein the CBSD has two different Internet Protocol addresses, a first Internet Protocol address and a second Internet Protocol address, said first Internet Protocol address being used for communications on the primary backhaul connection path, and said second Internet Protocol address being used for communications on the secondary backhaul connection path.

System Embodiment 19. The communications system of System Embodiment 2, wherein the CBSD uses the same Internet Protocol address for communications on the primary backhaul communications path and the secondary backhaul communications path.

System Embodiment 20. The communications system of System Embodiment 2, wherein the CBSD switches a logical communications interface from the fiber optic port to the Ethernet port when switching from communicating using the primary backhaul connection path to communicating using the secondary backhaul connection path.

List of Second Set of Exemplary Numbered Method Embodiments

Method Embodiment 1. A communications method comprising: establishing, by a Citizens Broadband Radio Service Device (CBSD), a primary backhaul connection path for exchanging messages with a core network, a Citizens Broadband Radio Service (CBRS) Domain Proxy and a test server; establishing, by the CBSD, a secondary backhaul connection path for exchanging messages with the core network, the CBRS Domain Proxy and the test server; and upon detecting, by the CBSD, an impairment of the primary backhaul connection path, simultaneously transmitting, by the CBSD, one or more CBRS request messages to the CBRS Domain Proxy via the primary backhaul connection path and the secondary backhaul connection path.

Method Embodiment 2. The communications method of Method Embodiment 1, wherein the one or more CBRS request messages includes heartbeat request messages requesting either authorization or re-authorization from a Spectrum Access System for the CBSD to transmit using spectrum previously granted to the CBSD.

Method Embodiment 3. The communications method of Method Embodiment 1, wherein the one or more CBRS request messages included one or more of the following: a registration request message, a spectrum inquiry request message, a spectrum grant request message, a heartbeat request message, a spectrum relinquish request message, and a de-registration request message.

Method Embodiment 4. The communications method of Method Embodiment 2, further comprising: upon detecting the failure of the primary backhaul connection path, ceasing to transmit, by the CBSD, CBRS request messages to the CBRS Domain Proxy via the primary backhaul connection path while continuing to transmit CBRS request messages to the CBRS Domain Proxy via the secondary backhaul connection path.

Method Embodiment 5. The communications method of Method Embodiment 4, wherein said detecting, by the CBSD, an impairment (e.g., damaged cable or unacceptable delay) of the primary backhaul connection path includes: detecting a failure to receive a first threshold number of ping response messages (e.g., receive some ping response messages but not all ping response messages) within a first period of time from a test server via the primary backhaul connection path in response to ping test messages transmitted to the test server via the primary backhaul connection path.

Method Embodiment 6. The communications method of Method Embodiment 5, wherein said detecting the failure of the primary backhaul connection path includes: detecting a failure to receive a first threshold number of consecutive ping response messages within a second period of time from a test server via the primary backhaul connection path in response to ping test messages transmitted to the test server via the primary backhaul connection path.

List of Second Set of Exemplary Numbered System Embodiments

System Embodiment 1. A communications system comprising: a Citizens Broadband Radio Service Device (CBSD) including: memory; and a first processor, said first processor controlling the CBSD to perform the following operations: establishing, by the CBSD, a primary backhaul connection path for exchanging messages with a core network, a Citizens Broadband Radio Service (CBRS) Domain Proxy and a test server; establishing, by the CBSD, a secondary backhaul connection path for exchanging messages with the core network, the CBRS Domain Proxy and the test server; and upon detecting, by the CBSD, an impairment of the primary backhaul connection path, simultaneously transmitting, by the CBSD, one or more CBRS request messages to the CBRS Domain Proxy via the primary backhaul connection path and the secondary backhaul connection path.

System Embodiment 2. The communications system of System Embodiment 1, wherein the one or more CBRS request messages includes heartbeat request messages requesting either authorization or re-authorization from a Spectrum Access System for the CBSD to transmit using spectrum previously granted to the CBSD.

System Embodiment 3. The communications system of System Embodiment 1, wherein the one or more CBRS request messages includes one or more of the following: a registration request message, a spectrum inquiry request message, a spectrum grant request message, a heartbeat request message, a spectrum relinquish request message, and a de-registration request message.

System Embodiment 4. The communications system of System Embodiment 2, wherein the first processor further controls the CBSD to perform the following operation: upon detecting the failure of the primary backhaul connection path, ceasing to transmit, by the CBSD, CBRS request messages to the CBRS Domain Proxy via the primary backhaul connection path while continuing to transmit CBRS request messages to the CBRS Domain Proxy via the secondary backhaul connection path.

System Embodiment 5. The communications system of System Embodiment 4, wherein said detecting, by the CBSD, an impairment (e.g., damaged cable or unacceptable delay) of the primary backhaul connection path includes: detecting a failure to receive a first threshold number of ping response messages (e.g., receive some ping response messages but not all ping response messages) within a first period of time from a test server via the primary backhaul connection path in response to ping test messages transmitted to the test server via the primary backhaul connection path.

System Embodiment 6. The communications system of System Embodiment 5, wherein said detecting the failure of the primary backhaul connection path includes: detecting a failure to receive a first threshold number of consecutive ping response messages within a second period of time from a test server via the primary backhaul connection path in response to ping test messages transmitted to the test server via the primary backhaul connection path within a second period of time.

List of Third Set of Exemplary Numbered Method Embodiments

Method Embodiment 1. A communications method comprising: establishing, by a Citizens Broadband Radio Service Device (CBSD), a primary backhaul connection path for exchanging messages with a core network, a Citizens Broadband Radio Service (CBRS) Domain Proxy and a test server; upon detecting, by the CBSD, an impairment of the primary backhaul connection path, establishing, by the CBSD, a secondary backhaul connection path for exchanging messages with the core network, the CBRS Domain Proxy and the test server.

Method Embodiment 2. The communications method of Method Embodiment 1, wherein said detecting, by the CBSD, an impairment (e.g., damaged cable or unacceptable delay) of the primary backhaul connection path includes: detecting a failure to receive a first threshold number of ping response messages (e.g., failure to receive some, but not necessary all, ping response messages) from a test server via the primary backhaul connection path in response to ping test messages transmitted to the test server via the primary backhaul connection path within a first period of time.

Method Embodiment 3. The communications method of Method Embodiment 2, further comprising: upon detecting the failure of the primary backhaul connection path, (i) ceasing to transmit, by the CBSD, CBRS request messages to the CBRS Domain Proxy via the primary backhaul connection path, and (ii) commencing to transmit, by the CBSD, CBRS request messages to the CBRS Domain Proxy via the established secondary backhaul connection path.

Method Embodiment 3A. The communications method of Method Embodiment 3, wherein said detecting the failure of the primary backhaul connection path includes: detecting a failure to receive a first threshold number of consecutive ping response messages within a second period of time from a test server via the primary backhaul connection path in response to ping test messages transmitted to the test server via the primary backhaul connection path.

Method Embodiment 4. The communications method of Method Embodiment 3, wherein the CBRS request messages includes heartbeat request messages requesting either authorization or re-authorization from a Spectrum Access System for the CBSD to transmit using spectrum previously granted to the CBSD.

Method Embodiment 5. The communications method of Method Embodiment 3, wherein each of the CBRS request messages is one of the following types: a registration request message type, a spectrum inquiry request message type, a spectrum grant request message type, a heartbeat request message type; a spectrum relinquish request message type, and a de-registration request message type.

Method Embodiment 6. The communications method of Method Embodiment 3, further comprising: after ceasing to transmit, by the CBSD, CBRS request messages to the CBRS Domain Proxy via the primary backhaul connection path, periodically sending a set of N consecutive ping test messages to the test server via the primary backhaul connection path, to determine if the primary backhaul connection path is no longer in a failed state, N being a positive integer greater than 1 (e.g., 15).

Method Embodiment 7. The communications method of Method Embodiment 4, further comprising: upon determining that the primary backhaul connection path is no longer in a failed state, switching, by the CBSD, from sending CBRS request messages to the CBRS Domain Proxy via the secondary backhaul connection path to sending CBRS request messages to the CBRS Domain Proxy via the primary backhaul connection path.

Method Embodiment 8. The communications method of Method Embodiment 7, wherein said determining that the primary backhaul connection path is no longer in a failed state includes: detecting, within a first period of time from the transmission of the set of N consecutive ping test messages to the test server, reception of a set of N consecutive ping test responses messages from the test server via the primary backhaul connection path in response to the set of N consecutive ping test messages.

Method Embodiment 9. The communications method of Method Embodiment 7, further comprising: utilizing, by the CBSD, the primary backhaul connection path to transmit user equipment data to a core network during time periods when the CBSD utilizes the primary backhaul connection path to transmit CBRS request messages to the CBRS Domain Proxy; and utilizing, by the CBSD, the secondary backhaul connection path to transmit user equipment data to the core network during time periods when the CBSD utilizes the secondary backhaul connection path to transmit CBRS request messages to the CBRS Domain Proxy.

List of Third Set of Exemplary Numbered System Embodiments

System Embodiment 1. A communications system comprising: a Citizens Broadband Radio Service Device (CBSD) including: memory; and a first processor, said first processor controlling the CBSD to perform the following operations: establishing, by a Citizens Broadband Radio Service Device (CBSD), a primary backhaul connection path for exchanging messages with a core network, a Citizens Broadband Radio Service (CBRS) Domain Proxy and a test server; upon detecting, by the CBSD, an impairment of the primary backhaul connection path, establishing, by the CBSD, a secondary backhaul connection path for exchanging messages with the core network, the CBRS Domain Proxy and the test server.

System Embodiment 2. The communications system of System Embodiment 1, wherein said detecting, by the CBSD, an impairment (e.g., damaged cable or unacceptable delay) of the primary backhaul connection path includes: detecting a failure to receive a first threshold number of ping response messages (e.g., failure to receive some, but not necessary all, ping response messages) from a test server via the primary backhaul connection path in response to ping test messages transmitted to the test server via the primary backhaul connection path within a first period of time.

System Embodiment 3. The communications system of claim System Embodiment 2, wherein the first processor further controls the CBSD to perform the following operation: upon detecting the failure of the primary backhaul connection path, (i) ceasing to transmit, by the CBSD, CBRS request messages to the CBRS Domain Proxy via the primary backhaul connection path, and (ii) commencing to transmit, by the CBSD, CBRS request messages to the CBRS Domain Proxy via the established secondary backhaul connection path.

System Embodiment 3A. The communications system of System Embodiment 3, wherein said detecting the failure of the primary backhaul connection path includes: detecting a failure to receive a first threshold number of consecutive ping response messages within a second period of time from a test server via the primary backhaul connection path in response to ping test messages transmitted to the test server via the primary backhaul connection path.

System Embodiment 4. The communications system of System Embodiment 3, wherein the CBRS request messages includes heartbeat request messages requesting either authorization or re-authorization from a Spectrum Access System for the CBSD to transmit using spectrum previously granted to the CBSD.

System Embodiment 5. The communications system of System Embodiment 3, wherein each of the CBRS request messages is one of the following types: a registration request message type, a spectrum inquiry request message type, a spectrum grant request message type, a heartbeat request message type; a spectrum relinquish request message type, and a de-registration request message type.

System Embodiment 6. The communications system of System Embodiment 3, further comprising: after ceasing to transmit, by the CBSD, CBRS request messages to the CBRS Domain Proxy via the primary backhaul connection path, periodically sending a set of N consecutive ping test messages to the test server via the primary backhaul connection path, to determine if the primary backhaul connection path is no longer in a failed state, N being a positive integer greater than 1 (e.g., 15).

System Embodiment 7. The communications system of System Embodiment 4, wherein the first processor further controls the CBSD to perform the following operation: upon determining that the primary backhaul connection path is no longer in a failed state, switching, by the CBSD, from sending CBRS request messages to the CBRS Domain Proxy via the secondary backhaul connection path to sending CBRS request messages to the CBRS Domain Proxy via the primary backhaul connection path.

System Embodiment 8. The communications system of System Embodiment 7, wherein said determining that the primary backhaul connection path is no longer in a failed state includes: detecting, within a first period of time from the transmission of the set of N consecutive ping test messages to the test server, reception of a set of N consecutive ping test responses messages from the test server via the primary backhaul connection path in response to the set of N consecutive ping test messages.

System Embodiment 9. The communications system of System Embodiment 7, wherein the first processor further controls the CBSD to perform the following operations: utilizing, by the CBSD, the primary backhaul connection path to transmit user equipment data to a core network during time periods when the CBSD utilizes the primary backhaul connection path to transmit CBRS request messages to the CBRS Domain Proxy; and utilizing, by the CBSD, the secondary backhaul connection path to transmit user equipment data to the core network during time periods when the CBSD utilizes the secondary backhaul connection path to transmit CBRS request messages to the CBRS Domain Proxy.

List of Exemplary Numbered Non-Transitory Computer Readable Medium Embodiments

Non-transitory Computer Readable Medium Embodiment 1. A non-transitory computer readable medium including a first set of computer executable instructions which when executed by a processor of a Citizens Broadband Radio Service Device (CBSD) cause the CBSD to perform the steps of: establishing, by the CBSD, a primary backhaul connection path for exchanging messages with a core network, a Citizens Broadband Radio Service (CBRS) Domain Proxy and a test server; establishing, by the CBSD, a secondary backhaul connection path for exchanging messages with the core network, the CBRS Domain Proxy and the test server; and determining, by the CBSD, whether to utilize the primary backhaul connection path or the secondary backhaul connection path for communicating with the core network and the CBRS Domain Proxy based on communications with the test server.

Non-transitory Computer Readable Medium Embodiment 2. The non-transitory computer readable medium of Non-transitory Computer Readable Medium Embodiment 1, wherein the primary backhaul connection path includes fiber optic cabling, said CBSD being connected to the fiber optic cabling via a fiber optic cable termination switch; and wherein the secondary backhaul connection path includes coaxial cabling and a Cable Modem Termination System, said CBSD being connected to the coaxial cabling via a cable modem.

The techniques of various embodiments may be implemented using software, hardware and/or a combination of software and hardware. Various embodiments are directed to apparatus, e.g., wireless base stations, wireless devices, mobile terminals, network equipment, eNBs, gNBs, CBSDs, CBRS tower base stations, mobility management entities, smart devices, user equipment devices, user devices, computers, smartphones, subscriber devices, core network systems, EPCs, Domain Proxy, Spectrum Access System, servers, nodes, network switches, routers, fiber termination switch, cable modem, Cable Modem Termination System, Internet gateways and/or elements. Various embodiments are also directed to methods, e.g., method of controlling and/or operating e.g., wireless base stations, wireless devices, mobile terminals, network equipment, eNBs, gNBs, CBSDs, CBRS tower base stations, mobility management entities, smart devices, user equipment devices, user devices, computers, smartphones, subscriber devices, core network systems, EPCs, Domain Proxy, Spectrum Access System, servers, nodes, network switches, routers, fiber termination switch, cable modem, Cable Modem Termination System, Internet gateways and/or elements. Various embodiments are also directed to machine, e.g., computer, readable medium, e.g., ROM, RAM, CDs, hard discs, etc., which include machine readable instructions for controlling a machine to implement one or more steps of a method. The computer readable medium is, e.g., non-transitory computer readable medium.

It is understood that the specific order or hierarchy of steps in the processes and methods disclosed is an example of exemplary approaches. Based upon design preferences, it is understood that the specific order or hierarchy of steps in the processes and methods may be rearranged while remaining within the scope of the present disclosure. The accompanying method claims present elements of the various steps in a sample order, and are not meant to be limited to the specific order or hierarchy presented. In some embodiments, one or more processors are used to carry out one or more steps of each of the described methods.

In various embodiments each of the steps or elements of a method are implemented using one or more processors. In some embodiments, each of elements or steps are implemented using hardware circuitry.

In various embodiments devices, e.g., e.g., wireless base stations, wireless devices, mobile terminals, network equipment, eNBs, gNBs, CBSDs, CBRS tower base stations, mobility management entities, smart devices, user equipment devices, user devices, computers, smartphones, subscriber devices, core network systems, Evolved Packet Cores (EPCs), ESCs, Domain Proxy, Spectrum Access System, servers, nodes, network switches, routers, fiber termination switch, cable modem, Cable Modem Termination System, Internet gateways and/or elements described herein are implemented using one or more components to perform the steps corresponding to one or more methods, for example, generating or creating messages; generating and transmitting ping messages, receiving ping response messages, monitoring a primary backhaul connection path for ping response messages, monitoring a secondary backhaul connection path for ping response messages, performing continuity test, connections, message reception, message transmission, switching modes, signal processing, sending, comparing, determining and/or transmission steps. Thus, in some embodiments various features are implemented using components or in some embodiments logic such as for example logic circuits. Such components may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more devices, servers, nodes and/or elements. Accordingly, among other things, various embodiments are directed to a machine-readable medium, e.g., a non-transitory computer readable medium, including machine executable instructions for causing a machine, e.g., processor and associated hardware, to perform one or more of the steps of the above-described method(s). Some embodiments are directed to a device, e.g., a controller, including a processor configured to implement one, multiple or all of the steps of one or more methods of the invention.

In some embodiments, the processor or processors, e.g., CPUs, of one or more devices, e.g., e.g., wireless base stations, wireless devices, mobile terminals, network equipment, eNBs, gNBs, CBSDs, CBRS tower base stations, mobility management entities, smart devices, user equipment devices, user devices, computers, smartphones, subscriber devices, core network systems, EPCs, ESCs, Domain Proxy, Spectrum Access System, servers, nodes, network switches, routers, fiber termination switch, cable modem, Cable Modem Termination System, Internet gateways and/or elements are configured to perform the steps of the methods described as being performed by the e.g., wireless base stations, wireless devices, mobile terminals, network equipment, eNBs, gNBs, CBSDs, CBRS tower base stations, mobility management entities, smart devices, user equipment devices, user devices, computers, smartphones, subscriber devices, core network systems, EPCs, ESCs, Domain Proxy, Spectrum Access System, servers, nodes, network switches, routers, fiber termination switch, cable modem, Cable Modem Termination System, Internet gateways and/or elements. The configuration of the processor may be achieved by using one or more components, e.g., software components, to control processor configuration and/or by including hardware in the processor, e.g., hardware components, to perform the recited steps and/or control processor configuration. Accordingly, some but not all embodiments are directed to a device, e.g., e.g., wireless base stations, wireless devices, mobile terminals, network equipment, eNBs, gNBs, CBSDs, CBRS tower base stations, mobility management entities, smart devices, user equipment devices, user devices, computers, smartphones, subscriber devices, core network systems, EPCs, ESCs, Domain Proxy, Spectrum Access System, servers, nodes, network switches, routers, fiber termination switch, cable modem, Cable Modem Termination System, Internet gateways and/or elements, with a processor which includes a component corresponding to each of the steps of the various described methods performed by the device in which the processor is included. In some but not all embodiments a device, e.g., e.g., wireless base stations, wireless devices, mobile terminals, network equipment, eNBs, gNBs, CBSDs, CBRS tower base stations, mobility management entities, smart devices, user equipment devices, user devices, computers, smartphones, subscriber devices, core network systems, EPCs, ESCs, Domain Proxy, Spectrum Access System, servers, nodes, network switches, routers, fiber termination switch, cable modem, Cable Modem Termination System, Internet gateways and/or elements, includes a controller corresponding to each of the steps of the various described methods performed by the device in which the processor is included. The components may be implemented using software and/or hardware.

Some embodiments are directed to a computer program product comprising a computer-readable medium, e.g., a non-transitory computer-readable medium, comprising code for causing a computer, or multiple computers, to implement various functions, steps, acts and/or operations, e.g., one or more steps described above. Depending on the embodiment, the computer program product can, and sometimes does, include different code for each step to be performed. Thus, the computer program product may, and sometimes does, include code for each individual step of a method, e.g., a method of controlling a device, e.g., e.g., wireless base stations, wireless devices, mobile terminals, network equipment, eNBs, gNBs, CBSDs, CBRS tower base stations, mobility management entities, smart devices, user equipment devices, user devices, computers, smartphones, subscriber devices, core network systems, EPCs, ESCs, Domain Proxy, Spectrum Access System, servers, nodes, network switches, routers, fiber termination switch, cable modem, Cable Modem Termination System, Internet gateways and/or elements. The code may be in the form of machine, e.g., computer, executable instructions stored on a computer-readable medium, e.g., a non-transitory computer-readable medium, such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a communications device such as a e.g., wireless base stations, wireless devices, mobile terminals, network equipment, eNBs, gNBs, CBSDs, CBRS tower base stations, mobility management entities, smart devices, user equipment devices, user devices, computers, smartphones, subscriber devices, core network systems, EPCs, ESCs, Domain Proxy, Spectrum Access System, servers, nodes, network switches, routers, fiber termination switch, cable modem, Cable Modem Termination System, Internet gateways and/or elements or other device described in the present application.

Numerous additional variations on the methods and apparatus of the various embodiments described above will be apparent to those skilled in the art in view of the above description. Such variations are to be considered within the scope. Numerous additional embodiments, within the scope of the present invention, will be apparent to those of ordinary skill in the art in view of the above description and the claims which follow. Such variations are to be considered within the scope of the invention.

What is claimed is:

1. A communications method comprising:

establishing, by a Citizens Broadband Radio Service Device (CBSD), a primary backhaul connection path for exchanging messages with a core network, a Citizens Broadband Radio Service (CBRS) Domain Proxy and a test server;

establishing, by the CBSD, a secondary backhaul connection path for exchanging messages with the core network, the CBRS Domain Proxy and the test server; and determining, by the CBSD, whether to utilize the primary backhaul connection path or the secondary backhaul connection path for communicating with the core network and the CBRS Domain Proxy based on communications with the test server;

wherein said communications with the test server are ping messages transmitted from the CBSD to the test server via the primary backhaul connection path or the secondary backhaul connection path and ping response messages received by the CBSD from the test server; and wherein said determining, by the CBSD, whether to utilize the primary backhaul connection path or the secondary backhaul connection path for communicating with the core network and the CBRS Domain Proxy based on communications with the test server includes:

while utilizing the primary backhaul connection path to communicate with the core network and the CBRS Domain Proxy, continuously transmitting, by the CBSD, ping messages to the test server via the primary backhaul connection path; and upon the CBSD failing to receive ping response messages to the continuous ping messages transmitted to the test server via the primary backhaul connection path for a first period of time, commencing, by the CBSD, continuous transmission of ping messages to the test server via the secondary backhaul connection path; and monitoring, by the CBSD, the secondary backhaul connection path for ping response messages to the continuous transmission of ping messages sent to the test server via the secondary backhaul connection path.

2. The communications method of claim 1, wherein the primary backhaul connection path includes fiber optic cabling, said CBSD being connected to the fiber optic cabling via a fiber optic cable termination switch; and wherein the secondary backhaul connection path includes coaxial cabling and a Cable Modem Termination System, said CBSD being connected to the coaxial cabling via a cable modem.

3. The communications method of claim 1, wherein said determining, by the CBSD, whether to utilize the primary backhaul connection path or the secondary backhaul connection path for communicating with the core network and the CBRS Domain Proxy based on communications with the test server further includes:

determining to switch from utilizing the primary backhaul connection path for communicating with the core network and the CBRS Domain Proxy to utilizing the secondary backhaul connection path, when said monitoring the secondary backhaul connection path results in no response ping messages being lost for a second period of time.

4. The communications method of claim 3, further comprising:

switching, by the CBSD, from utilizing the primary backhaul connection path to utilizing the secondary backhaul connection path for communicating with the core network and CBSD Domain Proxy in response to determining to switch from utilizing the primary backhaul connection path for communicating with the core network and the CBRS Domain Proxy to utilizing the secondary backhaul connection path; and communicating, by the CBSD via the secondary backhaul connection path, a heartbeat request message to the CBRS Domain Proxy requesting re-authorization to continue to transmit using a spectrum grant obtained from a Spectrum Access System with which the CBRS Domain Proxy is connected.

5. The communications method of claim 4, further comprising:

after switching from utilizing the primary backhaul connection path to utilizing the secondary backhaul connection path, periodically performing, by the CBSD, connectivity tests on the primary backhaul connection path until a successful connectivity test has been performed; and in response to a successful connectivity test being performed on the primary backhaul connection path, determining, by the CBSD, to switch from utilizing the secondary backhaul connection path to utilizing the primary backhaul connection path for communicating with the core network and the CBRS Domain Proxy.

6. The communications method of claim 4, further comprising:

performing connectivity checks on the primary backhaul connection path, by the CBSD, after waiting a third period of time after switching from utilizing the primary backhaul connection path to utilizing the secondary backhaul connection path; and wherein said determining, by the CBSD, whether to utilize the primary backhaul connection path or the secondary backhaul connection path for communicating with the core network and the CBRS Domain Proxy based on communications with the test server further includes:

determining to switch from utilizing the secondary backhaul connection path for communicating with the core network and the CBRS Domain Proxy to utilizing the primary backhaul connection path, when said connectivity checks on the primary backhaul connection path are successful.

7. The communications method of claim 6, wherein said performing connectivity checks on the primary backhaul connection path includes:

transmitting, by the CBSD, ping messages to the test server via the primary backhaul connection path; and monitoring, by the CBSD, the primary backhaul connection path for ping response messages to the ping messages; and wherein said connectivity checks on the primary backhaul connection path are successful when within a fourth period of time a ping response message is received from the test server for each of the ping messages transmitted to the test server as part of a connectivity check.

8. The communications method of claim 1, wherein the primary backhaul connection path and the secondary backhaul connection path exist concurrently.

9. A communications method comprising:

establishing, by a Citizens Broadband Radio Service Device (CBSD), a primary backhaul connection path for exchanging messages with a core network, a Citizens Broadband Radio Service (CBRS) Domain Proxy and a test server;

establishing, by the CBSD, a secondary backhaul connection path for exchanging messages with the core network, the CBRS Domain Proxy and the test server; and determining, by the CBSD, whether to utilize the primary backhaul connection path or the secondary backhaul connection path for communicating with the core network and the CBRS Domain Proxy based on communications with the test server; and wherein said communications with the test server are ping messages transmitted from the CBSD to the test server via the primary backhaul connection path or the secondary backhaul connection path and ping response messages received by the CBSD from the test server; and wherein said determining, by the CBSD, whether to utilize the primary backhaul connection path or the secondary backhaul connection path for communicating with the core network and the CBRS Domain Proxy based on communications with the test server includes:

while utilizing the primary backhaul connection path to communicate with the core network and the CBRS Domain Proxy, continuously transmitting, by the CBSD, ping messages to the test server via the primary backhaul connection path; and upon the CBSD failing to receive a first threshold number of consecutive ping response messages to the continuous ping messages transmitted to the test server via the primary backhaul connection path:

(i) commencing, by the CBSD, continuous transmission of ping messages to the test server via the secondary backhaul connection path; and (ii) monitoring, by the CBSD, the secondary backhaul connection path for ping response messages to the continuous transmission of ping messages sent to the test server via the secondary backhaul connection path.

10. The communications method of claim 9, wherein the primary backhaul connection path includes fiber optic cabling, said CBSD being connected to the fiber optic cabling via a fiber optic cable termination switch; and wherein the secondary backhaul connection path includes coaxial cabling and a Cable Modem Termination System, said CBSD being connected to the coaxial cabling via a cable modem.

11. A communications system comprising:

a Citizens Broadband Radio Service Device (CBSD) including:

memory; and a first processor, said first processor controlling the CBSD to perform the following operations:

establishing, by the CBSD, a primary backhaul connection path for exchanging messages with a core network, a Citizens Broadband Radio Service (CBRS) Domain Proxy and a test server;

establishing, by the CBSD, a secondary backhaul connection path for exchanging messages with the core network, the CBRS Domain Proxy and the test server; and determining, by the CBSD, whether to utilize the primary backhaul connection path or the secondary backhaul connection path for communicating with the core network and the CBRS Domain Proxy based on communications with the test server; and wherein said communications with the test server are ping messages transmitted from the CBSD to the test server via the primary backhaul connection path or the secondary backhaul connection path and ping response messages received by the CBSD from the test server; and wherein said determining, by the CBSD, whether to utilize the primary backhaul connection path or the secondary backhaul connection path for communicating with the core network and the CBRS Domain Proxy based on communications with the test server includes:

while utilizing the primary backhaul connection path to communicate with the core network and the CBRS Domain Proxy, continuously transmitting, by the CBSD, ping messages to the test server via the primary backhaul connection path; and upon the CBSD failing to receive ping response messages to the continuous ping messages transmitted to the test server via the primary backhaul connection path for a first period of time, commencing, by the CBSD, continuous transmission of ping messages to the test server via the secondary backhaul connection path; and monitoring, by the CBSD, the secondary backhaul connection path for ping response messages to the continuous transmission of ping messages sent to the test server via the secondary backhaul connection path.

12. The communications system of claim 11, wherein the primary backhaul connection path includes fiber optic cabling, said CBSD being connected to the fiber optic cabling via a fiber optic cable termination switch; and wherein the secondary backhaul connection path includes coaxial cabling and a Cable Modem Termination System, said CBSD being connected to the coaxial cabling via a cable modem.

13. The communications system of claim 11, wherein said determining, by the CBSD, whether to utilize the primary backhaul connection path or the secondary backhaul connection path for communicating with the core network and the CBRS Domain Proxy based on communications with the test server further includes:

determining to switch from utilizing the primary backhaul connection path for communicating with the core network and the CBRS Domain Proxy to utilizing the secondary backhaul connection path, when said monitoring the secondary backhaul connection path results in no response ping messages being lost for a second period of time.

14. The communications system of claim 13, wherein the first processor further controls the CBSD to perform the following operations:

switching, by the CBSD, from utilizing the primary backhaul connection path to utilizing the secondary backhaul connection path for communicating with the core network and CBSD Domain Proxy in response to determining to switch from utilizing the primary backhaul connection path for communicating with the core network and the CBRS Domain Proxy to utilizing the secondary backhaul connection path; and communicating, by the CBSD via the secondary backhaul connection path, a heartbeat request message to the CBRS Domain Proxy requesting re-authorization to continue to transmit using a spectrum grant obtained from a Spectrum Access System with which the CBRS Domain Proxy is connected.

15. The communications system of claim 14, wherein after switching from utilizing the primary backhaul connection path to utilizing the secondary backhaul connection path, the first processor further controls the CBSD to perform the following operations:

periodically performing, by the CBSD, connectivity tests on the primary backhaul connection path until a successful connectivity test has been performed; and in response to a successful connectivity test being performed on the primary backhaul connection path, determining, by the CBSD, to switch from utilizing the secondary backhaul connection path to utilizing the primary backhaul connection path for communicating with the core network and the CBRS Domain Proxy.

16. The communications system of claim 14, wherein the first processor further controls the CBSD to perform the following operation:

performing connectivity checks on the primary backhaul connection path, by the CBSD, after waiting a third period of time after switching from utilizing the primary backhaul connection path to utilizing the secondary backhaul connection path; and wherein said determining, by the CBSD, whether to utilize the primary backhaul connection path or the secondary backhaul connection path for communicating with the core network and the CBRS Domain Proxy based on communications with the test server further includes:

determining to switch from utilizing the secondary backhaul connection path for communicating with the core network and the CBRS Domain Proxy to utilizing the primary backhaul connection path, when said connectivity checks on the primary backhaul connection path are successful.

17. The communications system of claim 16, wherein said performing connectivity checks on the primary backhaul connection path includes:

transmitting, by the CBSD, ping messages to the test server via the primary backhaul connection path; and monitoring, by the CBSD, the primary backhaul connection path for ping response messages to the ping messages; and wherein said connectivity checks on the primary backhaul connection path are successful when within a fourth period of time a ping response message is received from the test server for each of the ping messages transmitted to the test server as part of a connectivity check.

18. A non-transitory computer readable medium including a first set of computer executable instructions which when executed by a processor of a Citizens Broadband Radio Service Device (CBSD) cause the CBSD to perform the steps of:

establishing, by the CBSD, a primary backhaul connection path for exchanging messages with a core network, a Citizens Broadband Radio Service (CBRS) Domain Proxy and a test server;

establishing, by the CBSD, a secondary backhaul connection path for exchanging messages with the core network, the CBRS Domain Proxy and the test server; and determining, by the CBSD, whether to utilize the primary backhaul connection path or the secondary backhaul connection path for communicating with the core network and the CBRS Domain Proxy based on communications with the test server;

wherein said communications with the test server are ping messages transmitted from the CBSD to the test server via the primary backhaul connection path or the secondary backhaul connection path and ping response messages received by the CBSD from the test server; and wherein said determining, by the CBSD, whether to utilize the primary backhaul connection path or the secondary backhaul connection path for communicating with the core network and the CBRS Domain Proxy based on communications with the test server includes:

while utilizing the primary backhaul connection path to communicate with the core network and the CBRS Domain Proxy, continuously transmitting, by the CBSD, ping messages to the test server via the primary backhaul connection path; and upon the CBSD failing to receive ping response messages to the continuous ping messages transmitted to the test server via the primary backhaul connection path for a first period of time, commencing, by the CBSD, continuous transmission of ping messages to the test server via the secondary backhaul connection path; and monitoring, by the CBSD, the secondary backhaul connection path for ping response messages to the continuous transmission of ping messages sent to the test server via the secondary backhaul connection path.

19. A communications system comprising:

a Citizens Broadband Radio Service Device (CBSD) including:

memory; and a first processor, said first processor controlling the CBSD to perform the following operations:

establishing, by the CBSD, a primary backhaul connection path for exchanging messages with a core network, a Citizens Broadband Radio Service (CBRS) Domain Proxy and a test server;

establishing, by the CBSD, a secondary backhaul connection path for exchanging messages with the core network, the CBRS Domain Proxy and the test server; and determining, by the CBSD, whether to utilize the primary backhaul connection path or the secondary backhaul connection path for communicating with the core network and the CBRS Domain Proxy based on communications with the test server; and wherein said communications with the test server are ping messages transmitted from the CBSD to the test server via the primary backhaul connection path or the secondary backhaul connection path and ping response messages received by the CBSD from the test server; and wherein said determining, by the CBSD, whether to utilize the primary backhaul connection path or the secondary backhaul connection path for communicating with the core network and the CBRS Domain Proxy based on communications with the test server includes:

while utilizing the primary backhaul connection path to communicate with the core network and the CBRS Domain Proxy, continuously transmitting, by the CBSD, ping messages to the test server via the primary backhaul connection path; and upon the CBSD failing to receive a first threshold number of consecutive ping response messages to the continuous ping messages transmitted to the test server via the primary backhaul connection path:

(i) commencing, by the CBSD, continuous transmission of ping messages to the test server via the secondary backhaul connection path; and (ii) monitoring, by the CBSD, the secondary backhaul connection path for ping response messages to the continuous transmission of ping messages sent to the test server via the secondary backhaul connection path.

20. The communications system of claim 19, wherein the primary backhaul connection path includes fiber optic cabling, said CBSD being connected to the fiber optic cabling via a fiber optic cable termination switch; and wherein the secondary backhaul connection path includes coaxial cabling and a Cable Modem Termination System, said CBSD being connected to the coaxial cabling via a cable modem.

* * * * *